(12) United States Patent
Dillon

(10) Patent No.: US 8,880,594 B2
(45) Date of Patent: Nov. 4, 2014

(54) COMPUTER NETWORKING SYSTEM AND METHOD WITH JAVASCRIPT EXECUTION FOR PRE-FETCHING CONTENT FROM DYNAMICALLY-GENERATED URL

(75) Inventor: Douglas M. Dillon, Gaithersburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 174 days.

(21) Appl. No.: 13/306,200

(22) Filed: Nov. 29, 2011

(65) Prior Publication Data

US 2012/0136926 A1 May 31, 2012

Related U.S. Application Data

(60) Provisional application No. 61/417,626, filed on Nov. 29, 2010.

(51) Int. Cl.
*G06F 15/16* (2006.01)
*G06F 17/30* (2006.01)

(52) U.S. Cl.
CPC .............................. *G06F 17/30902* (2013.01)
USPC ........... 709/203; 709/201; 709/202; 709/219; 709/206; 709/217; 715/234; 715/749; 715/769; 715/205; 705/32

(58) Field of Classification Search
USPC ................ 709/246, 229, 225, 213, 228, 227, 709/201–203, 206, 217, 219
See application file for complete search history.

(56) References Cited

U.S. PATENT DOCUMENTS

| 6,907,429 | B2 | 6/2005 | Carneal et al. |
| 6,910,180 | B1 | 6/2005 | Cui et al. |
| 6,941,338 | B1 | 9/2005 | Madsen |
| 6,944,827 | B2 | 9/2005 | Gao et al. |
| 7,024,477 | B2 * | 4/2006 | Allan ............................ 709/224 |
| 7,389,330 | B2 | 6/2008 | Dillon et al. |
| 7,665,082 | B2 * | 2/2010 | Wyatt et al. ................... 717/171 |
| 7,712,141 | B1 | 5/2010 | Agrawal et al. |
| 7,716,281 | B2 * | 5/2010 | Lin et al. ........................ 709/203 |
| 7,751,542 | B2 * | 7/2010 | Klemm et al. ............ 379/201.07 |
| 7,954,052 | B2 | 5/2011 | Curtis et al. |
| 8,024,400 | B2 * | 9/2011 | Lin et al. ........................ 709/203 |

(Continued)

FOREIGN PATENT DOCUMENTS

WO    2010/081160 A2    7/2010

OTHER PUBLICATIONS

Nov. 14, 2012 European Official Action in European Patent Appln. No. 11191137.6.

(Continued)

*Primary Examiner* — Jude Jean Gilles
(74) *Attorney, Agent, or Firm* — Fitzpatrick, Cella, Harper & Scinto

(57) ABSTRACT

An apparatus, method, and non-transitory computer-readable medium comprising program code which when executed by an apparatus causes the apparatus to effect the method, for pre-fetching web content. Preferably, a proxy server performs the pre-fetching. Techniques such, for example, as executing Javascript in pre-fetched pages, modifying pre-fetched pages to address URL generation involving random numbers or dates, using cookie information or browser specifics when performing pre-fetching of pages, and injecting Javascript to measure response time may be performed, by way of example.

29 Claims, 26 Drawing Sheets

(56) References Cited

U.S. PATENT DOCUMENTS

| | | | |
|---|---|---|---|
| 8,078,759 | B2 | 12/2011 | Seifert et al. |
| 8,111,414 | B2 | 2/2012 | Sato et al. |
| 8,131,861 | B2 | 3/2012 | Butler et al. |
| 8,150,798 | B2 | 4/2012 | Ma et al. |
| 8,150,939 | B1 * | 4/2012 | Murray ............... 709/217 |
| 8,234,369 | B2 | 7/2012 | Jones |
| 8,275,790 | B2 * | 9/2012 | Fredricksen et al. ........ 707/782 |
| 8,392,841 | B1 | 3/2013 | Bowden et al. |
| 8,417,772 | B2 * | 4/2013 | Lin et al. ............... 709/203 |
| 2002/0010761 | A1 | 1/2002 | Carneal et al. |
| 2002/0099818 | A1 | 7/2002 | Russell et al. |
| 2003/0229900 | A1 | 12/2003 | Reisman |
| 2004/0093327 | A1 | 5/2004 | Anderson et al. |
| 2004/0250205 | A1 | 12/2004 | Conning |
| 2005/0021791 | A1 | 1/2005 | Sakiyama et al. |
| 2005/0204041 | A1 * | 9/2005 | Blinn et al. ............ 709/225 |
| 2007/0274503 | A1 * | 11/2007 | Klemm et al. .......... 379/265.01 |
| 2008/0195712 | A1 * | 8/2008 | Lin et al. ................ 709/206 |
| 2009/0019105 | A1 | 1/2009 | Sebastian |
| 2009/0083395 | A1 | 3/2009 | Shimbo et al. |
| 2009/0083646 | A1 * | 3/2009 | Lin et al. ............... 715/769 |
| 2009/0249300 | A1 | 10/2009 | Vainer et al. |
| 2009/0271514 | A1 | 10/2009 | Thomas et al. |
| 2009/0292984 | A1 | 11/2009 | Bauchot et al. |
| 2009/0300196 | A1 * | 12/2009 | Haghpassand ............. 709/229 |
| 2009/0300208 | A1 | 12/2009 | Lepeska |
| 2009/0313318 | A1 * | 12/2009 | Dye et al. ............... 709/202 |
| 2010/0198880 | A1 | 8/2010 | Petersen |
| 2010/0223322 | A1 * | 9/2010 | Mott et al. .............. 709/203 |
| 2010/0228880 | A1 * | 9/2010 | Hunt et al. .............. 709/246 |
| 2011/0119370 | A1 | 5/2011 | Huang et al. |
| 2011/0124319 | A1 | 5/2011 | Fu |
| 2011/0179469 | A1 * | 7/2011 | Blinn et al. ............ 726/4 |
| 2011/0185016 | A1 | 7/2011 | Kandasamy et al. |
| 2011/0208550 | A1 | 8/2011 | Lamarche et al. |
| 2011/0307238 | A1 * | 12/2011 | Scoda ................. 703/26 |
| 2012/0136927 | A1 | 5/2012 | Dillon et al. |
| 2012/0136928 | A1 | 5/2012 | Dillon |
| 2012/0137210 | A1 | 5/2012 | Dillon |
| 2012/0198558 | A1 | 8/2012 | Liu et al. |

OTHER PUBLICATIONS

Webmaster General Forum, "Hughes Network Systems cause the most 404 errors", http://www.webmasterworld.com/webmaster/4058789.htm, 2010, pp. 1-5.

EL810 Mobile PEP-Box Terminal Elevation Product Family, Elevation, R2/10.2008, www.newtec.eu, pp. 1-2.

"Opera Mini", Opera Mini—Wikipedia, the free encyclopedia, Nov. 5, 2010, http://en.wikipedia.org/wiki/Opera_Mini (Date retrieved: Nov. 11, 2010), pp. 1-12.

"Opera Mini technology", Opera Solutions: Opera Mini, http://www.opera.com/business/solutions/mini/technology/ (Date retrieved: Nov. 11, 2010), pp. 1-2.

"Google Labs Has Re-Released the Much-Maligned Web Accelerator", Antezeta SEO & Web Analytics Consulting, Antezeta.com/.../google-web-accelerator (Date retrieved: Nov. 24, 2010) pp. 1-4.

Esa Artes "Satellite Communication System Elements, Technologies, and Applications: Fast Internet via Satellite", Tellitec Engineering GmbH, Berlin, Germany, Aug. 28, 2004, pp. 1-6.

ViaSat "Innovative Bandwidth Savings Techniques Beyond Modulation", Transforming Satellite Broadband Communications, Paul Sandoval, Viasat Inc., May 27, 2008.

ViaSat, "Transforming Satellite Broadband", http://www.sspi.com.br/portal/images/stories/pdfs/viasat_sspi_vsat_day_2009, 2009.

Aug. 2, 2012 European Official Action in European Patent Appln. No. 11 191 137.6.

Gourley, et al., HTTP: The Definitive Guide, Sep. 27, 2002, O'Reilly Media Inc.

* cited by examiner

Pre-fetch

Proxy Server Pre-Fetching

Client/Client Proxy Pre-Fetching

Proxy Server Javascript Modification

Re-define Math.random() function

Add RandomNew() function, Replace function calls

Fig. 12
Re-define Math.random() function

Fig. 13
Insert RandomNew() function, Replace function calls

Re-define Date object

Insert DateNew object, Replace object references

Browser Specifics

Browser Specifics

Cookies tracking
(When Client Proxy does not contain promised/pre-fetched data)

Cookies tracking
(Proxy Server receiving HTTP request from Virtual Browser)

Cookies tracking
(When Client Proxy contains promised/pre-fetched data)

Web Page Response Time

Web Page Response Time

```
var oldContainer = _get('fyf_container');
oldContainer.parentNode.removeChild(oldContainer);
var dummyContainer = document.createElement('div');
dummyContainer.id = 'fyf_dummy_container';
dummyContainer.innerHTML = '<div class="fyf-container">
          <div class="fyf-container-main-title">Find your friends on YouTube!</div>
          <div class="fyf-container-import-indicator">
          <img src="http://s.ytimg.com/yt/img/icn_loading_animated-vfl24663.gif"/>
          </div></div>';
var parentContainer = _get('dragdrop');
parentContainer.insertBefore(dummyContainer, parentContainer.firstChild);
```

(a)

```
<script language=javascript>
if(window.yzq_p==null)
    document.write("<scr"+"ipt language=javascript src=http://l.yimg.com/d/lib/bc/bc_2.0.4.js>
         </scr"+"ipt>");
</script>
```

```
string pageLoadHtmlInsertText = "<script type=""text/javascript"">
if (window.w15OnLoadHandler==null)
{
  window.w15OnLoadHandler = function()
  {
    var w15EndOfPageImage = new Image();
    w15EndOfPageImage.src = 'http://www.hughes.net/w15/pageloadw15{0}.gif';
    if (window.w15RestoreDate!=null)
    {
      window.w15RestoreDate();
    }
  } if (window.addEventListener)
  {
    window.addEventListener('load', w15OnLoadHandler, true);
  } else if (window.attachEvent)
  {
    window.attachEvent('onload', w15OnLoadHandler);
  } else
  {
    window.onload = w15OnLoadHandler;
  }
}
</script>".Replace("{0}", pageId);
```

(a)

```
string endOfHtmlInsertText =
@"<!-- POCP Very First Html End Insert-->
<script type=""text/javascript"">
var w15EndOfHtmlImage = new Image();
w15EndOfHtmlImage.src = 'http://www.hughes.net/w15/endofhtmlw15{0}.gif';
</script>
<!-- POCP Very First Html End End-->".Replace("{0}", pageId);
```

COMPUTER NETWORKING SYSTEM AND METHOD WITH JAVASCRIPT EXECUTION FOR PRE-FETCHING CONTENT FROM DYNAMICALLY-GENERATED URL

CROSS-REFERENCE TO RELATED APPLICATION

This application claims the benefit of U.S. Provisional Application No. 61/417,626 filed Nov. 29, 2010.

FIELD OF THE INVENTION

The present invention relates to a computer networking system and method, and particularly to a computer networking system and method that can preferably be used with a network having a satellite link.

BACKGROUND OF THE INVENTION

Satellite communication systems have been used to provide network or Internet access, but satellite links can suffer from latency, and loading web pages that require multiple round trips can therefore be slow.

SUMMARY OF THE INVENTION

In one aspect, the present invention relates to a first apparatus comprising: (a) means for receiving via a network connection, in a case where a first HTTP GET request for a first URL has been generated by a second apparatus, first data from which the first URL can be obtained; (b) means for receiving, from a web server associated with the first URL, second data from a HTTP response to a HTTP GET request for the first URL; (c) means for obtaining Javascript in accordance with Javascript in the second data; and (d) means for executing the obtained Javascript, wherein a memory and processor are included in the first apparatus. Optionally, one or more of the following may be satisfied: (1) the first apparatus may further comprise means for sending to another apparatus, via a network connection, the obtained Javascript; (2) the another apparatus may be a third apparatus comprising means for receiving the obtained Javascript and means for sending the obtained Javascript to the second apparatus, and the second apparatus may comprises means for receiving the obtained Javascript from the third apparatus and means for executing the obtained Javascript; (3) the another apparatus may be a third apparatus comprising (a) means for generating a HTTP response to the first HTTP GET request in accordance with the obtained Javascript, and (b) means for sending the HTTP response to the second apparatus, and the second apparatus may comprise means for receiving the HTTP response, means for obtaining the obtained Javascript from the HTTP response, and means for executing the obtained Javascript; (4) the another apparatus may be the second apparatus and comprise means for receiving the obtained Javascript from the first apparatus and means for executing the obtained Javascript; (5) the another apparatus may be is the second apparatus and comprise (a) a HTTP web browser that generated the first HTTP GET request and (b) a proxy software program that receives the obtained Javascript from the first apparatus, generates a HTTP response to the first HTTP GET request in accordance with the obtained Javascript, and sends the HTTP response to the web browser, which executes the obtained Javascript; (6) the executing means may comprise a web browser that executes the obtained Javascript; (7) the second data may be the HTTP response. The first apparatus may further comprise means for generating, in accordance with the first data, a HTTP GET request for the first URL, wherein the second data is data from a HTTP response to that HTTP GET request; (8) the second data may be data from a HTTP response to the first HTTP GET request; (9) the first apparatus may further comprise means for, in response to execution by the executing means of the obtained Javascript producing a request for a second URL, generating a second HTTP GET request for the second URL; means for receiving third data from a HTTP response to the second HTTP GET request; (10) the first apparatus may further comprise means for sending the third data to another apparatus; (11) the another apparatus is a third apparatus, which comprises means for receiving the third data, means for generating a HTTP response in accordance with the third data, and means for sending the HTTP response to the second apparatus; (12) the another apparatus may be the second apparatus, which comprises (a) a HTTP web browser and (b) means for receiving the third data, for generating a HTTP response in accordance with the third data, and for sending the HTTP response to the web browser; (13) the first apparatus may further comprise means for sending a notification to the another apparatus that the first apparatus is generating the second HTTP get request, wherein the notification is sent prior to sending the third data to the another apparatus; (14) the first apparatus may further comprise means for sending to the another apparatus, via a network connection, the obtained Javascript, wherein the another apparatus comprises (a) means for receiving the notification from the first apparatus and (b) means for awaiting receipt from the first apparatus of the third data without the another apparatus generating a request for the second URL; (15) the obtaining means may comprise means for modifying Javascript in the second data to obtain Javascript which is different from Javascript in the second data; (16) the first apparatus may further comprise means for sending to another apparatus, via a network connection, the obtained Javascript, wherein the another apparatus comprises means for executing the obtained Javascript using a HTTP web browser; (17) the another apparatus is the second apparatus; (18) the obtaining means comprises: means for determining whether or not Javascript in the second data should be modified; means for, when the determining means determines that Javascript in the second data should not be modified, obtaining Javascript identical to Javascript in the second data; and means for, when the determining means determines that Javascript in the second data should be modified, modifying Javascript in the second data to obtain Javascript which is different from the Javascript in the second data; (19) the first apparatus may further comprise means for sending via a network connection the obtained Javascript so that the second apparatus receives the obtained Javascript, wherein the second apparatus comprises means for executing the obtained Javascript so that both the first apparatus and the second apparatus execute the obtained Javascript; (20) the first apparatus may further comprise means for, in response to HTML in the second data including a reference to a URL, generating a second HTTP GET request for that URL; and means for, in response to Javascript in the second data that when executed produces a request for a URL, generating a third HTTP GET request for that URL; (21) the first apparatus may further comprise means for receiving a response to the second HTTP GET request and for sending to another apparatus third data in accordance with the response; and means for receiving a response to the third HTTP GET request and for sending to the another apparatus fourth data in accordance with the response; (22) the another apparatus may be the second apparatus; (23) the another apparatus may be a third apparatus comprising (a) means for generating a HTTP response in accordance with the third data and for sending the HTTP response to the second apparatus, and (b) means for generating a HTTP response in accordance with the fourth data and for sending that HTTP response to the second apparatus; (24) the first apparatus may further comprise means for sending the obtained Javascript via a network connection so that the obtained Javascript is received by the second apparatus, wherein the second apparatus comprises means for executing the obtained Javascript, and wherein, in the event that execution of the obtained Javascript produces a request for a second URL, the first apparatus generates a HTTP GET request for the second URL and the second apparatus also generates a HTTP GET request for the second URL, and the first apparatus sends third data via a network connection to cause the second apparatus to receive a HTTP response to the second apparatus's HTTP GET request for the second URL; (25) the first apparatus may send the third data to a third apparatus, which comprises (a) means for generating a HTTP response in accordance with the third data and (b) means for sending the HTTP response to the second apparatus, the HTTP response being the HTTP response to the second apparatus's HTTP GET request for the second URL; (26) the first apparatus may send the third data to the second apparatus, which comprises a web browser and a proxy program that the web browser is configured to use in the web browser's proxy settings, wherein the proxy program receives the third data and generates in accordance with the third data the HTTP response to the second apparatus's HTTP GET request for the second URL; (27) the second apparatus comprises (a) a web browser, which generates the first HTTP GET request and which has proxy settings, and (b) a program selected by the web browser's proxy settings, wherein the program receives the first HTTP GET request, obtains the first URL from the first HTTP GET request, and in accordance with the first URL sends to the first apparatus the first data, wherein the first apparatus further comprises means for sending, to the second apparatus's program, data comprising the obtained Javascript, wherein the program receives the data comprising the obtained Javascript and, in accordance with the data comprising the obtained Javascript, provides to the web browser a HTTP response to the first HTTP GET request, the HTTP response including the obtained Javascript, wherein the web browser executes the obtained Javascript, wherein the first apparatus further comprises (a) means for, in the event that the execution by the executing means of the obtained Javascript produces a request for a second URL, generating a second HTTP GET request for the second URL, (b) means for receiving a HTTP response to the second HTTP GET request, and (c) means for sending, to the first apparatus's program, third data obtained in accordance with the HTTP response, and wherein when execution by the web browser of the obtained Javascript results in generation of a HTTP GET request for the second URL, the program generates in accordance with the third data and provides to the web browser a HTTP response to the HTTP GET request for the second URL, so that it is unnecessary for the program to send the HTTP GET request for the second URL to a web server corresponding to the second URL; (28) the second apparatus and a proxy apparatus are connected via a network, and the proxy is connected to the first apparatus via a high-latency network, wherein the second apparatus comprises a web browser, which generates the first HTTP GET request, wherein the proxy apparatus receives the first HTTP GET request from the second apparatus, obtains the first URL from the first HTTP GET request, and in accordance with the first URL sends to the first apparatus the first data from which the first URL can be obtained, wherein the first apparatus further comprises means for sending, to the proxy apparatus, data comprising the obtained Javascript, wherein the proxy apparatus receives the data comprising the obtained Javascript and in accordance with the data, generates and sends to the web browser of the second apparatus a HTTP response to the first HTTP GET request, the HTTP response including the obtained Javascript, wherein the web browser executes the obtained Javascript, wherein the first apparatus further comprises (a) means for, in the event that the execution by the executing means produces a request for a second URL, generating a second HTTP GET request for the second URL, (b) means for receiving a HTTP response to the second HTTP GET request, and (c) means for sending, to the proxy apparatus, third data obtained in accordance with the HTTP response to the second HTTP GET request, and wherein when execution by the web browser of the obtained Javascript results in generation of a HTTP GET request for the second URL, the proxy apparatus generates a HTTP response thereto in accordance with the third data, so that it is unnecessary for the proxy apparatus to send the HTTP GET request for the second URL to a web server corresponding to the second URL; (29) the proxy apparatus may be a non-transparent proxy such that the web browser has proxy settings selecting the proxy apparatus; (30) the proxy apparatus is a transparent proxy such that the web browser does not have proxy settings selecting the proxy apparatus; (31) the executing means comprises a HTTP web browser program; (32) the network connecting the second apparatus and the proxy apparatus is a low-latency network; (33) the high-latency network comprises a satellite connection.

In another aspect, the present invention relates to a device comprising: a processor; a memory storing a control program to be executed by the processor; and a hardware network interface, wherein the control program comprises: (a) code for receiving, via the hardware network interface, first data relating to a first URL of a first HTTP GET request, the first HTTP GET request having been generated by a web browser of a client apparatus; (b) code for receiving second data from a first HTTP response, the first HTTP response having been generated by an apparatus corresponding to the first URL in response to a HTTP GET request for the first URL; (c) code for, if the second data includes Javascript, obtaining Javascript for execution by the control program, based on Javascript included in the second data; and (d) code for executing the obtained Javascript, wherein in response to the obtained Javascript dynamically generating a URL when executed, the control program generates a second HTTP GET request for the dynamically-generated URL. Optionally, one or more of the following may be satisfied: (1) the control program further comprises code for generating a HTTP GET request for the first URL; (2) the second data is the first HTTP response; (3) the control program further comprises code for, in response to receipt of the second data, sending third data in accordance with the second data for receipt by the client apparatus; (4) the control program is further configured to send the obtained Javascript for receipt by the client apparatus so that both the client apparatus's web browser and the control program execute the obtained Javascript; (5) the client apparatus further comprises a proxy program selected by proxy settings in the client apparatus's web browser, wherein the proxy program sends to the control program the first data relating to the first URL of the first HTTP GET request, wherein the control program is further configured to send third data to the proxy program in accordance with the second data, wherein in accordance with the third data, the proxy program generates and provides to the client apparatus's web browser a HTTP response to the first HTTP GET request; (6) the control program is further configured so that in response to receiving a HTTP response to the second HTTP GET request, the control program sends to the proxy program fourth data in accordance with that HTTP response, and wherein the proxy program, in response to the client apparatus's web browser generating a HTTP GET request for the dynamically-generated URL, generates a HTTP response in accordance with the fourth data and provides the HTTP response to the client apparatus's web browser, as a HTTP response to that HTTP GET request; (7) the proxy settings include a host setting, which is set to localhost; (8) a proxy apparatus on a same local area network as the client apparatus receives data from the first HTTP GET request, obtains the first URL of the first HTTP GET request based on the received data, and sends to the control program the first data relating to the first URL of the first HTTP GET request, wherein the control program is further configured to send third data to the proxy apparatus in accordance with the second data, in accordance with which third data the proxy apparatus generates and provides to the client apparatus's web browser a HTTP response to the first HTTP GET request, wherein the control program is further configured so that in response to receiving a HTTP response to the second HTTP GET request, the control program sends to the proxy apparatus fourth data in accordance with that HTTP response, and wherein the proxy apparatus, in response to the client apparatus's web browser generating a HTTP GET request for the dynamically-generated URL, generates a HTTP response in accordance with the fourth data and provides the HTTP response to the client apparatus's web browser, as a HTTP response to that HTTP GET request; (9) the proxy apparatus is selected by proxy settings in the client apparatus's web browser; (10) the proxy apparatus is a transparent proxy apparatus not selected by proxy settings in the client apparatus's web browser; (11) the client apparatus sends the first HTTP GET request using a source IP address corresponding to the client apparatus and a destination IP address corresponding to the URL, the source and destination IP addresses not being an IP address of the device; (12) the device has an IP address, corresponding to its hardware network interface, which is different from the source and destination IP addresses; (13) the control program comprises a web browser and another program, and the another program controls the web browser to cause the web browser to execute the obtained Javascript.

In yet another aspect, the present invention relates to an apparatus-implemented method comprising: receiving from a network, by a first apparatus including a memory, a processor, and a hardware network interface, in a case where a first HTTP GET request for a first URL has been generated by a second apparatus, first data from which the first URL can be obtained; receiving by the first apparatus, from a third apparatus which is associated with the URL, second data from a HTTP response to a HTTP GET request for the first URL; obtaining Javascript in accordance with Javascript in the second data; and executing, by the first apparatus, of the obtained Javascript. Optionally, one or more of the following may be satisfied: (1) the second data is the HTTP response; (2) the method further comprises generating, by the first apparatus, of a second HTTP GET request for the first URL, wherein the HTTP response is a HTTP response to the second HTTP GET request.

In still a further aspect, the present invention relates to a non-transitory, tangible computer-readable storage medium in which is stored a computer program which when executed effects the foregoing method.

In yet another aspect, the present invention relates to a method comprising: determining, by a first apparatus including a memory, that a second apparatus has made a request for a first URL, wherein the first URL corresponds to a third apparatus; and when a web page corresponding to the first URL comprises code that when executed generates a dynamic, non-static second URL, prefetching, by the first apparatus, of content in accordance with the second URL. Optionally, one or more of the following may be satisfied: (1) the code comprises Javascript; (2) the method further comprises a step of, when the web page comprises a static URL, prefetching, by the first apparatus, of content in accordance with the static URL; (3) the method further comprises generating, by the first apparatus, of a pre-fetch notification that is sent to a proxy for the second apparatus, the pre-fetch notification informing the proxy that content for the second URL is to be prefetched by the first apparatus; and (4) the proxy is selected from the group consisting of a proxy program executed by the second apparatus and a proxy apparatus separate from the second apparatus, and wherein in response to the proxy having received the pre-fetch notification, the proxy prevents a HTTP request for the second URL generated by a web browser of the second apparatus from being sent to a web server corresponding to the second URL.

In a still further aspect, the present invention relates to a non-transitory, tangible computer-readable storage medium in which is stored a computer program which when executed effects the foregoing method.

In still another aspect, the present invention relates to a first apparatus comprising: means for, in a case where a second apparatus has generated a first HTTP GET request for a first URL, receiving, via a network connection, data from a HTTP response, the HTTP response having been generated by a web server in response to a HTTP request for the first URL; and modifying means for obtaining, from Javascript in the data, modified Javascript, wherein at least one of the following conditions is satisfied: (a) said modifying means comprises means for, when the Javascript in the data, upon execution, uses a first random number algorithm in an instance, obtaining, as the modified Javascript, Javascript that when executed instead uses in that instance a second algorithm different from the first random number algorithm; (b) said modifying means comprises means for, when the Javascript in the data uses a first chronological algorithm in an instance, obtaining, as the modified Javascript, Javascript that when executed instead uses in that instance a third algorithm different from the first chronological algorithm; and (c) said modifying means comprises means for, when the Javascript in the data, upon execution, uses an algorithm to generate a URL in an instance, obtaining, as the modified Javascript, Javascript that when executed instead uses in that instance a different algorithm to generate a URL, wherein a memory and a processor are included in the first apparatus. Optionally, one or more of the following are satisfied: (1) the first apparatus further comprises means for sending from the first apparatus, via a network connection, data in accordance with the modified Javascript; (2) the sending means sends the data in accordance with the modified Javascript via a network connection for receipt by the second apparatus; (3) the data in accordance with the modified Javascript comprises the modified Javascript; (4) the data from the HTTP response is the HTTP response; (5) the first apparatus further comprises means for, in response to the generation by the second apparatus of the first HTTP GET request, generating a second HTTP GET request for the first URL; (6) the first apparatus further comprises means for executing the modified Javascript; (7) condition (a) is satisfied; (8) the Javascript in the data includes a function call to a first random number function that uses the first random number algorithm; (9) the second algorithm is selected such that a sequence of values output by the second algorithm when executed by a first one of two different apparatuses matches in whole or in part with a sequence of values output by the second algorithm when executed by a second one of the two different apparatuses; (10) the second algorithm is selected such that a sequence of values output by the second algorithm when executed by one apparatus and a sequence of values output by the second algorithm when executed by another apparatus are the same; (11) the first random number function is the Javascript function Math.random; (12) the second algorithm is executed by invocation in the modified Javascript of an object; (13) the second algorithm is executed by a function call in the modified Javascript to a function; (14) the first apparatus further comprises means for executing the modified Javascript; (15) the second algorithm is selected such that in a case where execution of the modified Javascript by the executing means uses the second algorithm to produce a request for a second URL and execution of the modified Javascript by the second apparatus uses the second algorithm to produce a request for a third URL, the same web page content is obtained in response to the second and third URL requests; (16) the second algorithm is selected so that the second URL and the third URL are the same; (17) the first apparatus further comprises means for sending from the first apparatus, via a network connection, data in accordance with the modified Javascript, for receipt by the second apparatus; (18) the data in accordance with the modified Javascript comprises the modified Javascript; (19) the first apparatus further comprises means for executing the modified Javascript; (20) the first apparatus further comprises means for, in response to the generation by the second apparatus of the first HTTP GET request, generating a second HTTP GET request for the first URL; (21) the second algorithm is selected such that if two different apparatuses repeatedly execute the second algorithm, each apparatus obtains a set of numerical values from the second algorithm that matches in whole or in part a set of numerical values from the second algorithm obtained by the other of the two different apparatuses; (22) the sets are identical; (23) in the case that the Javascript in the HTTP response uses the first random number function to generate a URL, then the modified Javascript uses the second algorithm instead of the first random number function to generate a URL, and execution of the modified Javascript by two apparatuses including the second apparatus results in generation of the same URL by each of the two apparatuses; (24) the means for obtaining, as the modified Javascript, Javascript that when executed instead uses in that instance a second algorithm different from the first random number algorithm comprises: (a) means for leaving unchanged in the Javascript in the data a function call to a random number function; and (b) generating Javascript not originally present in the HTTP response that redefines the random number function so that the unchanged function call executes the generated Javascript, wherein the generated Javascript, when executed, uses the second algorithm; (25) the random number function is the Javascript Math.random function, and wherein the generated Javascript assigns a new function to the Math.random variable so as to redefine the Math.random function; (26) the means for obtaining, as the modified Javascript, Javascript that when executed instead uses in that instance a second algorithm different from the first random number algorithm comprises: means for performing a search and replace function that replaces a reference in the Javascript in the data to the random number function with a reference to a different function that when executed uses the second algorithm; (27) the second algorithm is such that successive executions by a first apparatus results in a first sequence of values and successive executions by a second apparatus results in a second sequence of values, and at least the beginning value of the first sequence is the same as the beginning value of the second sequence; (28) at least the beginning values of the first sequence are the same as the beginning values of the second sequence; (29) the second algorithm is configured to return an identical value for at least a plurality of executions of the second algorithm; (30) the second algorithm is configured to return an identical value for at least a plurality of executions of the second algorithm, and then to return a different value for an execution after the plurality of executions; (31) the means for obtaining, as the modified Javascript, Javascript that when executed instead uses in that instance a second algorithm different from the first random number algorithm comprises: means for finding in the Javascript in the data a function call to a random number function; means for editing the Javascript in the data to add code which defines a different function at a position in the Javascript in the data so that the different function will already be defined at a position in the Javascript where the function call to the random number function is found; and means for replacing the found random number function call in the Javascript in the data with a call to the different function, wherein the different function uses the second algorithm; (32) condition (b) is satisfied; (33) the Javascript in the data uses the first chronological algorithm in an instance by invoking a date object that uses the first chronological algorithm, the date object returning a date and a time, and wherein the modified Javascript uses a different programming construct in place of the date object; (34) the different programming construct is an object different from the date object; (35) the different programming construct is a function call to a function; (36) the third algorithm is such that when executed by the first apparatus and when executed by the second apparatus, the third algorithm returns a same chronological result in both cases irrespective of clocks in the first and second apparatuses being imperfectly synchronized; (37) the chronological result comprises date and time; (38) the modified Javascript uses the third algorithm to generate a URL such that when the first apparatus executes the modified Javascript to generate a second URL and the second apparatus executes the modified Javascript to generate a third URL, the same web page content is obtained in response to requests for the second and third URLs; (39) the third algorithm is selected such that the second URL and the third URL are the same; (40) the third algorithm is such that when the first apparatus executes the modified Javascript that uses the third algorithm, and when another apparatus executes the modified Javascript that uses the third algorithm, the third algorithm returns the same result in both cases even when the first apparatus and the another apparatus are configured for different time zones; (41) the first apparatus further comprises (a) means for obtaining the second apparatus's timezone, (b) means for determining from the timezone a number of hours offset from the first apparatus's time, and (c) means for determining a time value in accordance with the offset; (42) the Javascript in the data includes an invocation of the date object default constructor that uses the first chronological algorithm, and wherein the means for, when the Javascript in the data uses a first chronological algorithm in an instance, obtaining, as the modified Javascript, Javascript that when executed instead uses in that instance a third algorithm different from the first chronological algorithm comprises: means for replacing the invocation in the Javascript of the date object's default constructor with a reference to a programming construct that uses the third algorithm, wherein the modified Javascript, as compared to the original Javascript, additionally includes code which defines the programming construct that uses the third algorithm; (43) the programming construct is an object different from the date object; (44) the programming construct is a function call to a function; (45) the means for, when the Javascript in the data uses the first chronological algorithm in an instance, obtaining, as the modified Javascript, Javascript that when executed instead uses in that instance a third algorithm different from the first chronological algorithm comprises: means for leaving unchanged an invocation in the Javascript of the date object's default constructor that uses the first chronological algorithm and for modifying the Javascript so as to redefine the date object so that references to the date object default constructor when invoked cause execution of the third algorithm instead of the first chronological algorithm; (46) the third algorithm returns a result comprising a rounded date field; (47) the third algorithm returns a result comprising a rounded time field; (48) the third algorithm returns a result comprising, having been rounded by using a predetermined interval, the minutes time field and all less precise fields; (49) the third algorithm returns a result comprising the minutes time field of the current time of day having been rounded to an interval evenly divisible by a integer greater than one; (50) the integer is three, so that the minutes time field is always even divisible by three; (51) the third algorithm returns a result comprising at least one date or time field having been set to a predetermined value; (52) the third algorithm sets a seconds time field to a predetermined value; (53) the third algorithm is such that even if the first apparatus and the second apparatus were to execute the different object at times that would result in a different seconds time field value if the first chronological algorithm were used, the third algorithm returns the same seconds time field value to each of the first apparatus and the second apparatus; (54) the third algorithm is used by the modified Javascript to generate a URL in accordance with a chronological measurement, and wherein the third algorithm is such that the same URL is generated by the first apparatus and the second apparatus when executing the modified Javascript even when a clock of the first apparatus is not synchronized with a clock of the second apparatus; (55) the third algorithm effects a setting procedure that sets at least one of the seconds and/or milliseconds field of the date/time value to a predetermined value; (56) the setting procedure sets both the seconds and milliseconds fields of the current time of day to respective predetermined values; (57) in the case that the Javascript in the data uses a date object to generate a URL, the date object using the first chronological algorithm, then the modified Javascript uses the third algorithm to generate a URL and execution of the modified Javascript by two apparatuses including the second apparatus results in generation of the same URL by each apparatus; (58) wherein differences between the Javascript in the data and the modified Javascript include (a) a reference in the Javascript in the data to a date object has been replaced, in the modified Javascript, by a reference to a function call to a date function, and (b) the modified Javascript, as compared to the original Javascript, additionally includes code that defines the date function; (59) condition (c) is satisfied; (60) wherein the means for, when the Javascript in the data, upon execution, uses an algorithm to generate a URL in an instance, obtaining, as the modified Javascript, Javascript that when executed instead uses in that instance a different algorithm to generate a URL comprises: one of (a) means for replacing a reference in the Javascript to a date object used to generate a URL with a reference to a different date object used to generate a URL and (b) means for replacing a reference in the Javascript to a date object used to generate a URL with a reference to a date function used to generate a URL; (61) wherein the means for, when the Javascript in the data, upon execution, uses an algorithm to generate a URL in an instance, obtaining, as the modified Javascript, Javascript that when executed instead uses in that instance a different algorithm to generate a URL comprises: means for replacing a reference in the Javascript to a random number function used to generate a URL with a reference to a different random number function used to generate a URL; (62) the first apparatus further comprises means for executing the modified Javascript, wherein execution of the modified Javascript by the executing means and execution of the modified Javascript by the second apparatus results in generation of the same URL even in the case where execution of the original Javascript by the executing means and execution of the original Javascript by the second apparatus would not result in generation of the same URL.

In a still further aspect, the present invention relates to a device comprising: a processor; a memory storing a control program to be executed by the processor; and a hardware network interface, wherein the control program comprises: (a) code for receiving via a network connection a HTTP response to a first HTTP GET request for a first URL; at least one of (b1) code for, in the event that the HTTP response includes Javascript and the Javascript includes a call to a random number function, obtaining, from the Javascript, modified Javascript that when executed causes a different function to be executed instead of the random number function, and (b2) at least one of (1) code for, in the event that the HTTP response includes Javascript and the Javascript includes a reference to a date object, obtaining, from the Javascript, modified Javascript that when executed causes a different object to be executed instead of the date object and (2) code for, in the event that the HTTP response includes Javascript and the Javascript includes a reference to a date object, obtaining, from the Javascript, modified Javascript that when executed causes a function different from the date object to be executed instead of the date object; (c) code for executing the modified Javascript; (d) code for sending the modified Javascript via a network connection for receipt by an apparatus that issued a HTTP GET request for the URL, which apparatus receives the modified Javascript and executes the modified Javascript.

In a still further aspect, the present invention relates to an apparatus-implemented method comprising: receiving from a web server, by a first apparatus comprising a memory, data from a HTTP response to a HTTP GET request for a URL; at least one of (a) in the event that the data includes Javascript and the Javascript includes a call to a random number function, obtaining by the first apparatus, based on the Javascript, modified Javascript that when executed causes a different function to be executed instead of the random number function, and (b) in the event that the data includes Javascript and the Javascript includes an invocation of the date object default constructor, obtaining by the first apparatus, based on the Javascript, modified Javascript that when executed causes execution of code other than the invocation of the date object default constructor. Optionally, one or more of the following is satisfied: (1) the method comprises (a); (2) the method further comprises generating, by the first apparatus in response to a second apparatus generating a HTTP GET request for the URL, of a HTTP GET request for the URL; (3) the method further comprises executing, by a second apparatus which had generated a HTTP GET request for the URL, of the modified Javascript.

In yet another aspect, the present invention relates to a non-transitory, tangible computer-readable memory medium in which is stored instructions that when executed by a processor effect the foregoing method.

Optionally, one or more of the following is satisfied: (1) the method comprises (b); (2) the method further comprises generating, by the first apparatus in response to a second apparatus generating a HTTP GET request for the URL, of a HTTP GET request for the URL; (3) the method further comprises executing, by a second apparatus which had generated a HTTP GET request for the URL, of the modified Javascript. In another aspect, the present invention relates to a non-transitory, tangible computer-readable memory medium in which is stored instructions that when executed by a processor effect the foregoing method.

In a still further aspect, the present invention relates to a method comprising: at least one of (a) modifying, by a first apparatus comprising a memory and a processor, of Javascript included in HTML web page data received via a network connection from a web server, such that in a case that the Javascript uses a random number function to generate a URL, the modified Javascript uses different programming instead of the random number function to generate a URL, and (b) modifying, by a first apparatus comprising a memory and a processor, of Javascript included in HTML web page data received via a network connection from a web server, such that in a case that the Javascript uses a date object to generate a URL, the modified Javascript uses programming different from the date object to generate a URL (or the modified Javascript generates a URL by using programming different from and in place of that used by the date object); sending the modified Javascript from the first apparatus for receipt by a second apparatus via a network connection; and executing by both the first apparatus and the second apparatus of the modified Javascript so that when the first apparatus executes the modified Javascript to request a URL generated using the different programming and receives a first image in response to the request, and the second apparatus executes the modified Javascript to request a URL generated using the different programming and receives a second image in response to the request, the first image and the second image are the same. Optionally, one or more of the following is satisfied: (1) wherein the method comprises (a); (2) wherein the first image and the second image are advertisements; (3) wherein the URL generated by the first apparatus using the different programming and the URL generated by the second apparatus using the different programming are the same, even in a case where URL generation by the first apparatus using the unmodified Javascript and URL generation by the second apparatus using the unmodified Javascript would have resulted in different URLs; (4) the method comprises (b); (5) the first image and the second image are advertisements; (6) the URL generated by the first apparatus using the different programming and the URL generated by the second apparatus using the different programming are the same, even in a case where URL generation by the first apparatus using the unmodified Javascript and URL generation by the second apparatus using the unmodified Javascript would have resulted in different URLs.

In yet another, additional aspect, the present invention relates to a method comprising: receiving an HTTP response from a first apparatus; at least one of (a) editing, by a second apparatus comprising a memory, of Javascript in the HTTP response to change an algorithm used for random number-based URL generation, and (b) editing, by a second apparatus comprising a memory, of Javascript in the HTTP response that performs chronologically-based URL generation to change an algorithm used for the chronologically-based URL generation; and sending, by the second apparatus, of the edited Javascript to a third apparatus. Optionally, one or more of the following is satisfied: (1) wherein the method comprises (b); (2) wherein the chronologically-based URL generation uses a date when generating a URL; (3) the chronologically-based URL generation uses a time when generating a URL; (4) the chronologically-based URL generation generates a URL using at least a date and a time; (5) the method further comprises executing by the second apparatus and by the third apparatus of the edited Javascript; (6) a tangible memory medium stores program instructions that when executed cause a computer to effect the method.

In yet a still further aspect, the present invention relates to a first apparatus comprising: means for, in a case where a second apparatus has generated a first HTTP GET request for a first URL, receiving from a web server data from a HTTP response to a HTTP request for the first URL; means for, in the event that the data from the HTTP response includes Javascript and the Javascript includes a reference to a date object, obtaining, based on the Javascript, modified Javascript that when executed causes a different construct to be executed instead of the date object, wherein a memory and a processor are included in the first apparatus. Optionally, one or more of the following conditions is satisfied: (1) the first apparatus further comprises means for sending the modified Javascript for receipt by the second apparatus; (2) the first apparatus further comprises means for sending data in accordance with the modified Javascript for receipt by the second apparatus; (3) wherein the data from the HTTP response is the HTTP response; (4) the first apparatus further comprises means for, in response to the generation by the second apparatus of the first HTTP GET request, generating a second HTTP GET request for the first URL; (5) the first apparatus further comprises means for executing the modified Javascript, wherein the different construct is a construct that returns a different date/time combination from the date object.

In an additional aspect, the present invention relates to a first apparatus comprising: means for receiving via a network connection, in a case where a first HTTP GET request for a first URL has been generated by a web browser of a second apparatus, first data from which the first URL can be obtained; means for receiving, from a web server associated with the first URL, a HTTP response to a HTTP GET request for the first URL; means for obtaining Javascript in accordance with Javascript in the HTTP response such that in the event that Javascript in the HTTP response makes use of web browser-specific information to generate a URL, the execution of the obtained Javascript uses web browser-specific information relating to the web browser of the second apparatus when generating the URL, and means for executing the obtained Javascript, wherein a memory and processor are included in the first apparatus. Optionally, one or more of the following conditions may be satisfied: (1) the first apparatus further comprises means for receiving via a network connection the web browser-specific information relating to the web browser of the second apparatus, wherein the web browser-specific information relates to a characteristic of the web browser; (2) wherein the web browser-specific information comprises web browser window geometry; (3) the first apparatus further comprises means for generating, in accordance with the first data, a second HTTP GET request for the first URL; (4) the first apparatus further comprises means for generating Javascript which, when processed by the web browser of the second apparatus, causes the second apparatus to send the web browser-specific information to another apparatus; (5) wherein the Javascript that causes the second apparatus to send the web browser-specific information to another apparatus comprises Javascript that places the web browser-specific information in a URL of a HTTP GET request; (6) wherein the Javascript that causes the second apparatus to send the web browser-specific information to another apparatus comprises Javascript that places the web browser-specific information in data of a PUT request; (7) wherein the Javascript that causes the second apparatus to send the web browser-specific information to another apparatus comprises Javascript that places the web browser-specific information in data of a POST request; (8) wherein the Javascript that causes the second apparatus to send the web browser-specific information to another apparatus comprises Javascript that places the web browser-specific information in a cookie sent via a HTTP transaction; (9) wherein the Javascript that causes the second apparatus to send the web browser-specific information to another apparatus comprises (a) Javascript that causes the web browser of the second apparatus to obtain the web browser-specific information from the web browser's Javascript Document Object Model (DOM) and (b) Javascript that causes the web browser of the second apparatus to send the obtained web browser-specific information for receipt by the first apparatus; (10) wherein the web browser-specific information includes a window width; (11) wherein the web browser-specific information includes a window height; (12) wherein the web browser-specific information includes an available width; (13) wherein the web browser-specific information includes an available height; (14) wherein the web browser-specific information includes a color depth; (15) wherein the web browser-specific information includes a pixel depth; (16) wherein the web browser-specific information includes a timezone; (17) wherein the web browser-specific information includes a Java-enabled query result; (18) wherein the web browser-specific information includes browser history information; (19) wherein the web browser-specific information includes windows geometry information, and wherein the second apparatus executes a HTTP GET request for a URL, which URL depends upon the window geometry information, to send the windows geometry information for receipt by the first apparatus; (20) the web browser-specific information includes a browser identity; (21) wherein the web browser-specific information includes a browser version; (22) wherein the web browser-specific information includes browser compatibility information; (23) wherein the web browser-specific information includes information on installed browser plugins; (24) wherein the information on installed browser plugins includes information on whether Adobe Flash is an installed browser plugin; (25) wherein a client proxy inserts Javascript into a HTTP response such that when the web browser of the second apparatus executes the Javascript, the web browser generates a HTTP request used to send the web browser-specific information to the first apparatus (the client proxy may be part of the second apparatus or in a separate apparatus, for example); (26) wherein a client proxy inserts Javascript into a HTTP response such that when the web browser of the second apparatus executes the Javascript, the Javascript causes the web browser to generates a HTTP request comprising the web browser specific information, and wherein the client proxy receives the HTTP request and sends the web browser specific information to the first apparatus.

In a still further aspect, the present invention relates to a first apparatus comprising: means for receiving via a network connection web browser-specific information regarding a characteristic of a web browser of a second apparatus; and means for executing Javascript that makes use of web browser-specific information, using the received web browser-specific information relating to the web browser of the second apparatus instead of web browser-specific information relating to a web browser of the first apparatus, wherein a memory is included in the first apparatus. Optionally, one or more of the following may be satisfied: (1) wherein the web browser-specific information includes browser window geometry information, and wherein the second apparatus executes a HTTP GET request for a URL, which URL depends upon the browser window geometry information, to send the browser window geometry information for receipt by the receiving means; (2) wherein the web browser-specific information comprises one or more of window size information, color depth, and timezone information.

In yet another aspect, the present invention relates to a first apparatus comprising: a processor; a memory storing a control program to be executed by the processor; and a hardware network interface, wherein the control program comprises code by which the control program is configured to: (a) receive, via a network connection, web browser-specific information of a second apparatus; and (b) execute Javascript such that in a case that the Javascript includes Javascript that generates a URL which relies upon web browser-specific information, the received web browser-specific information is selected to be used to generate the URL which relies upon web browser-specific information.

Still further, in an additional aspect, the present invention relates to an apparatus-implemented method comprising: receiving, by a first apparatus comprising a memory and a processor, via a network connection, in a case where a first HTTP GET request for a URL has been generated by a web browser of a second apparatus, data from which the URL can be obtained; receiving via a network connection web browser-specific information regarding a characteristic of the web browser of the second apparatus; receiving, from a web server associated with the URL, a HTTP response to a HTTP GET request for the URL; obtaining Javascript in accordance with Javascript in the HTTP response to the second HTTP GET request, wherein in the event that the Javascript in the HTTP response includes Javascript that makes use of web browser-specific information, the obtained Javascript when executed uses the received web browser-specific information relating to the web browser of the another apparatus; and executing the obtained Javascript.

Also, the present invention relates to a tangible memory medium storing a program that when executed by a system including a hardware component effects the foregoing method.

In yet a further aspect, the present invention relates to a method comprising: receiving, by a first apparatus comprising a processor and a memory, via a network connection, of web browser-specific information relating to a web browser of a second apparatus, the information describing a characteristic of the web browser; and executing Javascript that makes use of web browser-specific information, using the received web browser-specific information relating to the web browser of the second apparatus instead of web browser-specific information relating to a web browser of the first apparatus. Optionally, one or more of the following may be satisfied: (1) wherein the web browser-specific information includes browser geometry information, and wherein said receiving step receives the browser geometry information when the second apparatus executes a HTTP GET request for a URL, the URL including information from which the browser geometry information can be obtained; (2) a non-transitory storage medium comprises a program that effects the foregoing method.

Still further, the present invention also relates to a method comprising: receiving, by a first apparatus comprising a processor and a memory, of window size information of a web browser of a second apparatus, which window size information the web browser of the second apparatus uses to request an image; and using, by the first apparatus, the received window size information to pre-fetch that same image for the second apparatus.

And additionally, the present invention relates to an apparatus-implemented method comprising: receiving by a first apparatus comprising a processor, via a network connection, of Javascript from a HTTP response; injecting, by the first apparatus into the Javascript, of code that, when executed by a web browser of a second apparatus, causes window geometry information of the web browser to be sent via a network connection to the first apparatus.

Still further, the present invention relates to a first apparatus comprising: means for receiving via a network connection, in a case where a first HTTP GET request for a first URL has been generated by a second apparatus, first data from which the first URL can be obtained; means for receiving, from a web server associated with the first URL, second data from a HTTP response to a HTTP GET request for the first URL; cookie information receiving means for receiving via a network connection cookie information corresponding to a cookie of a first web browser of the second apparatus, wherein the cookie information is received separately from cookie fields of an HTTP header; and means for storing the cookie information, wherein a memory and processor are included in the first apparatus. Optionally, one or more of the following may be satisfied: (1) wherein in response to the first web browser of the second apparatus generating a HTTP GET request that uses a cookie, a client proxy obtains cookie information in accordance with the cookie and sends the cookie information to said cookie information receiving means; (2) wherein the client proxy is a program stored in a memory of the second apparatus; (3) wherein the client proxy is a transparent proxy apparatus separate from the first apparatus and the second apparatus; (4) wherein in response to a HTTP response sent to the first web browser of the second apparatus including a set cookie request, a client proxy obtains cookie information in accordance with the set cookie request and sends the cookie information to said cookie information receiving means; (5) wherein the client proxy is a program stored in a memory of the second apparatus; (6) wherein the client proxy is a transparent proxy apparatus separate from the first apparatus and the second apparatus; (7) the first apparatus further comprises: a second web browser configured to generate a second HTTP GET request for a second URL; means for determining, based on the stored cookie information, if the first web browser were to have generated a request for the second URL, whether such request would use a cookie; and means for, if said determining means determines that a request for the second URL would use a cookie if it had been generated by the first web browser, attaching a cookie from the stored cookie information to the second HTTP GET request to form a modified second HTTP GET request; (8) the first apparatus further comprises means for receiving, from a web server associated with the second URL, third data from a HTTP response to the modified second HTTP GET request for the second URL; and means for forming a second HTTP response which includes the third data and the cookie from the stored cookie information, wherein said second web browser receives the second HTTP response as a response to the second HTTP GET request. Optionally, one or more of the following may be satisfied: (1) wherein the first web browser also receives the third data; (2) the first apparatus further comprises means for updating cookie information stored in said second web browser in accordance with the cookie from the stored cookie information; (3) the second HTTP GET request is generated in accordance with the second data; (4) wherein said cookie information receiving means receives the cookie information from a client proxy, the client proxy either being part of or separate from the second apparatus.

Additionally, the present invention relates to a first apparatus comprising: means for receiving via a network connection, in a case where a first HTTP GET request for a first URL has been generated by a second apparatus, first data from which the first URL can be obtained; means for receiving, from a web server associated with the first URL, second data from a HTTP response to a HTTP GET request for the first URL; cookie information receiving means for receiving via a network connection cookie information corresponding to a cookie of a first web browser of the second apparatus, the cookie information being other than cookie information from a HTTP header; and means for storing the cookie information; a second web browser adapted to generate a second HTTP GET request for a second URL; means for determining, based on the stored cookie information, if the first web browser were to have generated a request for the second URL, whether such request would use a cookie; and means for, if said determining means determines that a request for the second URL would use a cookie if it had been generated by the first web browser, attaching a cookie from the stored cookie information to the second HTTP GET request to form a modified second HTTP GET request; means for receiving, from a web server associated with the second URL, third data from a HTTP response to the modified second HTTP GET request for the second URL; and means for updating cookie information stored in said second web browser in accordance with the cookie from the stored cookie information, wherein a memory and processor are included in the first apparatus, wherein in response to the first web browser of the second apparatus generating a HTTP GET request that uses a cookie, a client proxy obtains cookie information in accordance with the cookie and sends the cookie information to said cookie information receiving means, wherein in response to an HTTP response sent to the first web browser of the second apparatus including a set cookie request, a client proxy obtains cookie information in accordance with the set cookie request and sends the cookie information to said cookie information receiving means, and wherein the first web browser also receives the third data. Optionally, the following may be satisfied: wherein said updating means includes means for attaching the cookie from the stored cookie information to a HTTP response to the second HTTP GET request which is received by said second web browser.

Still further, the present invention, in another aspect, also relates to a device comprising: a processing unit comprising a processor; and a memory unit storing a control program to be executed by the processing unit, said memory unit comprising a memory, wherein the control program is configured to: (a) receive via a network connection data relating to a URL of a first HTTP GET request, the first HTTP GET request having been generated by a web browser of a client apparatus; (b) generate a second HTTP GET request for the URL; (c) receive, from an apparatus corresponding to the URL, a HTTP response to the second HTTP GET request; (d) receive, via a network connection, cookie information corresponding to a cookie of the web browser of the client apparatus, the cookie information being separate from information in a cookie field of an HTTP header; and (e) store the cookie information.

Further, in another aspect, the present invention relates to a method comprising: a first receiving step, performed by an apparatus comprising a processor and a memory, of receiving via a network connection data relating to a URL from a first HTTP GET request, the first HTTP GET request having been generated by another apparatus; generating, in accordance with the received data, a second HTTP GET request for a URL; a second receiving step of receiving, from a web server associated with the URL, a HTTP response to the second HTTP GET request, the HTTP response having been generated by the web server; a third receiving step of receiving via a network connection cookie information corresponding to a cookie of a web browser of the another apparatus, the cookie information being apart from an HTTP header's cookie fields; and storing the cookie information. A memory may store a program that when executed by an apparatus effects the foregoing method.

Still further, in another aspect, the present invention relates to a first apparatus comprising: means for receiving, from a web server, first data from a first HTTP response generated by the web server in response to a first HTTP GET request for a first URL generated by a web browser in a second apparatus; and means for causing the web browser to receive a second HTTP response that differs from the first HTTP response in that the second HTTP response contains data which causes the web browser to generate a second HTTP request in response to a web page received in response to the first HTTP GET request reaching a specified stage of loading in the web browser, wherein a memory and processor are included in the first apparatus. Optionally, one or more of the following may be satisfied: (1) wherein the second HTTP response includes data which causes the web browser to generate the second HTTP request in response to the end of the web page's HTML response having been parsed; (2) wherein the second HTTP response includes data which causes the web browser to generate the second HTTP request in response to the web browser generating a page load Javascript event; (3) wherein a timing of the first HTTP GET request is a start time of a time interval for loading of the web page; (4) wherein the timing of the second HTTP request is a finish time of the time interval for loading of the web page; (5) wherein the second HTTP response includes data which causes the web browser to generate the second HTTP request in response to the web browser generating a page load Javascript event, and wherein the time interval for loading of the web page is measured according to the start time and the finish time; (6) wherein said causing means comprises modifying means for obtaining, from the first data, modified first data which is included in the second HTTP response, wherein said modifying means modifies markup language code in the first data such that the web browser of the second apparatus, by processing the modified markup language code, generates the second HTTP request; (7) wherein the markup language code is HTML code, and wherein said causing means comprises means for sending data relating to the modified markup language code for receipt by the second apparatus so that the web browser processes the modified markup language code; (8) wherein the markup language code comprises HTML code, and wherein said modifying means comprises means for inserting Javascript into the HTML code to produce the modified markup language code; (9) wherein the inserted Javascript comprises a page load event handler; (10) wherein the page load event handler corresponds to an event that the web page has finished loading in the web browser; (11) wherein the page load event handler, when executed by the web browser, generates the second HTTP request; (12) wherein the second HTTP request is a request for a URL that contains text dependent upon a time; (13) wherein the time is a time when the page load event handler is invoked.

And another aspect of the present invention is a first apparatus comprising: a processor; a memory storing a control program to be executed by the processor; and a hardware network interface, wherein the control program comprises programming code instructions by which the control program is configured to: (a) receive via a network connection first data from a first HTTP response to a first HTTP GET request for a URL generated by a web browser in a second apparatus; and (b) causing the web browser to receive a second HTTP response that differs from the first HTTP response in that the second HTTP response contains data which causes the web browser to generate a second HTTP request in response to a web page received in response to the first HTTP GET request reaching a specified stage of loading in the web browser. Optionally, any one or more of the following may be satisfied: (1) wherein the second HTTP response includes data which causes the web browser to generate the second HTTP request in response to the end of the web page's HTML response having been parsed; (2) wherein the second HTTP response includes data which causes the web browser to generate the second HTTP request in response to the web browser generating a page load Javascript event; (3) wherein a timing of the first HTTP GET request is a start time of a time interval for loading of the web page; (4) wherein the timing of the second HTTP request is a finish time of the time interval for loading of the web page; (5) wherein the second HTTP response includes data which causes the web browser to generate the second HTTP request in response to the web browser generating a page load Javascript event, and wherein the time interval for loading of the web page is measured according to the start time and the finish time.

Another aspect of the present invention is: an apparatus-implemented method comprising: receiving by a first apparatus comprising a processor, from a web server, first data from a first HTTP response generated by the web server in response to a first HTTP GET request for a first URL generated by a web browser in a second apparatus; and causing the web browser to receive a second HTTP response that differs from the first HTTP response in that the second HTTP response contains data which causes the web browser to generate a second HTTP request in response to a web page received in response to the first HTTP GET request reaching a specified stage of loading in the web browser. Optionally, one or more of the following may be satisfied: (1) wherein the second HTTP response includes data which causes the web browser to generate the second HTTP request in response to the end of the web page's HTML response having been parsed; (2) wherein the second HTTP response includes data which causes the web browser to generate the second HTTP request in response to the web browser generating a page load Javascript event; (3) wherein the timing of the first HTTP GET request is a start time of a time interval for loading of the web page; (4) wherein the timing of the second HTTP request is a finish time of the time interval for loading of the web page; (5) wherein the second HTTP response includes data which causes the web browser to generate the second HTTP request in response to the web browser generating a page load Javascript event, and wherein the time interval for loading of the web page is measured according to the start time and the finish time; (6) wherein said causing comprises: modifying the first data to obtain modified first data which is included in the second HTTP response; and sending by the first apparatus of data relating to the modified first data to the second apparatus for execution by the second apparatus's web browser, and wherein the modified first data, upon execution by the web browser, causes the web browser to generate the second HTTP request; (7) wherein said modifying comprises injecting Javascript into the first data to obtain the modified first data, and wherein the Javascript includes Javascript that, upon execution by the web browser, generates the second HTTP request for a second URL; (8) wherein the second URL is a function of time; (9) wherein the Javascript includes a page load event handler that is configured to, in response to a web page load completion event, generate the second HTTP request; (10) a tangible, non-transitory apparatus-readable memory storage medium may store program code instructions that upon execution automatically effect the method.

In another aspect, the present invention relate to a method comprising: injecting, by a first apparatus comprising a processor and a memory, of Javascript into a HTTP response to be received by a second apparatus that generated a first HTTP GET request to which the HTTP response corresponds, wherein the Javascript includes Javascript which was not present in the HTTP response before the injection and which, upon execution by the second apparatus, causes the second apparatus to generate a second HTTP request in response to a web page received in response to the first HTTP GET request reaching a specified stage of loading in the second apparatus. A non-ephemeral computer-readable memory may store a program that effects the method when executed by a computer.

In the foregoing, preferably the second HTTP request is an HTTP GET request.

And another aspect of the present invention is an apparatus-implemented method comprising: receiving by a first apparatus comprising a processor, via a network connection, of Javascript from a HTTP response; and injecting, by the first apparatus into the Javascript, of a page load event handler that is triggered in response to finishing of loading of a web page by a web browser. Optionally, one or more of the following may be satisfied: (1) wherein the page load event handler generates a HTTP GET request in response to the finishing of loading of a web page; (2) wherein the page load event handler generates a HTTP POST request in response to the finishing of loading of a web page; (3) wherein the page load event handler generates a HTTP PUT request in response to the finishing of loading of a web page; (4) further comprising sending, via a network connection to a second apparatus, the Javascript having been injected with the page load event handler; (5) wherein the second apparatus executes the injected Javascript and the page load event handler generates a HTTP GET request in response to the finishing of loading by a web browser of the second apparatus of a web page.

In another aspect, the present invention relates to a first apparatus comprising: means for receiving, from a web server, first data from a first HTTP response generated by the web server in response to a first HTTP GET request for a first URL generated by a web browser in a second apparatus; modifying means for obtaining, from the first data, modified first data; and means for sending data relating to the modified first data such that a second HTTP response containing the modified first data is received by the web browser as a response to the first HTTP GET request, wherein said modifying means inserts Javascript into HTML code within the first data to produce the modified first data, wherein the inserted Javascript comprises a page load event handler which, when executed by the web browser, generates a second HTTP request, wherein a timing of the first HTTP GET request is a start time of a time interval for loading of a web page, wherein a timing of the second HTTP request is a finish time of the time interval for loading of the web page, and wherein a time interval for loading of the web page is measured according to the start time and the finish time.

Still further, in another aspect, the present invention relates to an apparatus-implemented method carried out by a system comprising a processor and a memory, the method comprising: receiving, by a client proxy, of a first HTTP GET request generated by a web browser of a client apparatus for a first URL; recording, by the client proxy, of time of receipt of the first HTTP GET request; editing, by the client proxy, of Javascript to provide code configured to cause the web browser of the client apparatus to generate a second HTTP request; sending, by the client proxy, to the web browser of the client apparatus of an HTTP response comprising the code; generating by the web browser of the client apparatus of the second HTTP request in response to receipt of the HTTP response comprising the code; receiving, by the client proxy, of the second HTTP request; recording, by the client proxy, of time of receipt of the second HTTP request; and computing a response time in accordance with a difference between the time of receipt of the first HTTP GET request as recorded by the client proxy and the time of receipt of the second HTTP request as recorded by the client proxy. Optionally, one or more of the following may be satisfied: (1) wherein the code is configured such that the second HTTP request is a last HTTP GET request carried out by the web browser when processing the HTTP response; (2) wherein the code comprises an end-of-page event handler.

In the foregoing, the second HTTP request is preferably a HTTP GET request.

These and other objects, aspects, advantages and features of the present invention will become more apparent from the following detailed description of the presently preferred embodiments taken in conjunction with the accompanying drawings.

BRIEF DESCRIPTION OF THE DRAWINGS

FIG. 2(a) depicts the physical features within the client sub-system and FIG. 2(b) depicts the software features within the client sub-system.

FIG. 3(a) depicts the physical features within the ISP sub-system and FIG. 3(b) depicts the software features within the ISP sub-system.

FIG. 12 comprises FIGS. 12(a) and 12(b) which show Javascript code relating to the re-definition of the Math.random( ) function according to the present invention, where FIG. 12(a) shows the original Javascript code and FIG. 12(b) shows the modified Javascript code with the re-defined Math.random( ) function.

FIG. 13 comprises FIGS. 13(a) and 13(b) which show Javascript code relating to the addition of the RandomNew( ) function according to the present invention, where FIG. 13(a) shows the original Javascript code and FIG. 13(b) shows the modified Javascript code.

FIG. 24 comprises FIGS. 24(a) and 24(b) which show sample Javascript code within a HTML document which requests URLs.

FIG. 25(a) depicts the physical features within the client sub-system and FIG. 25(b) depicts the software features within the client sub-system.

FIG. 26 comprises FIGS. 26(a) and 26(b) which show sample C# code for implementing the web page response time feature of the present invention.

DETAILED DESCRIPTION OF THE PREFERRED EMBODIMENTS

First Embodiment

(1) General Description

Figure 1:
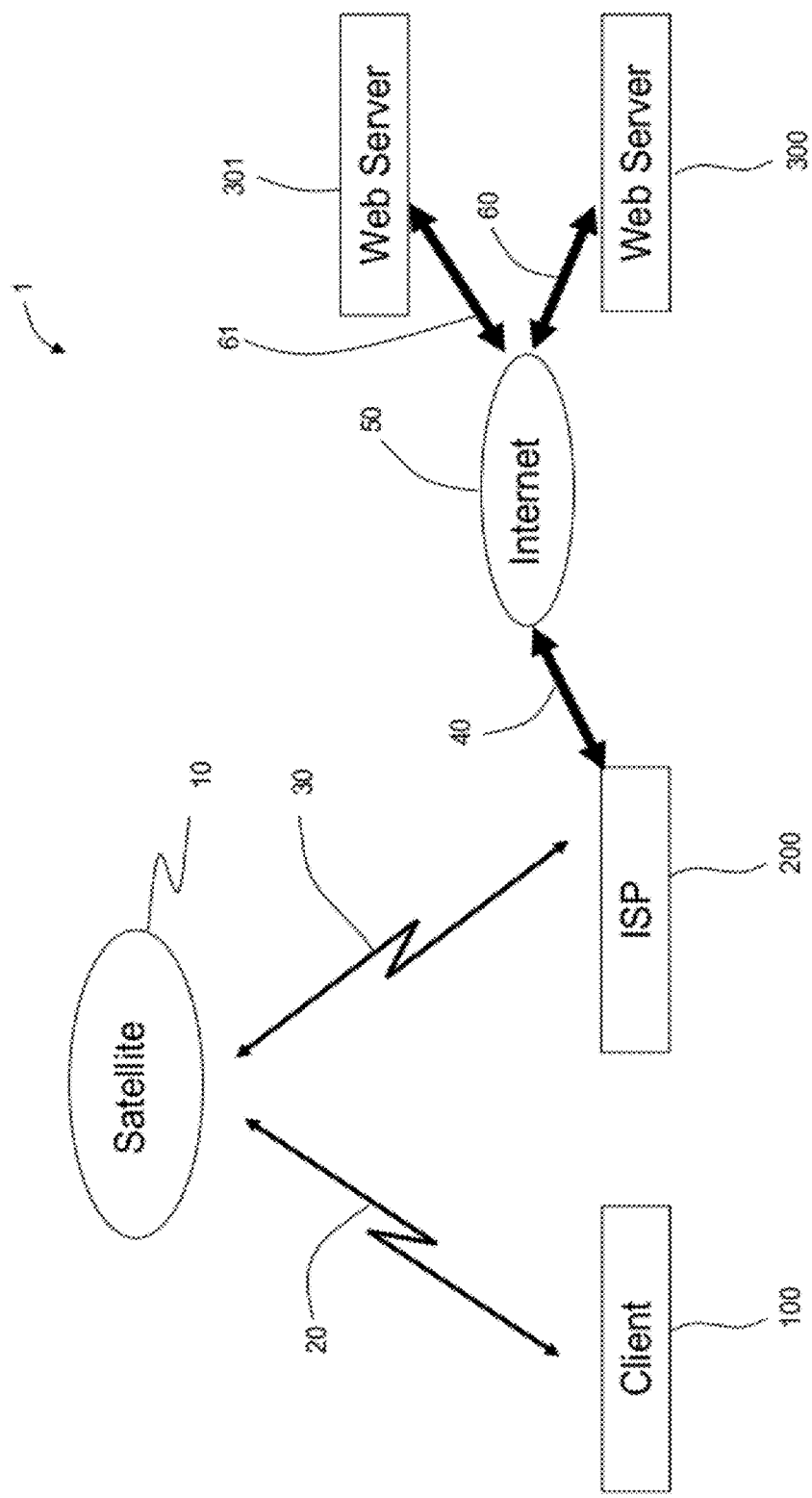
FIG. 1 is a schematic diagram showing a satellite communications system in accordance with the present invention.

FIG. 1 shows an embodiment of the present invention. Reference numeral 1 denotes a satellite communications system of the present invention. That system includes a client sub-system 100 and an Internet Service Provider (ISP) sub-system 200. System 1 is intended to provide Internet connectivity for client sub-system 100. While sub-system 200 is described as being a sub-system of an Internet Service Provider, it is not so limited and can represent any sub-system providing the describing functions. In other words, sub-system 200 does not have to be a Internet Service Provider.

Client sub-system 100 communicates with ISP sub-system 200 by transmitting and receiving signals over a satellite network link 20 with satellite 10. ISP sub-system 200 communicates with client sub-system 100 by transmitting and receiving signals over a satellite network link 30 with satellite 10. Thus, a communication from client sub-system 100 to ISP sub-system 200 is first transmitted through satellite link 20 to satellite 10, which relays it through satellite link 30 to ISP sub-system 200. Conversely, a communication from ISP sub-system 200 to client sub-system 100 is first transmitted through satellite link 30 to satellite 10, which relays it through satellite link 20 to client sub-system 100. Satellite links 20 and 30 are generally high-latency links, due to the inherent delay in transmitting and receiving data over the long distance.

ISP sub-system 200 has a network link 40 to the Internet 50. Thus, ISP sub-system 200 can communicate with web servers 300 and 301 through network links 60 and 61, respectively. As shown, web servers 300 and 301 are connected to the Internet 50 through network links 60 and 61. Web servers 300 and 301 could be, by way of example and not of limitation, web servers on the Internet such as a web server corresponding to the domain name uspto.gov and a web server corresponding to the domain name hughes.net, respectively. Preferably, client sub-system 100, ISP sub-system 200, web server 300, and web server 301 are all associated with IP addresses which are different from each other, and they all represent separate, distinct nodes on a network, each being connected to the network by a network link or network connection.

FIGS. 2(a) and (b) show the client sub-system 100 in further detail. FIG. 2(a) shows a physical representation of client sub-system 100.

Preferably, client sub-system 100 includes a client PC 110 and a router 130. Client PC 110 preferably comprises a central processing unit (CPU) 111, a memory 112, a hardware network interface (such as a network interface card (NIC)) 113, and software 150. CPU 111 may also be referred to as a processor, and preferably comprises hardware circuitry for carrying out computer programming code instructions stored in a memory. Memory 112 may include any physical, non-transitory, tangible, non-ephemeral, computer-readable storage or recording medium such as, for example, one or more of non-volatile memory, random access memory (RAM), read-only memory (ROM), flash memory, a hard drive, etc. CPU 111 and memory 112 are used for executing software 150 on client PC 110. In particular, software 150 includes one or more computer programs each comprising computer programming code instructions to be executed by CPU 111. And while software 150 is schematically depicted as separate from memory 112, software 150 can be stored in memory 112 for execution by CPU 111. Also, while software 150 is schematically depicted as communicating with network interface 113, it will be appreciated that, in actuality, it may be the case that CPU 111 electrically communicates with network interface 113 under the direction of software 150.

Router 130 preferably includes a satellite interface 131, a CPU 132, a memory 133, a hardware network interface 134, and software 160. CPU 132, memory 133, and network interface 134 are constructed like CPU 111, memory 112, and network interface 113 described above. Satellite interface 131 is a hardware network interface for connecting to a satellite dish to send and receive data over a satellite link. In particular, satellite interface 131 communicates with satellite 10 via satellite link 20. The client PC 110 and the router 130 communicate with each other via network link 101. Link 101 preferably is a wired or wireless local-area-network (LAN) according to IEEE 802.x standards, but can be any type of data link or communication network which can transfer data between two devices. If link 101 is a LAN, then NIC 113 and NIC 134 preferably have IP addresses which are different from each other. CPU 132 and memory 133 are used for executing software 160 on router 130, where software 160 comprises one or more programs each comprising computer programming code instructions to be executed by CPU 132. While software 160 is schematically depicted as separate from memory 133, software 160 can be stored in memory 133 for execution by CPU 132. Again, while software 160 is schematically depicted as communicating with network interface 134, it will be appreciated that, in actuality, it may be the case that CPU 132 actually electrically communicates with network interface 134.

FIG. 2(b) schematically shows the software 150 and 160 executed within client PC 110 and router 130, respectively. Software 150 includes (a) a client HTTP web browser 120 such as, for example, the Firefox web browser, which is a computer program for network or Internet web browsing, and (b) a TCP/IP stack 121 which is a computer program for effecting TCP/IP network communications. Client web browser 120 retrieves a web page for a URL specified by a client user (e.g., specified by a person using an input device such as a mouse or keyboard) and displays the retrieved web page on a display screen (e.g., for the person to view). Meanwhile, TCP/IP stack 121 interfaces with network interface 113 to send and receive network data, including data originating from or destined to client browser 120.

Router 130's software 160 includes routing software 140 for routing network traffic to and from link 101. Routing software 140 interfaces with satellite interface 131 to send and receive network data over satellite link 20. Software 160 also includes client proxy software 141 for interfacing with proxy server software in ISP sub-system 200, as discussed later. Client proxy software 141 interfaces with network interface 134 to operate as a proxy between the routing software 140 and the client PC 110. Preferably, router 130 performs a Layer 4 switch function to transparently re-direct HTTP requests to client proxy program 141, but one of ordinary skill in the art would appreciate that any appropriate networking arrangement which gets an HTTP request to the client proxy could be substituted.

Figure 3:
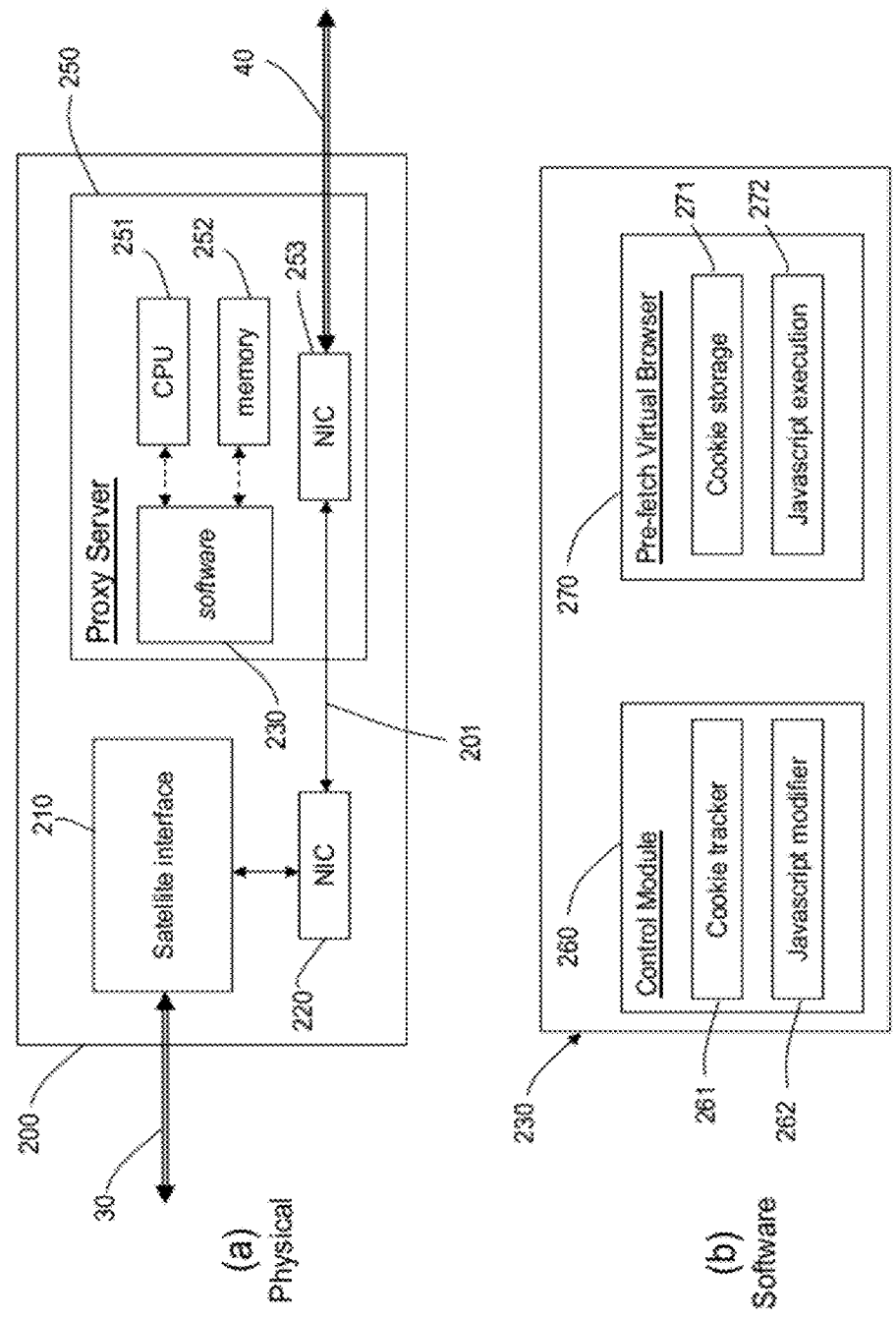
FIG. 3 comprises FIGS. 3(a) and 3(b) which are schematic diagrams showing an Internet Service Provider (ISP) sub-system in accordance with the present invention, where

FIGS. 3(a) and 3(b) show the ISP sub-system 200 in further detail. FIG. 3(a) shows a physical representation of ISP sub-system 200. ISP sub-system 200 includes a satellite interface 210, a hardware network interface 220 such as a NIC, and a proxy server 250. Proxy server 250 is preferably a computer, and includes a CPU 251, a memory 252, software 230, and a hardware network interface 253 such as a NIC. CPU 251 and memory 252 are used for executing software 230 on proxy server 250. CPU 251 and memory 252 are constructed like CPU 111 and memory 112 described above, and software 230 may be stored in memory 252. Software 230 comprises one or more computer programs each comprising computer executable instructions or programming code for execution by CPU 251.

Satellite interface 210 sends and receives data over satellite link 30 and communicates with other devices within ISP sub-system 200 using network interface 220. Network interface 220 communicates with network interface 253 via network link 201 which may be, for example, a LAN link. Proxy server 250 communicates with client sub-system 100 by a network connection that uses links including network link 201, satellite link 30, and satellite link 20. Meanwhile, proxy server 250 communicates with the Internet 50 using network link 40.

FIG. 3(b) shows the software 230 executed within proxy server 250. Software 230 includes a control module 260 (e.g., a computer program) and a pre-fetch virtual browser 270. The latter may be, for example, a HTTP web browser computer program such as Firefox, preferably the Firefox browser having been enhanced to be controlled by an external program such as control module 260. Control module 260 controls the operation of virtual browser 270. Control module 260 also operates as a proxy for virtual browser 270. That is, control module 260 intercepts data requests (e.g., a request for a URL) made by virtual browser 270 and also relays response data (e.g., a response to a request for a URL) to virtual browser 270. Control module 260 further interfaces with client proxy program 141 within router 130 of client sub-system 100, as later discussed.

Control module 260 also includes a cookie tracker module 261 and a Javascript modifier module 262. Cookie tracker module 261 tracks cookies within requests and responses sent by client browser 120 within client PC 110, in coordination with client proxy program 141 within router 130. Javascript modifier module 262 receives HTML and is configured to, when appropriate, modify Javascript within the HTML. Alternatively, module 262 receives Javascript and outputs modified Javascript. Modules 260-262 are preferably implemented as computer programs executed by CPU 251.

Virtual browser 270 comprises a cookie storage module 271 and a Javascript execution module 272. Preferably, virtual browser 270 also includes other components such as, by way of example and not of limitation, an HTML parser, web page renderer, HTTP client, etc. Cookie storage module 271 stores cookies within virtual browser 270 such that when a web page is requested, any cookie or cookies associated with that web page are retrieved and attached with the request. Javascript execution module 272 receives Javascript code within HTML and executes the Javascript. Modules 271-272 are preferably implemented as computer programs executed by CPU 251. The executed Javascript can perform a variety of functions, including requesting a URL for an additional images, a sound clip, a video, or other forms of media. Such a URL can be either static or dynamic. A static URL is a fixed string of text such as, for example, "www.uspto.gov/logo.jpg". On the other hand, a dynamic URL is dynamically generated. For example, a dynamic URL could be defined by the following: "www.uspto.gov/logo-"+SIZE+".jpg", which is dependent on the variable SIZE. Therefore, if SIZE="big", the dynamically-generated URL would be "www.uspto.gov/logo-big.jpg", whereas if SIZE="small", the dynamically-generated URL would be "www.uspto.gov/logo-small.jpg". Thus, upon execution of the Javascript, a URL is dynamically generated.

(2) Operation of Pre-Fetching Feature

Figure 4:
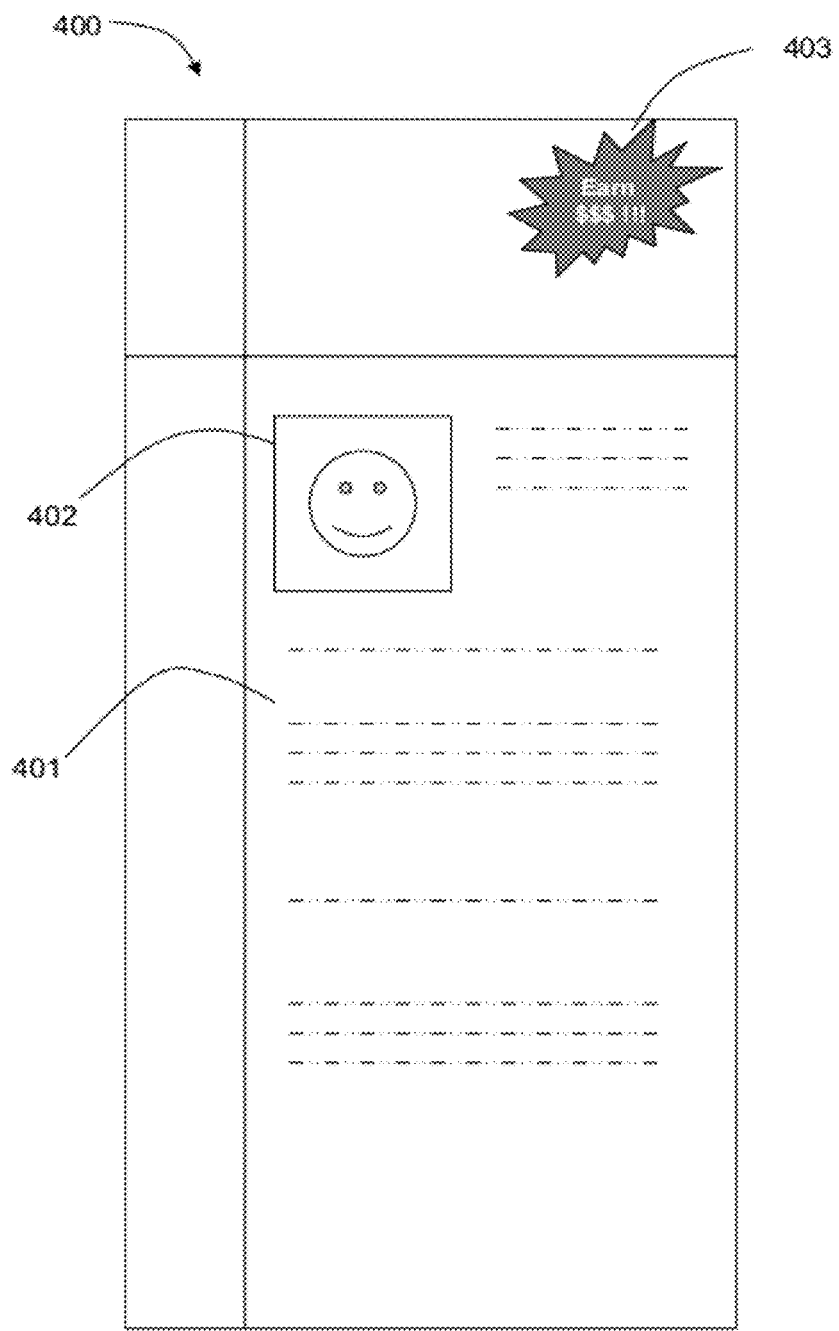
FIG. 4 shows a web page to be obtained by a web browser, in accordance with the present invention.
Figure 5:
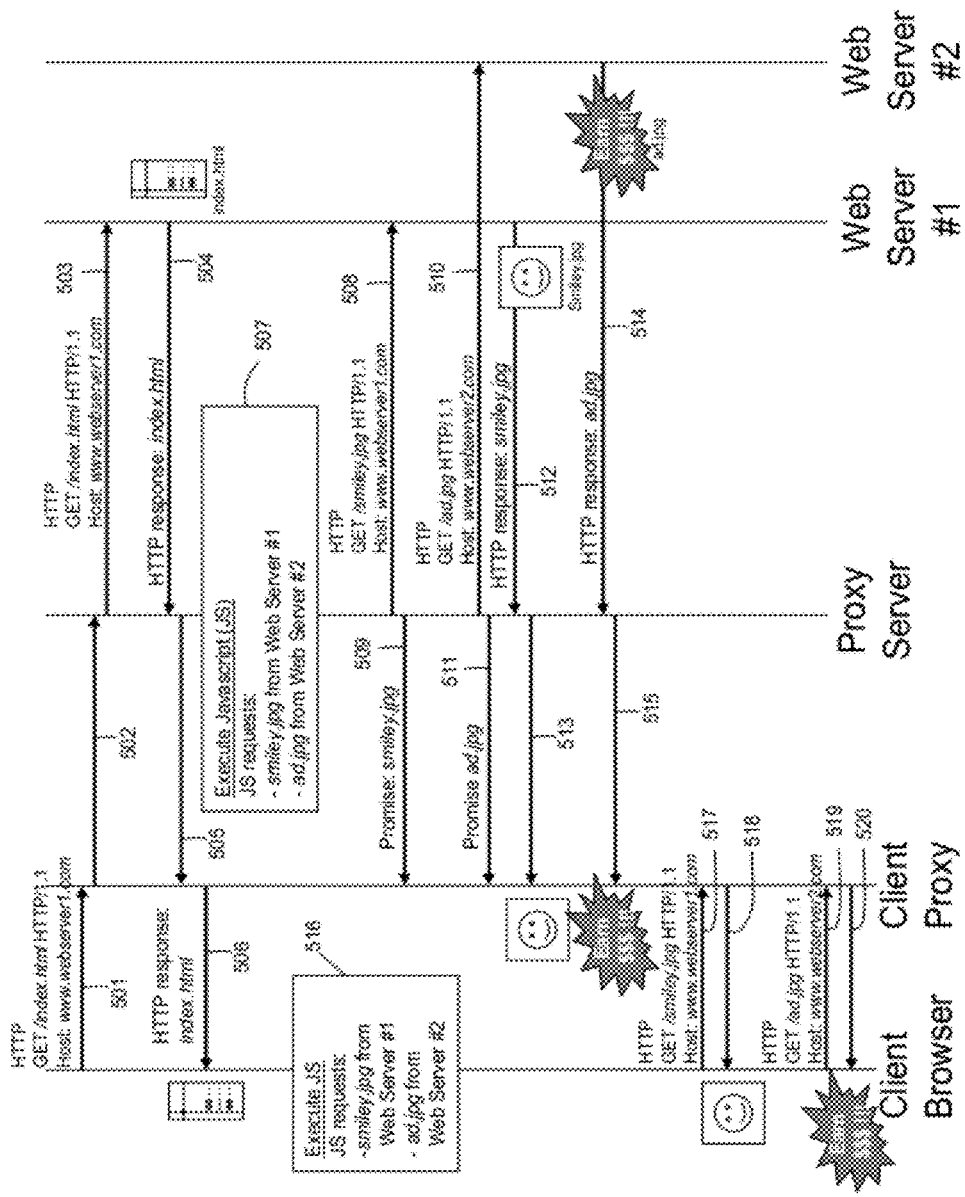
FIG. 5 is a sequence diagram (also colloquially referred to as a ladder diagram or timing diagram) showing the operation of a pre-fetch feature of the present invention.
Figure 6:
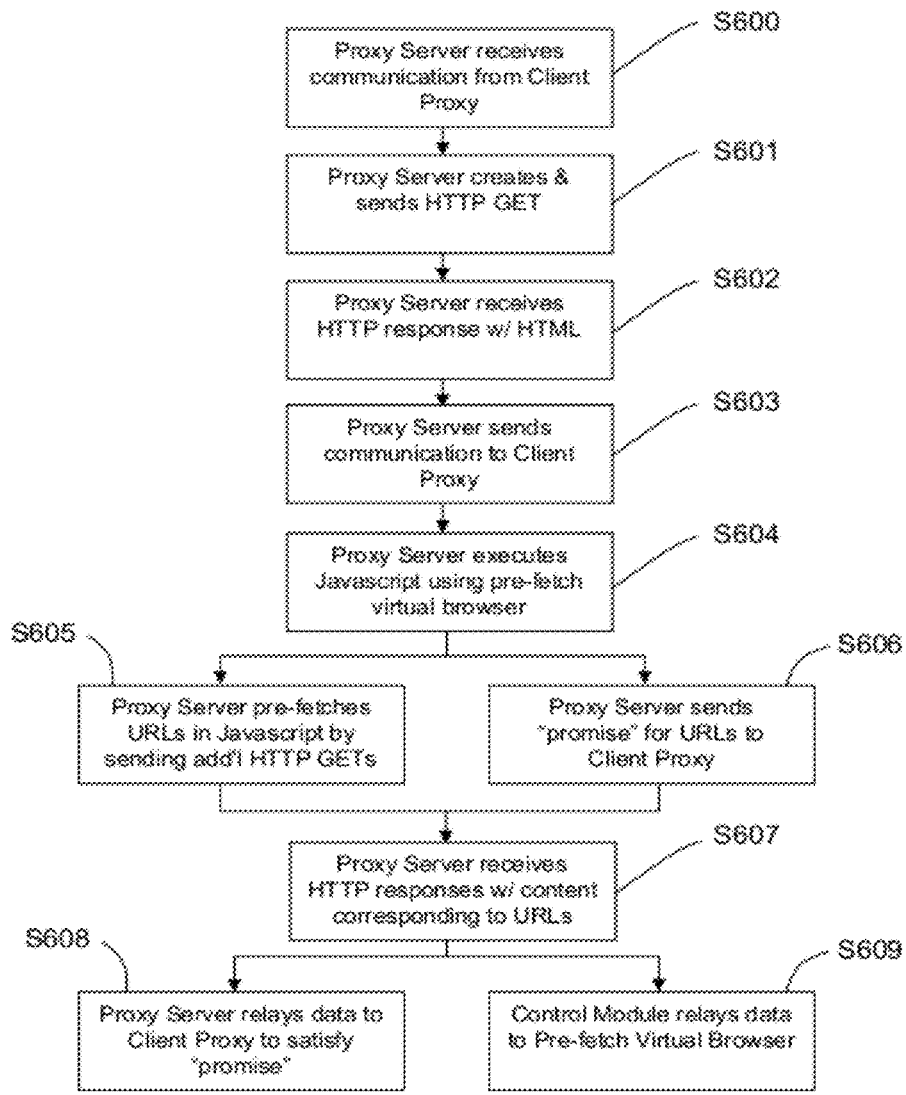
FIG. 6 is a flow diagram showing the pre-fetch feature operation of the proxy server of the present invention.
Figure 7:
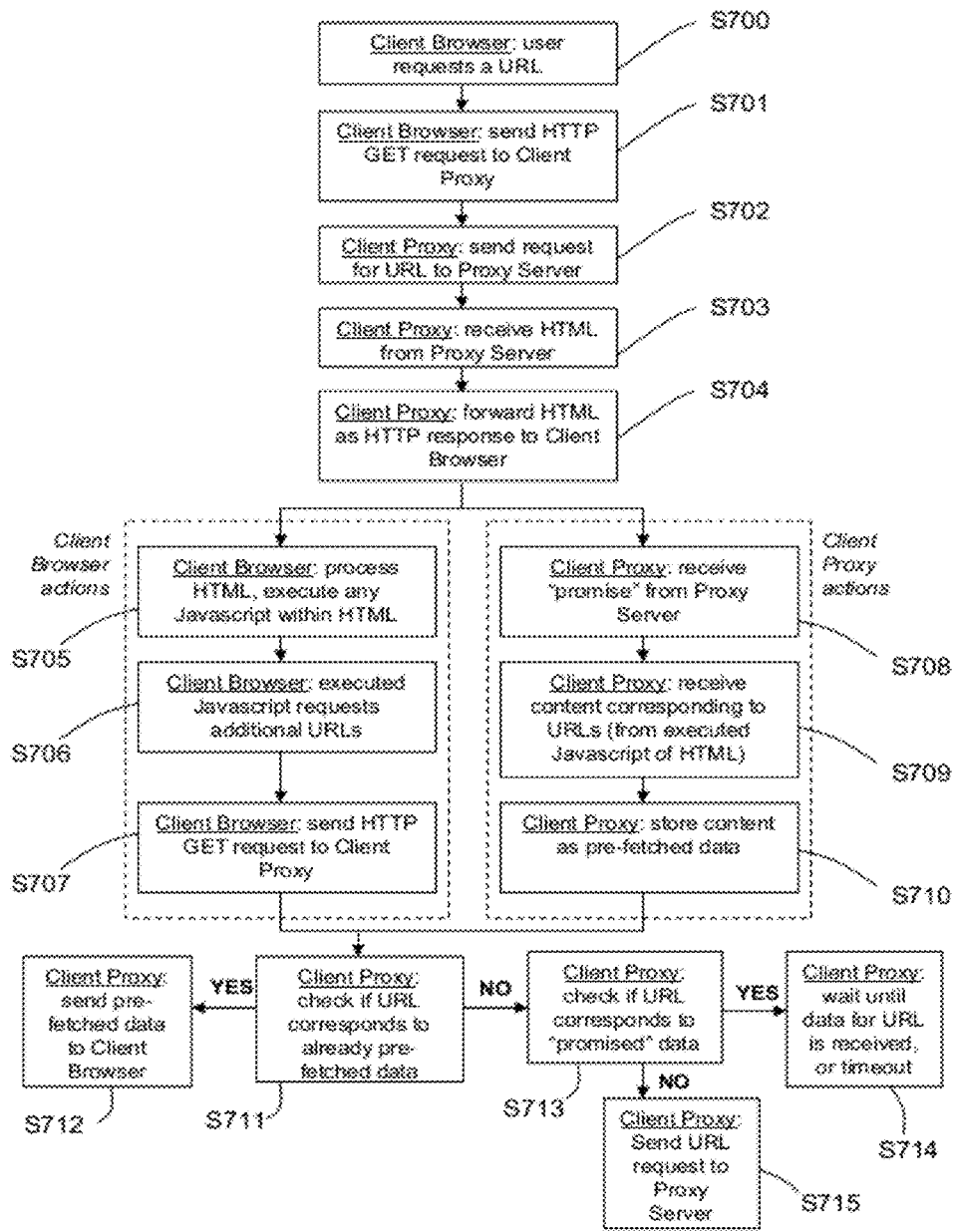
FIG. 7 is a flow diagram showing the interactive pre-fetch feature operations of the client browser and the client proxy program of the present invention.
Figure 8:
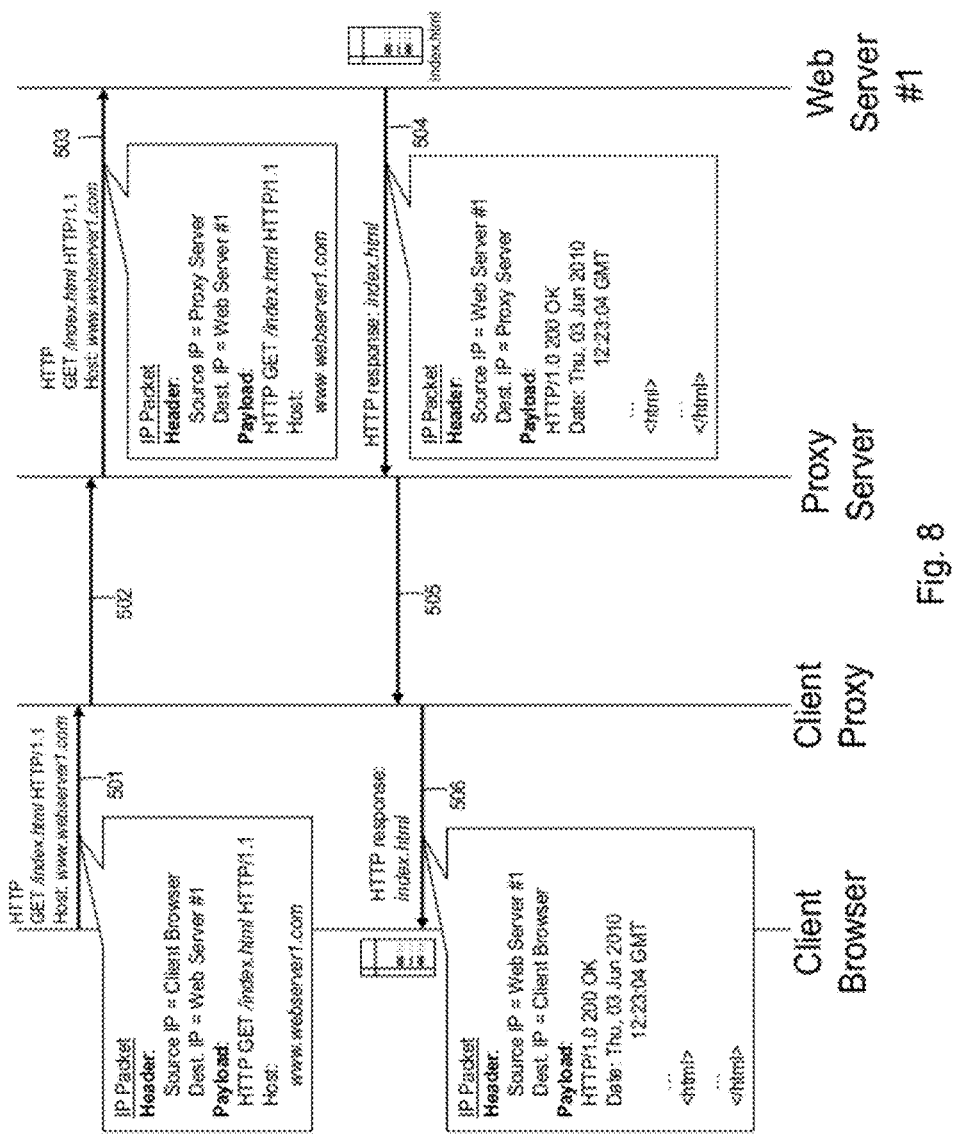
FIG. 8 is a sequence diagram showing the contents of selected transmissions in accordance with the present invention.

FIGS. 4-8 describe the pre-fetching feature of the present invention. FIG. 4 shows an example of a web page 400 that client browser 120 requests (e.g., by generating a HTTP GET request for a URL corresponding to that web page). FIG. 5 shows the communications between the components of system 100. FIG. 6 shows steps for the operation of proxy server 250. FIG. 7 shows steps for the operation of client browser 120 and client proxy program 141. FIG. 8 shows the contents of selected transmissions depicted in FIG. 5.

How client browser 120 loads a web page will now be described. Assume that the web page is an Internet web page which, like many web pages, is formatted in HyperText Markup Language (HTML). First, the user enters a particular Uniform Resource Locator (URL) into the client browser 120. For example, the user types the URL www.webserver1.com/index.html into the address bar of the client browser 120. The client browser 120 then generates a HTTP GET request for that URL. The client browser 120 then receives a HTTP response in response to the HTTP GET request. The HTTP response may, by way of example, include an HTML document containing HTML code that includes both (a) the web page's text, which is to be displayed, and (b) additional links to, for example, an image or other forms of content, which are also to be displayed. The additional links may be static links included in the HTML. Alternatively, the HTML document from the HTTP response may include Javascript that when executed by the client browser generates an additional link (i.e., a dynamically-generated link). The client browser 120 then processes the HTML document by parsing the HTML document, resulting in (a) displaying the web page's text, (b) requesting each additional link (i.e., generating a HTTP GET request for each additional link), and (c) upon receiving the requested content (e.g., in a HTTP response to each respective HTTP GET request), displaying the same.

FIG. 4 shows a specific example. In more detail, as shown therein, web page 400, as displayed on the screen of the client browser 120 when fully loaded, includes text 401, a first image 402 ("smiley.jpg"), and a second image 403 ("ad.jpg") such as an advertisement. In this specific example, the client browser 120 generates a HTTP request for a URL, receives a HTTP response including HTML code, the HTML code comprising (a) text 401, (b) Javascript which when executed generates a URL for first image 402, and (c) Javascript which when executed generates a URL for second image 403. Here, the URLs for first image 402 and second image 403 are dynamically-generated URLs. The client browser 120 creates requests for these dynamically-generated URLs, i.e., the client browser 120 generates a HTTP GET request for the URL for first image 402 and a HTTP GET request for the URL for second image 403. In this example, the URL for first image 402 corresponds to the same web server as the URL of web page 400, whereas the URL for second image 403 corresponds to a separate web server. Sample fragments of Javascript code which create requests for URLs are depicted in FIGS. 24(*a*) and 24(*b*), i.e., these are examples of dynamic URL generation by Javascript.

The operative steps of proxy server 250 will now be described, with reference to FIGS. 5 and 6. First, client browser 120 generates a HTTP GET request for the URL www.webserver1.com/index.html, as discussed above, and client PC 110 sends the same on a network connection as a communication or transmission depicted by reference numeral 501. The above URL corresponds to a particular web server, Web Server #1 in this example. Preferably, HTTP GET request 501 is sent on an HTTP connection where an IP packet has client PC 110's IP address as a source IP address and Web Server #1's IP address as a destination IP address. In more detail, the HTTP GET request 501 is sent out from client PC 110 by way of TCP/IP stack 121 and NIC 113 to link 101, which constitutes sending the HTTP GET request on a network connection.

Client proxy program 141 receives the HTTP GET request 501. In more detail, client proxy program 141 receives the HTTP GET request 501 via NIC 134 (which is connected to link 101). Client proxy program 141, in response to receiving the HTTP GET request, sends communication or transmission 502 to proxy server 250, the communication including data or information relating to communication or transmission 501, as later discussed with respect to FIG. 7. From this data or information, the URL can be obtained; for example, the data or information could comprise or be the URL or even the entire HTTP GET request. In step S600 in FIG. 6, proxy server 250 receives communication or transmission 502 from client sub-system 100. As will be understood, such constitutes receipt of communication or transmission 502 by proxy server 250 via a network connection (i.e., via routing 140, satellite interface 131, link 20, satellite 10, link 30, satellite interface 210, NIC 220, link 201, and NIC 253, for example).

In a preferred embodiment, communication between client sub-system 100 and the ISP sub-system 200 may be transmitted and received according to a non-standard application layer protocol running over a TCP connection. Such a non-standard application layer protocol may be beneficial over an industry-standard format in optimizing data transmission throughput between sub-systems. For example, a proprietary format may compress the data transmission to reduce the total required transmission amount, or may combine multiple requests into a single transmission to reduce overhead. Preferably, the proprietary format is used only between router 130 and proxy server 250 so that client PC need not be modified to use any proprietary protocol. Thus, for HTTP GET request 501 made by client browser 120, router 130 encodes HTTP GET request 501 into a proprietary format and transmits that data as communication 502. Then, ISP sub-system 200 receives communication 502 and decodes the data to extract the contents of the HTTP GET request 501. However, one of ordinary skill in the art would appreciate that the actual data request, or that any other network protocol format or combination thereof, could be used as a network transmission format. For example, a conventional, non-propriety network protocol like TCP/IP could be used.

In step S601, proxy server 250 forms (i.e., generates) its own HTTP GET request 503 for the same URL as HTTP GET request 501. In an embodiment, an IP packet used by proxy server 250 when sending HTTP GET request 503 is configured with the proxy server 250's IP address as the source address and Web Server #1's address as the destination address. Alternatively, the system may have advanced routing features, whereby proxy server 250 may instead send HTTP GET request 503 within an IP packet configured with another source address, such as an IP address of client sub-system 100. Web Server #1, upon receipt of HTTP GET request 503, generates a HTTP response 504 in response to the request, and sends the HTTP response 504 to proxy server 250.

In step S602, proxy server 250 receives HTTP response 504 from web server #1. HTTP response 504 may include, for example, a HTML document which represents the layout pattern and text 401 of web page 400. In this example, the HTML document does not include the images 402 and 403 themselves, but instead includes Javascript code which, when executed, dynamically generates URLs for image 402 and image 403, as discussed above. Of course, the present invention is not limited to dynamically-generated URLs, and one or more URLs included in the HTML document could be static URLs instead. Preferably, both dynamic URLs and static URLs are pre-fetched.

In step S603, proxy server 250 sends a transmission 505 via a network connection to client proxy program 141. Transmission 505 comprises the HTML document from HTTP response 504, or may comprise the entire HTTP response 504. As later discussed, proxy server 250 may modify the HTML (e.g., modify Javascript in the HTML) before sending the same. As also later discussed, client proxy program 141 uses transmission 505 to generate a HTTP response to web browser 120's HTTP GET request 501, which response may include the HTML document or modified HTML document.

In step S604, proxy server 250 executes the Javascript within the HTML document, as seen in block 507 in FIG. 5. More specifically, control module 260 first forwards the HTML document to virtual browser 270 for processing as if for actual display. (To forward the HTML document to virtual browser 270, the control module 260 preferably commands virtual browser 270 to retrieve the web page's URL by having virtual browser 270 generate an HTTP GET request for that URL, intercepts that HTTP GET request generated by virtual browser 270, and returns to the virtual browser 270 an HTTP response including the HTML document.) Virtual browser 270 processes the HTML document and therefore forms a virtual layout of HTML page 400. Virtual browser 270 also executes the Javascript within the HTML document using Javascript execution module 272.

Javascript is frequently used to enable additional functionality in web pages. Javascript accomplishes this functionality by allowing specific defined functions to be defined and to be executed. The additional functionality includes, among other features, the ability to modify the original HTML code such that a custom web page is displayed. For instance, the Javascript may create a dynamic URL in the HTML code.

In this case, Javascript execution module 272, in executing the Javascript, produces URLs to smiley.jpg and ad.jpg (i.e., the first and second images 402 and 403), which virtual browser 270 requests for retrieval. Since control module 260, in the preferred embodiment, acts as a proxy for virtual browser 270, control module 260 intercepts the requests for these URLs. Since the same Javascript is subsequently going to be executed by client browser 120, control module 260 recognizes that client browser 120 will later request these URLs. Virtual browser 270 also requests retrieval of any static URLs in the HTML code in a similar manner (not shown in this example).

Thus, in step S605, control module 260 pre-fetches these additional URLs. That is, control module 260 forms (i.e., generates) HTTP GET request 508 for smiley.jpg, and forms HTTP GET request 510 for ad.jpg. Since the URL for smiley.jpg (i.e., first image 402) corresponds to www.webserver1.com, control module 260 sends HTTP GET request 508 to Web Server #1. Since the URL for ad.jpg (i.e., second image 403) corresponds to www.webserver2.com, HTTP GET request 510 is sent by control module 260 to Web Server #2.

At the same time, in step S606, control module 260 also sends pre-fetch notifications ("promises") 509 and 511 via a network connection to client proxy program 141 for URLs corresponding to smiley.jpg (first image 402) and ad.jpg (second image 403), respectively. These pre-fetch notifications comprise data serving as notifications which inform client proxy program 141 that proxy server 250 has started the process of pre-fetching content (i.e., smiley.jpg and ad.jpg) for the URLs in question, effectively "promising" that the content will be subsequently sent.

In step S607, control module 260 receives HTTP responses 512 and 514 for HTTP GET requests 508 and 510, respectively, from Web Server #1 and Web Server #2, respectively. The HTTP responses contain the content image data for smiley.jpg and ad.jpg (i.e., the first and second images 402 and 403).

In step S608, control module 260 relays the content image data of smiley.jpg and ad.jpg to client proxy program 141 to satisfy the previously-made pre-fetch notifications 509 and 511, respectively. As previously mentioned, the preferred embodiment encapsulates all data to be transmitted between client sub-system 100 and ISP sub-system 200, including the content image data, into a proprietary network transmission format. However, any network transmission format, including industry-standard formats, or combinations thereof, can be alternatively used in connection with the present invention. For example, control module 260 could send the entire HTTP response to client proxy program 141 via a standard TCP/IP connection.

At the same time, in step S609, control module 260 also relays the content image data of smiley.jpg and ad.jpg to virtual browser 270 so that virtual browser 270 loads the images in the web page. This ensures that, in a circumstance where the pre-fetched data contains links to additional content, any additional required pre-fetching is performed to completely load the web page, The operation of client browser 120 and client proxy program 141 will now be described, with reference to FIGS. 5 and 7.

In step S700, client browser 120 requests a URL. Usually, the request is by a user of client PC 110 requesting the URL (e.g., by entering a URL into an address bar displayed on the screen by client browser 120, or by clicking using a mouse on a link to a URL, the link being displayed on the screen by client browser 120).

In step S701, client browser 120 forms (i.e., generates) a HTTP GET request 501 for the URL and sends the HTTP GET request 501 according to the network settings in TCP/IP stack 121. TCP/IP stack 121 is configured such that Internet communications are routed to router 130. Accordingly, the request 501 is sent by client PC 110 via a network connection and is received by router 130.

In step S702, client proxy program 141 intercepts HTTP GET request 501 and relays the HTTP GET request to ISP sub-system 200 as communication 502. As previously mentioned, the preferred embodiment encapsulates communication 502 using a proprietary network transmission format, but any format can be used in connection with the present invention. Instead of sending the entire HTTP GET request, client proxy program 141 may send just the URL, or data from which the URL can be obtained.

In step S703, client proxy program 141 receives transmission 505 which comprises the HTML document corresponding to the requested URL. Again, transmission 505 may instead comprise the entire HTTP response that comprises the HTML document.

In step S704, client proxy program 141 forms (i.e., generates) a HTTP response 506 in accordance with transmission 505. In particular, client proxy program 141 generates a HTTP response 506 which contains the HTML document from transmission 505 and transmits the HTTP response 506 to client browser 120 (so as to respond to the client browser's HTTP GET request of step S701). As can be seen, all communications between client browser 120 and Web Server #1 are, in the preferred embodiment, "transparent" to client browser 120, and client browser 120 processes HTTP response 506 as if it was originally sent by Web Server #1. In other words, HTTP response 506 appears to client browser 120 to have come from Web Server #1. This may be referred to as transparent proxying because client browser 120 thinks that HTTP response 506 came from Web Server #1 even though it was generated by client proxy program 141.

Client browser 120 performs steps S705-S707 during the same period that client proxy program 141 performs steps S708-S710. In step S705, client browser 120 processes the HTML document, including executing the Javascript in the HTML document, as seen in block 516 in FIG. 5. Since the Javascript is the same code as the Javascript executed by the Javascript execution module 272 of proxy server 250 (in step S604), the same URLs for smiley.jpg and ad.jpg (i.e., the first and second images 402 and 403) will be generated by client browser 120.

In step S706, client browser 120 recognizes that additional content for those URLs is required to fully display the web page 400. Thus, in step S707, client browser 120 requests the content for these URLs by generating HTTP GET requests 517 and 519 for the smiley.jpg and ad.jpg URLs, respectively. Client browser 120 also requests any static URLs in the HTML document in a similar manner (not shown in this example).

Meanwhile, client proxy program 141 continuously listens for transmissions from ISP sub-system 200. In step S708, client proxy program 141 receives pre-fetch notifications 509 and 511 sent by control module 260 in proxy server 250. Client proxy program 141 stores these pre-fetch notifications in memory 133.

In step S709, client proxy program 141 receives transmissions 513 and 515, which contain the pre-fetched image data corresponding to smiley.jpg and ad.jpg, respectively.

In step S710, client proxy program 141 stores the image data as pre-fetched data in memory 133.

In step S711, client proxy program 141, upon receipt of HTTP GET requests 517 and 519 from client browser 120, checks memory 133, and determines whether the URL in each HTTP GET request corresponds to data which has already been pre-fetched and stored in memory 133. As described above for steps S709 and S710, the data for smiley.jpg and ad.jpg has already been pre-fetched, received, and stored in that memory. Accordingly in step S712, client proxy program 141 sends the pre-fetched smiley.jpg image data in a HTTP response 518 to HTTP GET request 517. Client proxy program 141 also sends the pre-fetched ad.jpg image data in a HTTP response 520 to HTTP GET request 519.

By pre-fetching data which is requested from the HTML document for the original requested URL, the client sub-system 100 is able to obtain the additional content data in advance of the client browser 120 actually requesting such data. Thus, at least one round-trip delay over satellite links 20 and 30 is avoided, thereby reducing delay in fully loading web page 400. Put another way, this is significant because neither client browser 120 nor client proxy program 141 has sent or relayed either a HTTP GET request for the URL for smiley.jpg or a HTTP GET request for the URL for ad.jpg over the satellite link. Thus, the present invention provides an advantage of preventing sending of a HTTP GET request across the network connection of the satellite link. Furthermore, because proxy server 250 pre-fetches content not only from static URLs found in a HTTP response but also from URLs dynamically generated by Javascript found in the HTTP response, the dynamically-generated-URL content can be pre-fetched by the proxy server 250 and sent or promised and sent to the client proxy program 141, which in turn supplies the same to the client browser 120.

For step S711, in the event that data for the additional URLs has not yet been stored in memory, client proxy program 141 proceeds to step S713. In step S713, client proxy program 141 checks if the URL corresponds to data which has been promised. If a pre-fetch notification has been stored in memory 133 for the URL, then client proxy program 141 recognizes that a pre-fetch operation for the URL is already underway, and at least a partial delay can be avoided by simply waiting for the content for the URL to be relayed to client sub-system 100 from proxy server 250.

In step S714, client proxy program 141 finally receives the content data (corresponding to communications 513 and 515 which satisfy promises) and immediately sends the data to client browser in the form of HTTP responses 518 and 520, as discussed above with regards to step S712. Client proxy program 141 also implements a timeout period in the event that a communications loss has occurred, so it can re-transmit and ensure eventual retrieval of the content data.

If client proxy program 141 has not yet received a pre-fetch notification for the additional URLs, then client proxy program 141 implements step S715. In step S715, client proxy program 141 requests the URL in a non-pre-fetch manner, to ensure that the content data is retrieved.

FIG. 8 further illustrates transmissions 501, 503, 504, and 506, particularly the contents thereof. As seen in FIG. 8, HTTP GET request 501 is preferably encapsulated into a IP packet (i.e., by the TCP/IP stack). IP packets for web page retrieval are customarily sent over established TCP connections. IP packets contain a header section with the source and destination IP addresses of the packet. For request 501, the source IP address is the client browser's 120 IP address and the destination IP address is the web server's IP address. The IP packet also has a payload section which contains the HTTP GET request.

HTTP GET request 503 is preferably also encapsulated in an IP packet. As seen in FIG. 8, the IP packet for request 503 also has a header section and a payload section. For request 503, however, the source IP address is the proxy server's 250 IP address and the destination IP address is the web server's IP address. This allows HTTP response 504 to request 503 to be received by proxy server 250 (since the HTTP response 504 will be sent using a destination IP address equal to proxy server 250's IP address). The IP packet's payload section contains the HTTP GET request 503.

HTTP response 504 is also preferably encapsulated in an IP packet with header and payload sections. The source IP address of this IP packet is that of the web server, and the destination IP address is that of proxy server 250. The payload section of the IP packet contains the header of the HTTP response, followed by the HTML document.

HTTP response 506 is preferably encapsulated in an IP packet as well. The source IP address of this IP packet is the web server, to ensure that all intermediate transmissions through proxy server 250 and client proxy program 141 are transparent to client browser 120. The destination IP address is that of client browser 120. The payload section of the IP packet contains a similar, if not identical, header of HTTP response 504, followed by HTML. In this case, the HTML is the same as the HTML within HTTP response 504. However, as described below, the HTML within HTTP response 506 can be modified compared to the original HTML in response 504.

Accordingly, the present invention provides the benefits of accelerated web page loading over a satellite connection. The present invention is applicable towards a variety of web browsers including Microsoft Internet Explorer, Mozilla Firefox, Google Chrome, or any other browser.

Second Embodiment

In the first embodiment, the client proxy program 141 is "transparent" to client browser 120. In other words, the proxy settings of client browser 120 are not set to use client proxy program 141 (i.e., no configuration for client browser 120 is necessary). In an alternative second embodiment, client browser 120's proxy settings may be set to client proxy program 141 (i.e., client browser 120 is configured, in its proxy settings, to specify a network address corresponding to client proxy program 141 should be used to access a network).

Third Embodiment

Figure 25:
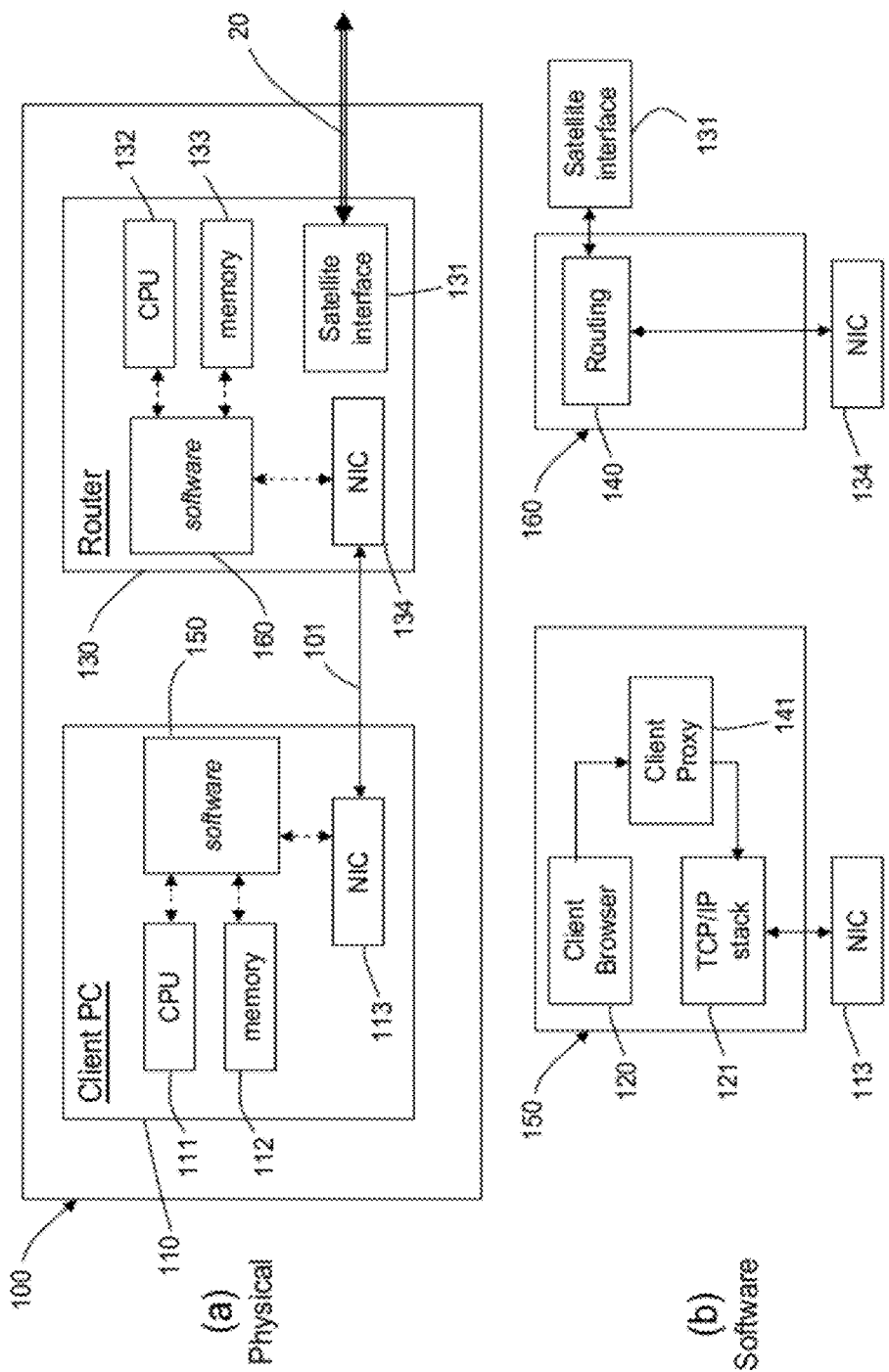
FIG. 25 comprises FIGS. 25(a) and 25(b) which are schematic diagrams of an alternative embodiment of the present invention, where the client proxy program is executed within the client PC.

In the first two embodiments, client proxy program 141 is located within router 130. However, the present invention is not so limited; instead, client proxy program 141 may be located elsewhere. For example, it may be located in client PC 110 instead. Such is shown in FIG. 25. In this third embodiment, client proxy program 141 is stored within memory 112 of client PC 110, and is executed using CPU 111. Preferably, client browser 120 interfaces directly with client proxy program 141, and client proxy program 141 interfaces with TCP/IP stack 121. Preferably, client browser 120 may have its proxy settings configured to communicate with client proxy program 141. In this case, the client proxy program 141 typically listens in on a network port of NIC 113, and client browser 120's proxy settings are configured with the host being localhost and with that network port.

(3) Javascript Modification Feature

Although the above-discussed pre-fetching feature in FIGS. 4-8 can transmit an unmodified HTML document of a HTTP response from ISP sub-system 200 to client sub-system 100, the Javascript within the HTML can instead be selectively modified prior to the transmission.

Web pages often contain advertisement images, usually as a revenue source for the web page's owner. These images are sometimes requested using Javascript. When this occurs, the Javascript may create a URL for the image which depends on a Javascript function/object, such as a random number function which returns a random number or a date object which returns the current date and time. An example of a URL that has been generated in accordance with a random number and a date and time might be: www.hughes.net/advertisement/1050-20100721-222542 (where 1050 represents a four digit random number (typically generated by a pseudorandom number algorithm)) and 20100721-222542 represents 10:25 pm and 42 seconds on Jul. 21, 2010. A purpose of using a random number and/or a date and/or a time when generating a URL is to create a unique URL so that a fresh advertisement will be loaded by the browser (since the URL is unique, the browser will not find any content stored in its cache for that URL, and thus will generate a HTTP GET request for that URL, ensuring for the advertiser that a fresh image will be obtained and displayed).

Now assume that a HTTP response contains Javascript that uses a web browser's built-in Javascript random number function to generate a URL for an advertising image. If that Javascript is executed on client browser 120, a different random number may or will be returned by the random number function when the Javascript is executed on virtual browser 270. As a result, different URLs may or will be generated by the client browser 120 and the virtual browser 270. Hence, any pre-fetched data obtained by virtual browser 270 will not be matched to the URL requested by client browser 120. As such, client sub-system 100 (specifically client proxy program 141) is required to process the client browser 120 URL request as a non-pre-fetch request, thus defeating the benefits of pre-fetching.

This same problem exists for the Javascript built-in Date object, whereby different date/time values may be returned when the Javascript is executed on client browser 120, compared to when executed on virtual browser 270. Such may occur when the respective clocks of client PC 110 and proxy server 250 are not perfectly synchronized or where the time zones are not the same. Again, pre-fetched data will not be matched to the same URL, and client sub-system 100 is required to process the URL request as a non-pre-fetch request.

To overcome this problem, the Javascript modification feature of the present invention modifies the Javascript in a HTML document such that a custom function is instead executed or a custom object is created and referenced. The custom function/object allows the same URLs to be created between client browser 120 and virtual browser 270. More specifically, preferably, the proxy server 250 modifies Javascript that uses an algorithm to generate a URL to thereby obtain modified Javascript that uses a different algorithm to generate a URL. For example, if the unmodified Javascript uses a date object to generate a URL or for some other purpose, then the modified Javascript could use a different date object, or a date function, or something else altogether different. And if the unmodified Javascript uses a random number function to generate a URL or for some other purpose, then the modified Javascript could use a different random number function or something else altogether different.

Figure 9:
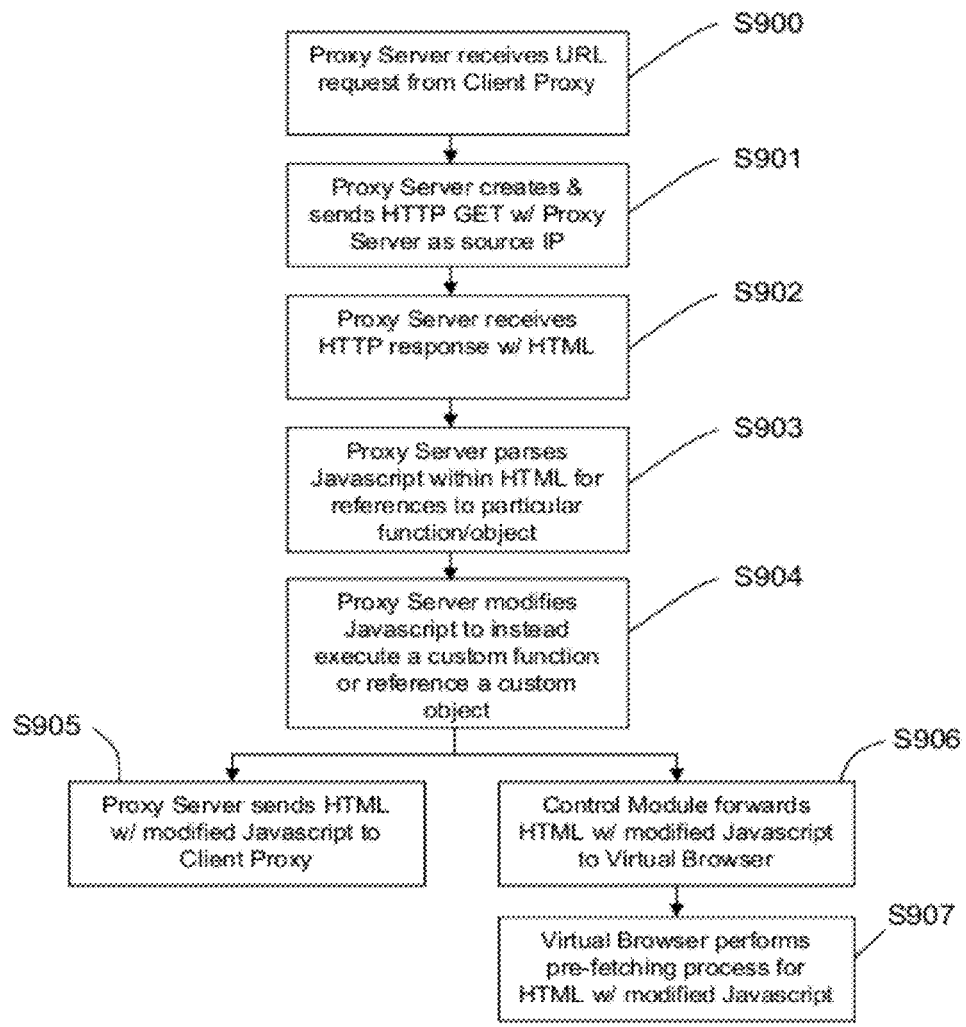
FIG. 9 is a flow diagram showing a Javascript modification feature of the present invention.
Figure 12:
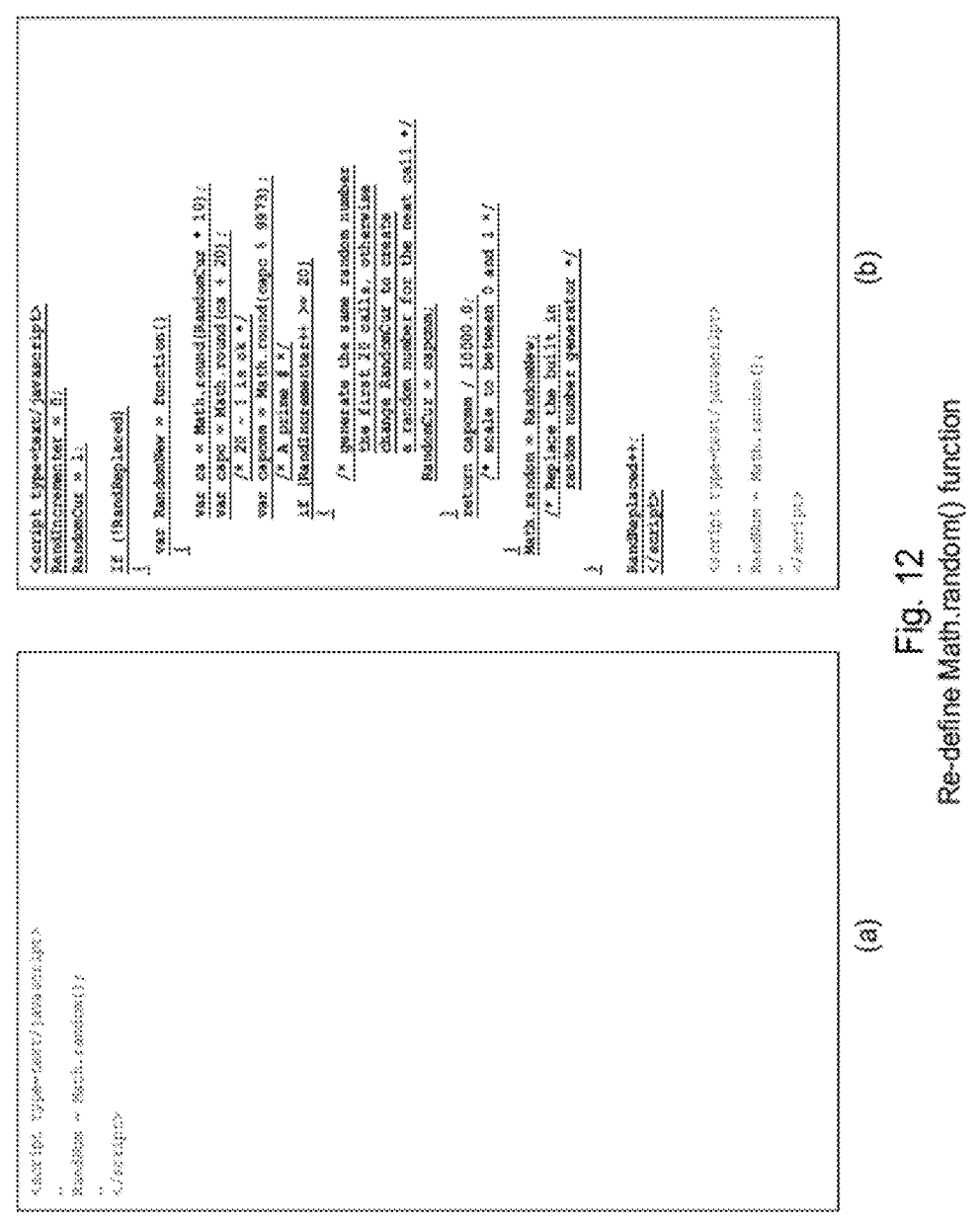
Figure 13:
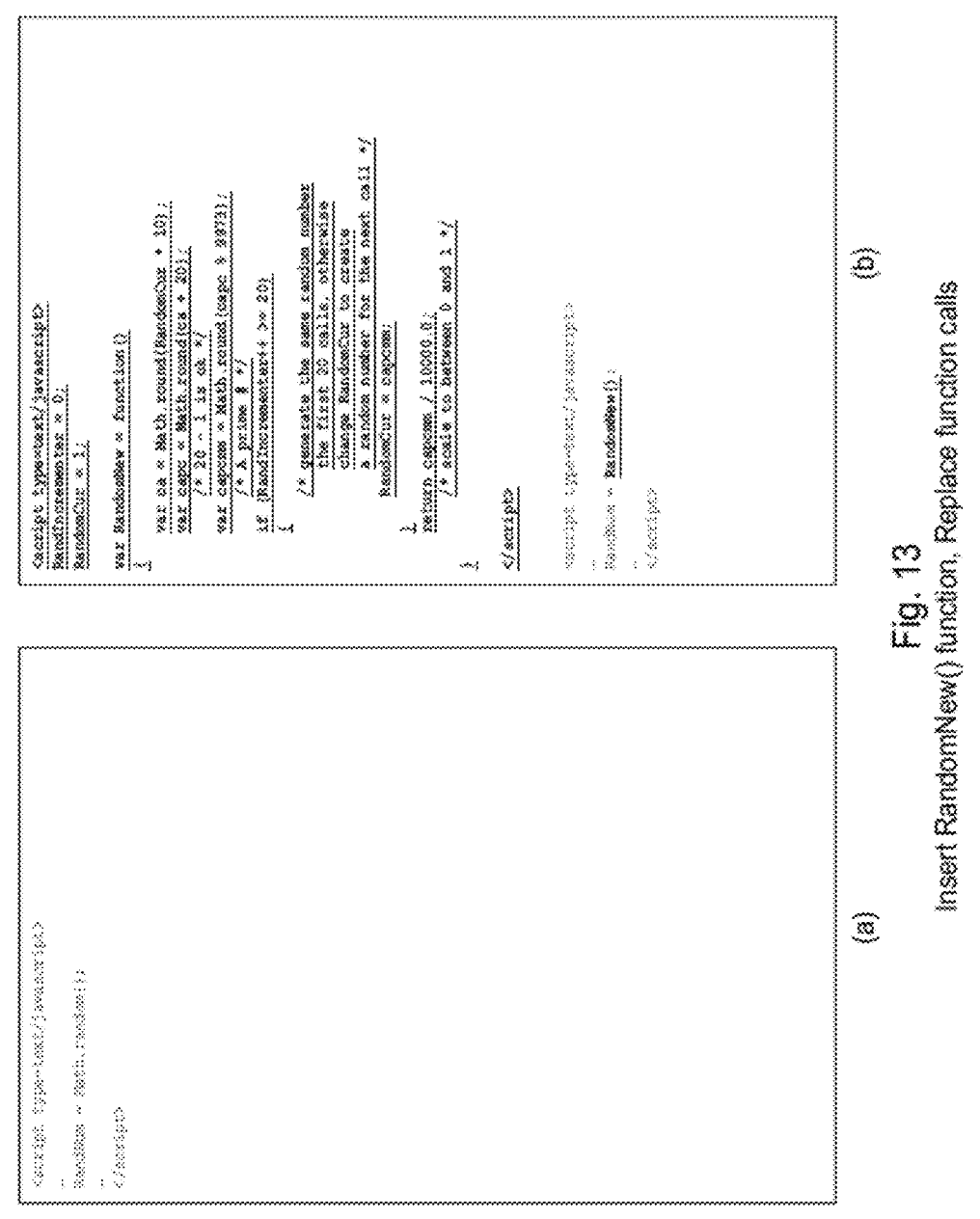
Figure 14:
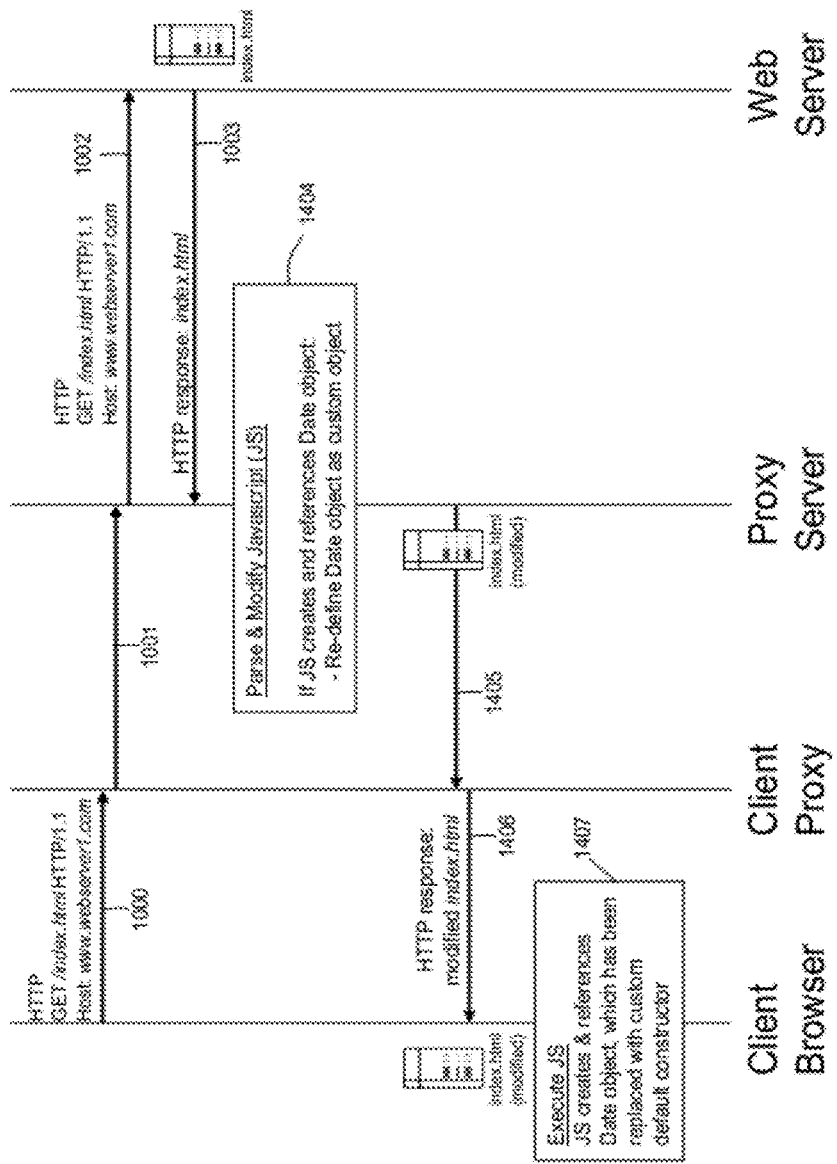
FIG. 14 is a sequence diagram showing the re-definition of the Date object according to the present invention.
Figure 15:
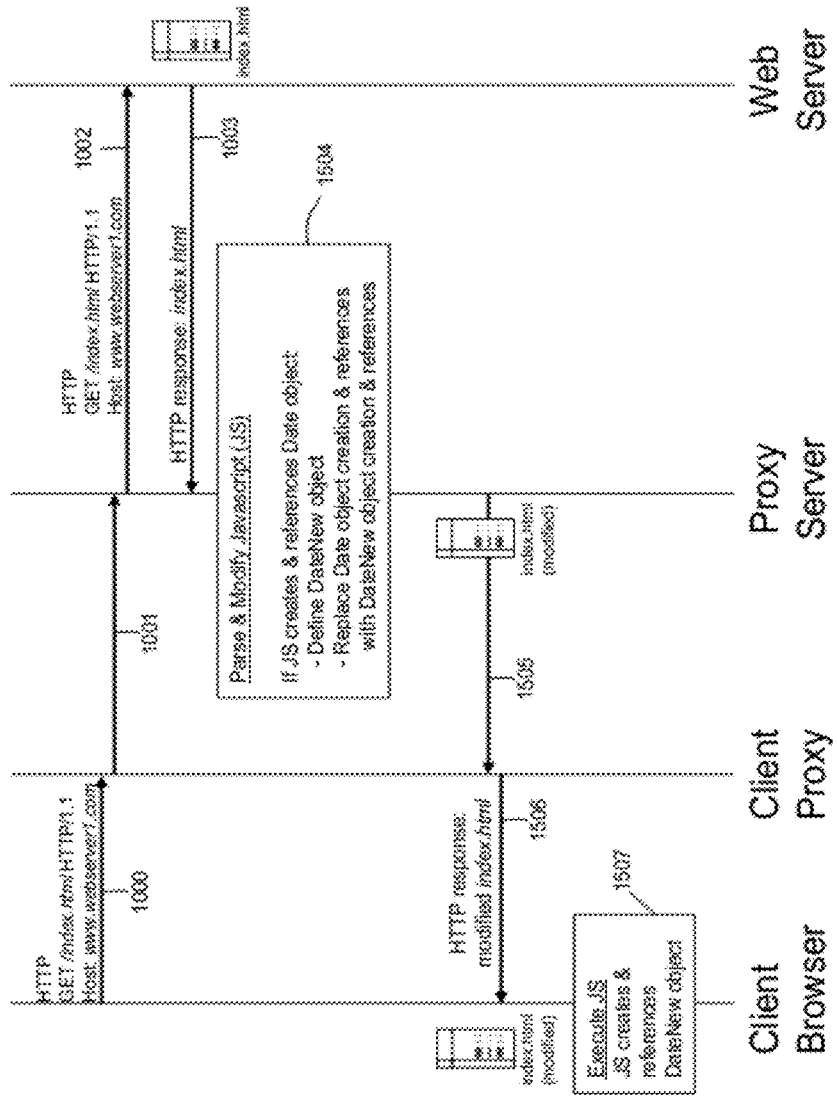
FIG. 15 is a sequence diagram showing the adding of a DateNew object according to the present invention.

FIGS. 9-15 describe this Javascript modification feature of the present invention. FIG. 9 describes the operation of proxy server 250 in modifying Javascript. FIGS. 10-13 illustrate the modification of a random number function in Javascript. FIGS. 14-15 illustrate the modification of a date object in Javascript.

FIG. 9 shows the steps of proxy server 250 in modifying Javascript. In step S900, proxy server 250 receives communication 1001 from client proxy program 141, similar to step S600. Communication 1001 contains a request for a URL, the request having been generated by client proxy program 141 in response to receipt by the client proxy program 141 of a HTTP GET request 1000 generated by client browser 120 and sent over a network connection to client proxy program 141. Communication 1001 could comprise the HTTP GET request 1000 or instead of the entire HTTP GET request 1000 just data from which the URL could be obtained (e.g., the URL itself).

In step S901, proxy server 250 forms (i.e., generates) its own HTTP GET request 1002 for the same URL, similar to step S601.

In step S902, proxy server 250 receives HTTP response 1003 from the web server in response to HTTP GET request 1002. Similar to response 504 for step S602, HTTP response 1003 includes a HTML document which represents the layout pattern and text 401 of web page 400, but not the graphics components, such as image 402 and image 403. The HTML document also includes Javascript code which, when executed, requests URLs for image 402 and image 403.

In step S903, Javascript modifier module 262 within proxy server 250 parses (or scans) the Javascript code within the HTML document for references to a particular function or object. In the preferred embodiment, the particular functions/objects are the Javascript built-in Math.random( ) function and the Date object's default constructor.

In step S904, Javascript modifier module 262 modifies the Javascript such that the references to the original function or object now refer to a custom function or object. Javascript modifier module 262 can do this in one of at least two different ways.

One method is a re-write method. In this method, Javascript modifier module 262 re-writes the original function or object, so that references in the Javascript to the function or object are unmodified, but now instead execute the custom function or access the custom object when the unmodified references are executed. This first approach is further illustrated in FIGS. 10 and 12 for the Math.random( ) function, and in FIG. 14 for the Date object.

A second method is an insert and search/replace method. In this second method, Javascript modifier module 262 inserts a definition for the custom function/object as a new function/object, and then searches for and replaces all references in the Javascript to the original function/object with references to the custom function/object. This second approach is further illustrated in FIGS. 11 and 13 for the Math.random( ) function, and in FIG. 15 for the Date object.

Regardless of the particular method used, the Javascript modification results in modified Javascript which, when executed, executes the custom function instead of the original function and/or accesses the custom object instead of the original object. Thus, Javascript which carries out a first algorithm when executed is modified to obtain modified Javascript which carries out a second algorithm, different from the first algorithm, instead of the first algorithm.

The custom function and/or custom object returns predictable results, such that dynamic URLs generated by relying on a random number will be the same when dynamically generated by client browser 120 and when dynamically generated by virtual browser 270.

In step S905, control module 260 sends a communication 1005 including HTML to client proxy program 141. However, instead of the HTML including the original unmodified Javascript, as in step S603, the HTML in communication 1005 includes the modified Javascript.

In step S906, control module 260 also forwards the HTML including the modified Javascript to virtual browser 270 for processing as if for actual display, in accordance with the above-described pre-fetching feature.

In step S907, virtual browser 270 performs the pre-fetching process for the HTML with modified Javascript. This includes parsing the HTML, executing the Javascript, pre-fetching content of statically and dynamically generated URLs, and sending pre-fetch notifications, as described above in the pre-fetch feature section.

(a) Random Number Function

Figure 10:
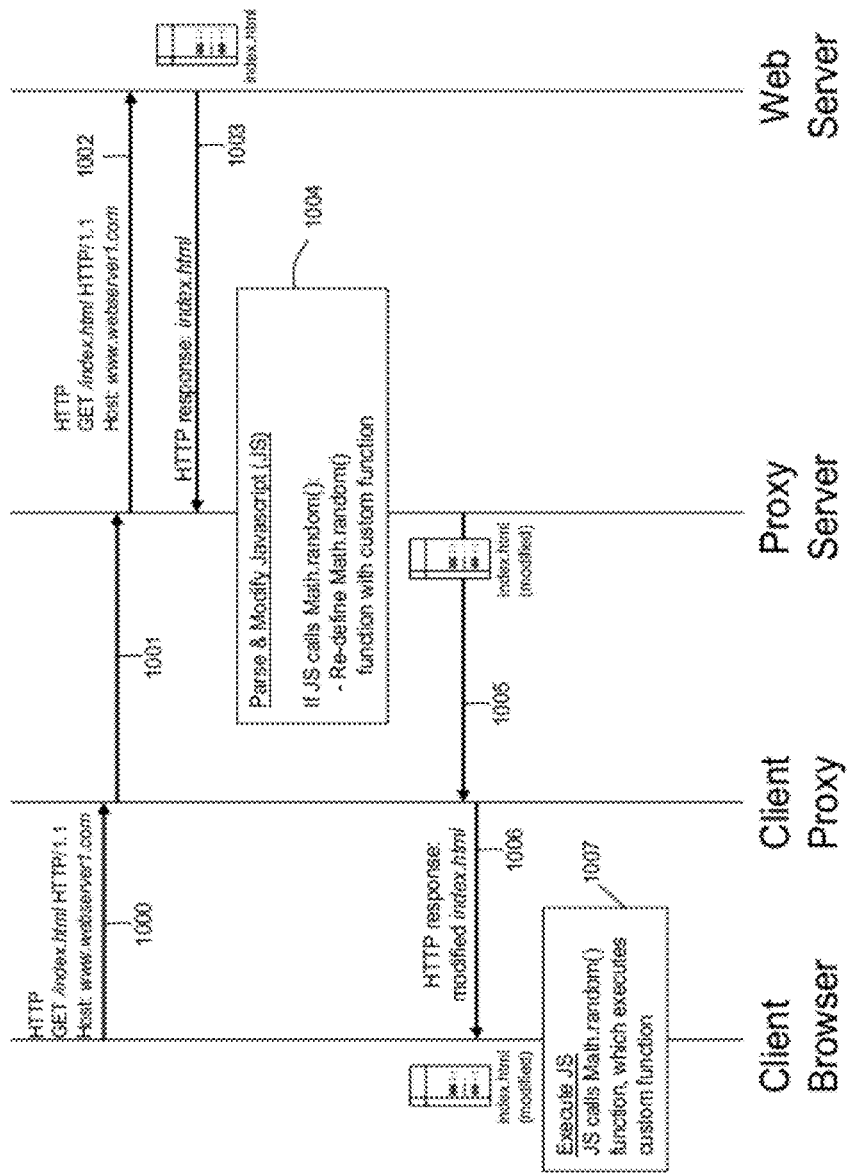
FIG. 10 is a sequence diagram showing the re-definition of the Math.random( ) function according to the present invention.

FIGS. 10 and 12 illustrate the re-write/re-define method for the Math.random( ) function. As previously described with respect to steps S900-S902, proxy server 250 receives communication 1001 from client proxy program 141, sends HTTP GET request 1002 to the web server, and receives from the web server HTTP response 1003. Javascript modifier module 262 then performs steps S903-S904, corresponding to block 1004 in FIG. 10. In this case, Javascript modifier module 262 re-defines the Math.random( ) function, as seen in the code modification depicted in FIG. 12.

FIG. 12(a) shows original Javascript code which calls the Math.random( ) function, and FIG. 12(b) shows modified Javascript code which re-defines the Math.random( ) function by replacing the function with a custom function. Accordingly, any function calls to Math.random( ) will execute the custom function. In particular, the modified Javascript includes Javascript that defines the custom function, located at a position in the Javascript prior to a position where it will be called. Here, the custom function, called RandomNew( ) generates the same random number for the first 20 calls to that function. The line of Javascript that reads "Math.random=RandomNew" replaces, re-writes, re-defines, or overwrites, as it were, the Math.random( ) function with the RandomNew( ) function. As a result, function calls in the Javascript to Math.random( ) will, upon execution of the modified Javascript, cause the RandomNew( ) function to be executed.

As described with respect to step S905, control module 260 sends communication 1005 comprising the modified Javascript, such that it is received by client proxy program 141. In accordance with communication 1005, client proxy program 141 forms (i.e., generates) a HTTP response 1006 to client browser 120's HTTP GET request 1000, and transmits HTTP response 1006 to client browser 120, similar to step S704.

In block 1007, client browser 120 processes the HTML within response 1006 and executes the modified Javascript. Therefore, client browser 120 executes the re-written Math.random( ) function (in place of the original Math.random( ) function). As a result, where the unmodified Javascript when executed uses a first algorithm for random number generation (i.e., that of the Math.random( ) function), the modified Javascript when executed uses a different algorithm (i.e., that of the re-written Math.random( ) function).

Figure 11:
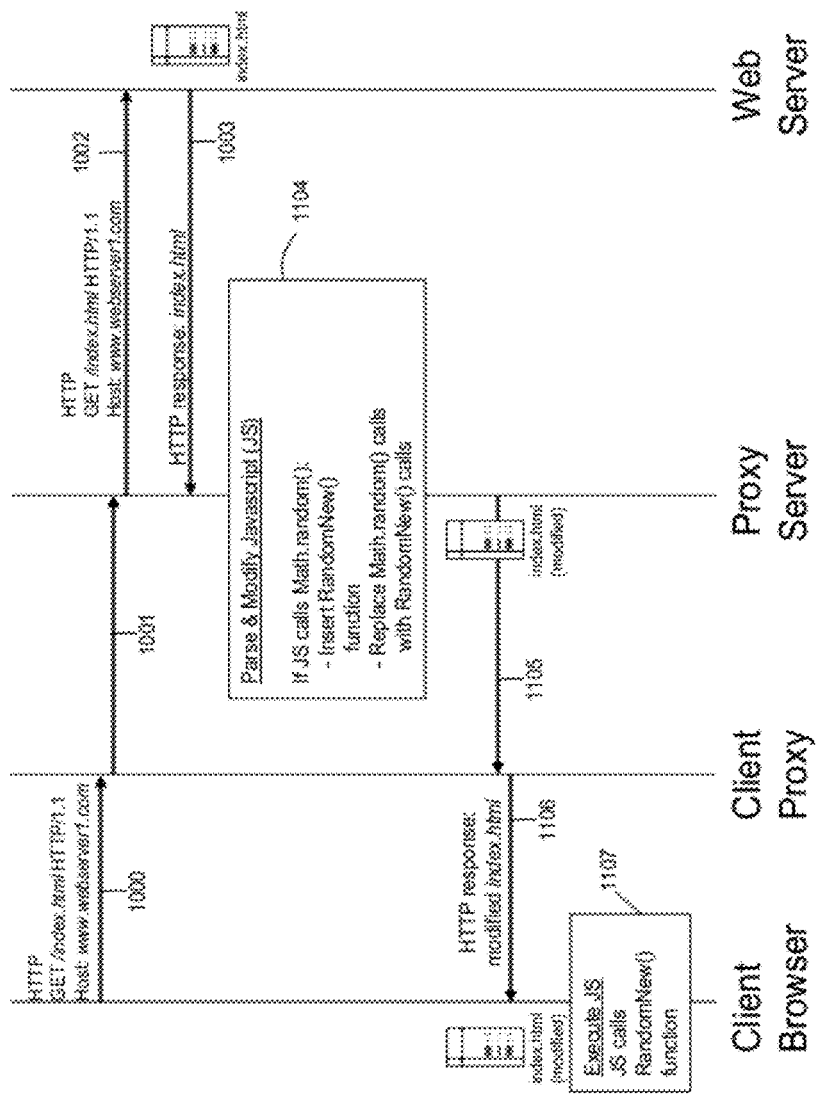
FIG. 11 is a sequence diagram showing the adding of a RandomNew( ) function according to the present invention.

FIGS. 11 and 13 illustrate the insert and search/replace method for the Math.random( ) function. As previously described with respect to steps S900-S902, proxy server 250 receives communication 1001 from client proxy program 141, sends HTTP GET request 1002 to the web server, and receives from the web server HTTP response 1003. Javascript modifier module 262 then performs steps S903-S904, corresponding to block 1104 in FIG. 11. In this case, Javascript modifier module 262 inserts a RandomNew( ) function definition into the original Javascript code, at a position prior to any call to the Math.random( ) function. Then, Javascript modifier module 262 locates code fragments which call Math.random( ) (i.e., searches in the Javascript for Javascript function calls to the Math.random( ) function) and replaces them with calls to RandomNew( ).

This Javascript code modification is depicted in FIG. 13. FIG. 13(a) shows original Javascript code which calls the Math.random( ) function, and FIG. 13(b) shows modified Javascript code which inserts the RandomNew( ) function and replaces original Math.random( ) calls with RandomNew( ) calls. Accordingly, any function calls to Math.random( ) will be modified to function calls to RandomNew( ) Described in other words, at the top of the Javascript, a definition for RandomNew( ) not present in the original Javascript has been inserted, and the line RandNum=Math.random( ) from the original Javascript has been changed to RandNum=RandomNew( ) in the modified Javascript. When this line is executed by client browser 120 or virtual browser 270, the RandomNew( ) function will be called instead of the Math.random( ) function. In other words, an algorithm used by the original Javascript for random number generation is replaced by a different algorithm.

As described with respect to step S905, control module 260 sends communication 1105 comprising the modified Javascript, such that it is received by client proxy program 141. In response to communication 1105, client proxy program 141 forms (i.e., generates) a HTTP response 1106 to HTTP GET request 1000, and transmits HTTP response 1106 to client browser 120, similar to step S704.

In block 1107, client browser 120 processes the HTML within HTTP response 1106 and executes the modified Javascript. Therefore, client browser 120 executes the inserted RandomNew( ) function instead of the Math.random( ) function.

As seen in FIGS. 12 and 13, the custom function is executed instead of the original random number function in Javascript. In doing so, the custom function ensures that at least a first number of calls to the function will return a predictable value instead of a randomly generated value.

In the preferred embodiment, the first twenty executions of the custom function return the same predictable value. Also in the preferred embodiment, both client browser 120 and virtual browser 270 execute the same custom function, so both browsers will return the same predictable value. Thus, any requests for URL which are dependent on the returned value of the built-in random number function will be identical on both client browser 120 and virtual browser 270 (i.e., the requested URLs will be the same and thus, for example, the same advertising image will be obtained).

However, one of ordinary skill in the art will appreciate that any function or object which enables the URL requests to return identical content can be used as a replacement. For instance, the executed function or returned results can even be different between client browser 120 and virtual browser 270, as long as the returned results coordinate with each other. An example of when the returned results coordinate with each other is when the same advertising image is obtained. Notably, even though the built-in Javascript Math.random( ) construct is a function, it can be appreciated that such function could be replaced with an object or any other appropriate programming construct type.

Ultimately, any custom function, object, or other programming construct which enables pre-fetched data from these URL requests to be used in client browser 120 can be incorporated into this feature of the present invention.

(b) Date Object

FIG. 14 illustrates the re-write method for the Date object. As previously described with respect to steps S900-S902, proxy server 250 receives communication 1001 from client proxy program 141, sends HTTP GET request 1002 to the web server, and receives from the web server HTTP response 1003. Javascript modifier module 262 then performs steps S903-S904, corresponding to block 1404 in FIG. 14. In this case, Javascript modifier module 262 re-defines the Date object.

As described with respect to step S905, control module 260 sends communication 1405 comprising the modified Javascript, such that it is received by client proxy program 141. In accordance with communication 1405, client proxy program 141 generates a HTTP response 1406 to HTTP GET request 1000, and transmits HTTP response 1406 to client browser 120, similar to step S704.

In block 1407, client browser 120 processes the HTML within HTTP response 1406 and executes the modified Javascript. Therefore, client browser 120 creates a custom default constructor as the Date object, and references the custom default constructor by referencing the Date object. In other words, where the original Javascript when executed uses a first algorithm that returns a chronological measurement (e.g., the date object), the modified Javascript when executed uses a different algorithm.

FIG. 15 illustrates the insert and search/replace method for the Date object. As previously described with respect to steps S900-S902, proxy server 250 receives communication 1001 from client proxy program 141, sends HTTP GET request 1002 to the web server, and receives from the web server HTTP response 1003. Javascript modifier module 262 then performs steps S903-S904, corresponding to block 1504 in FIG. 15. In this case, Javascript modifier module 262 inserts a definition for a DateNew function to the original Javascript code. Then, Javascript modifier module 262 locates code fragments which reference the Date object's default constructor and replaces them with references to the DateNew function (i.e., search and replace).

As described with respect to step S905, control module 260 sends communication 1505 comprising the modified Javascript, such that it is received by client proxy program 141. In response to communication 1505, client proxy program 141 (i.e., generates) forms a HTTP response 1506 to HTTP GET request 1000, and transmits HTTP response 1506 to client browser 120, similar to step S704.

In block 1507, client browser 120 processes the HTML within HTTP response 1506 and executes the modified Javascript. Therefore, client browser 120 defines a DateNew function and refers to it instead of the Date object's default constructor. Again, where the original Javascript, when executed, uses an algorithm that returns a chronological measure (e.g., the Date object), the modified Javascript, when executed, uses a different algorithm.

In both approaches for modifying the Javascript, the custom date function/object/default-constructor replaces the original Date object in Javascript. By doing so, the custom function/object/default-constructor ensures that a date value returned when executed by client browser 120 will match the value returned when executed by virtual browser 270, even if clocks of client PC 110 and proxy server 250 are not perfectly synchronized or different time zones are used.

In the preferred embodiment, the replacement custom function/object/default-constructor retrieves the current date and time, but modifies at least one field of the date/time value, such that the date/time values between execution by client browser 120 and by virtual browser 270 are identical. In the preferred embodiment, the replacement function/object/default-constructor takes the current date/time and rounds the minutes field of the value down to a three-minute interval. Additionally, the replacement function/object/default-constructor sets the seconds and milliseconds fields of the date/time value to fixed non-zero values.

For instance, a date/time value with a time of "10:55:32 and 333 millisecs" would be rounded down to "10:54:01 and 19 millisecs", and a date/time value with a time of "10:57:10 and 425 millisecs" would be rounded down to "10:57:01 and 19 millisecs". That is, the minutes field is rounded down to the nearest three-minute interval, the seconds field is set to "01", and the milliseconds field is set to "19".

Thus, as with the random number function modification feature, any request for a URL which is dependent on a date/time value will be identical on both client browser 120 and virtual browser 270. Additionally, control module 260 controls virtual browser 270 such that the date/time values are identical, even when proxy server 250 and client sub-system 100 are located in different timezones. Control module 260 may accomplish this by, for example, retrieving the timezone information of client browser 120, as discussed in greater detail below. Then, control module 260 can set virtual browser 270 to the same timezone. Or, a date/time value can be calculated according to a pre-determined timezone offset between client browser 120 and virtual browser 270. Alternatively, the date/time value could also be generated according to a pre-defined timezone (e.g., GMT) on both client browser 120 and virtual browser 270. In the end, since the date/time values are identical, URLs generated using the date/time values will also be identical, and therefore the images obtained from those URLs can also be identical.

However, one of ordinary skill in the art will appreciate that any function or object which enables the URL requests to return identical content can be used as a replacement. For instance, the custom functions/objects/default-constructors or returned results can even be different between client browser 120 and virtual browser 270, as long as the returned date/time results coordinate with each other. An example of when the returned results coordinate with each other is when the same advertising image is obtained. Notably, even though the built-in Javascript Date construct is an object, it can be appreciated that such object could be replaced with a function or any other appropriate programming construct type.

Ultimately, any custom object, function, or other programming construct which enables pre-fetched data from these URL requests to be used in client browser 120 can be incorporated into this feature of the present invention.

This feature of the present invention is also not limited to the aforementioned built-in Javascript random number function and date/time object. This feature can be extended or applied to any function, object, or other programming construct which benefits from modification and/or replacement.

(4) Browser Specifics Feature

Another feature of the present invention relates to the capture of browser specific information of the client browser. This feature ensures that characteristics of virtual browser 270 match that of client browser 120, so that URLs that are requested by client browser 120 upon execution of Javascript match the URLs that virtual browser 270 requests, in the case that the URLs depend upon browser-specific information.

In certain circumstances, Javascript creates URLs that depend on the individual browser specific information. This information may include, by way example and not of limitation, characteristics of a browser such as the height or width of the browser (i.e., a window of the browser), the maximum height or width of the browser (i.e., a window of the browser), a color depth, a pixel depth, a timezone, a Java-enabled query result, a browser history characteristic of a web browser, a browser identity, a browser version, a browser compatibility, installed browser plugins, other window geometry, etc.

For instance, a web page may contain Javascript which determines the browser window height and width and decides whether to request a large high-resolution version of an image or alternatively, a smaller low-resolution version. If the web page is being loaded on a client PC is a netbook or other device having a small screen, then the low-resolution version may be preferred. On the other hand, if the web page is being loaded on a desktop with a large monitor, then the high-resolution version is preferred.

Also, a web page may contain Javascript which determines whether the browser has a Adobe Flash plugin installed. If the Flash plugin is installed, Flash-enabled content may be preferred. On the other hand, if the Flash plugin is not installed, non-Flash-enabled content is preferred.

Synchronization of specific information of client browser 120 with virtual browser 270 is important in the present invention in order for the Javascript executed between the two browsers to perform identically. For instance, if different URLs are formed by the executed Javascript between client browser 120 and virtual browser 270, then the pre-fetched content by virtual browser 270 is unsuitable for client browser 120, as the URLs do not match. Accordingly, providing virtual browser 270 with the browser specifics of client browser 120 ensures that the same URLs are created by executed Javascript in both virtual browser 270 and client browser 120.

Figure 16:
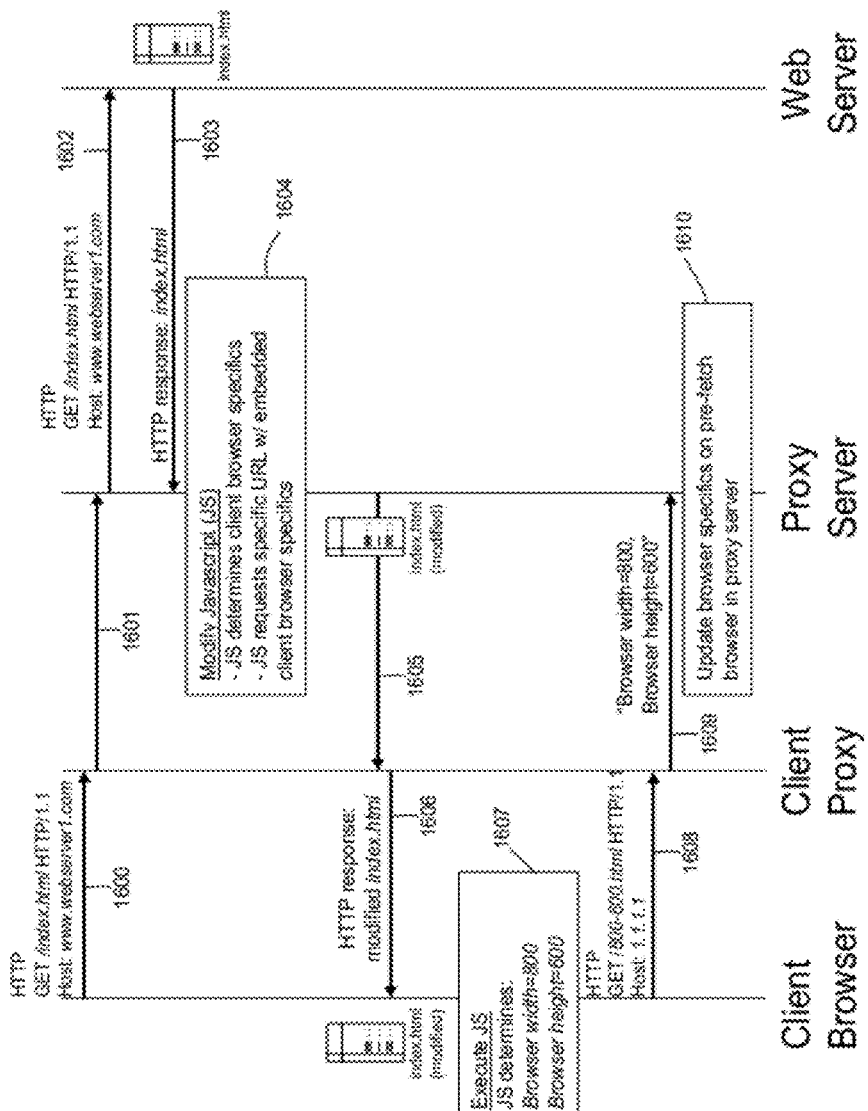
FIG. 16 is a sequence diagram showing obtaining of the client browser specifics according to the present invention.
Figure 17:
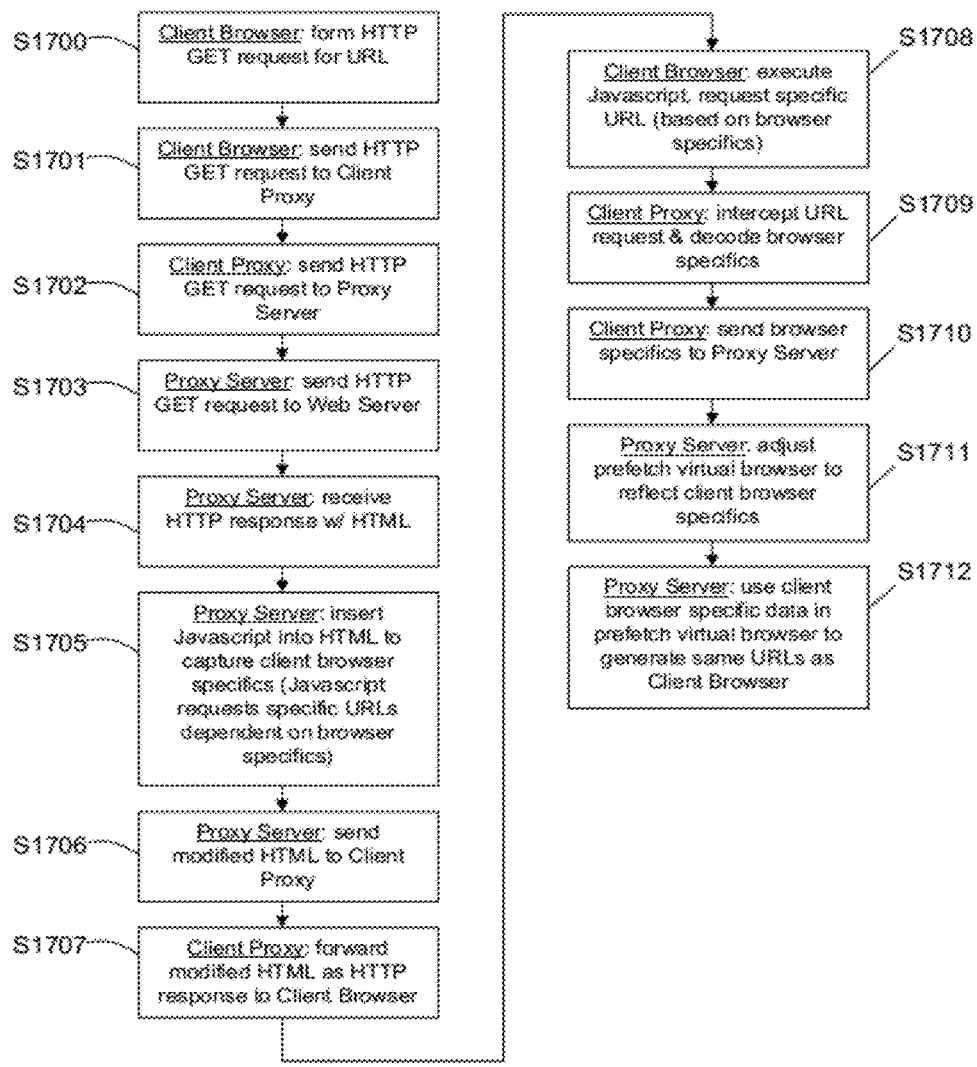
FIG. 17 is a flow diagram showing the client browser specifics obtaining feature of the present invention.

FIGS. 16 and 17 describe this browser specifics feature of the present invention. FIG. 16 illustrates the communications between the various components for this feature. FIG. 17 describes the operation of client browser 120, client proxy program 141, and proxy server 250 in transferring client browser specifics information.

In step S1700, client browser 120 requests a URL, similar to step S700. Again, the request is usually by a user of client PC 110 requesting the URL.

In step S1701, client browser 120 forms a HTTP GET request 1600 for the URL and sends it (via a network connection) according to the network settings in TCP/IP stack 121, similar to step S701.

In step S1702, client proxy program 141 intercepts request 1600 and relays the request to ISP sub-system 200 as communication 1601, similar to step S702.

In step S1703, proxy server 250 forms its own HTTP GET request 1602 for the same URL, similar to step S601.

In step S1704, proxy server 250 receives HTTP response 1603 (that was generated and sent by the web server), similar to step S602.

In step S1705, proxy server 250 modifies Javascript in the HTML document within HTTP response 1603, as seen in block 1604 in FIG. 16. Specifically, control module 260 instructs Javascript modifier module 262 to insert Javascript code into the HTML document. The inserted Javascript code, when executed on a web browser, will extracts browser specifics information from that browser. Again, this information may include a height, a width, a maximum height or width, a color depth, a pixel depth, a timezone, a Java-enabled query result, or a browser history characteristic of the web browser. However, the information could also include any other information regarding the web browser, its underlying device, or any other specific information.

Note that unlike many other instances in this description where both proxy server 250 and client PC execute the same Javascript, here there is no need for proxy server 250 to execute the inserted Javascript since it is intended for client browser 120. Thus, proxy server 250 may ignore, skip, or otherwise not execute the inserted Javascript.

In the preferred embodiment, the executed Javascript code, after extracting the browser specific information, encodes the information into a specific URL. Thus, a web browser such as client browser 120, upon executing the Javascript, requests the specific URL.

In step S1706, control module 260 sends a communication 1605 containing HTML to client proxy program 141. However, instead of the HTML containing the original Javascript, as in step S603, the HTML in communication 1605 contains the modified Javascript.

In step S1707, client proxy program 141 receives communication 1605. In accordance therewith, client proxy program 141 forms a HTTP response 1606 which contains the HTML document and transmits it to client browser 120, similar to step S704. In this case though, the HTML document includes the modified Javascript.

In step S1708, client browser 120 processes the HTML document, including executing the modified Javascript in the HTML document, as seen in block 1607 in FIG. 16. The modified Javascript, when executed, accumulates the browser specific information.

The obtained information preferably includes information inside the Javascript Document Object Model (DOM) within client browser 120. The information to be gathered may include:

| Browser Specific Information | Javascript variable/property |
|---|---|
| Screen height | window.screen.availHeight |
| Screen width | window.screen.availWidth |
| Browser window height | window.innerHeight |
| Browser window width | window.innerWidth |
| Browser has Java enabled? | window.navigator.javaEnabled( ) |
| Color depth | window.screen.colorDepth |
| Pixel depth | window.screen.pixelDepth |
| Timezone | Date( ).getTimezoneOffset( ) |
| Length of browser history | window.history.length |

However, the foregoing list is non-inclusive, and any other information can be included.

Further in step S1708, the modified Javascript, upon accumulating this information, forms a URL having the information embedded within. For example, the modified Javascript may concatenate the results into a string and append the string to a URL to be retrieved from a predetermined and unique hostname. An example of a URL to be requested might be "http://www.forstatspurposesonly.com/browserspecifics-availWidth1024-availHeight768". As can be seen, this URL communicates an available width and height of 1024×768. Client browser 120 also requests the URL using a HTTP GET request 1608. Since TCP/IP stack 121 is configured to route Internet communications through router 130, request 1608 is received by router 130.

For simplicity, only the browser width and height is shown in FIG. 16. As seen in FIG. 16, client browser 120 executes the modified Javascript and as a result determines that the browser width is 800 pixels and the browser height is 600 pixels. The modified Javascript is further configured to form a URL with a particular host (e.g., IP address 1.1.1.1 in FIG. 16). The modified Javascript then appends the information as the path for the URL such that the information can be easily decoded from the URL. In FIG. 16, this is accomplished using the path "/800-600.html" (i.e., the URL contains the width and height and thus is a function of window geometry). However, one of ordinary skill in the art would understand that any other construction of URLs could also be applied.

In step S1709, client proxy program 141 intercepts HTTP GET request 1608. Client proxy program 141 recognizes from the format of the URL within request 1608 that the URL corresponds to client browser specific information. Client proxy program 141 extracts the client browser specific information from the URL.

Note that client proxy program 141 preferably does not send the HTTP GET request 1608 to the Internet since there is no need to do so; indeed, the host name in the request could even be fictitious because the HTTP GET request is merely a vehicle to communicate the browser specific information to client proxy program 141. However, in the preferred embodiment, client proxy program 141 returns a HTTP response (e.g., 404 not found error) to this HTTP GET request to client browser 120, so that this request does not remain pending in client browser 120.

In step S1710, client proxy program 141 sends the client browser specific information, in communication 1609, to proxy server 250. As previously noted, the preferred embodiment preferably utilizes a proprietary network protocol format, but any format capable of effectively transmitting the information can be used.

In the preferred embodiment, the specific information is sent only if it is new or has been modified. If the specific information matches that of the previously-sent information, re-sending of this identical information is not required and is thus not performed. However, the specific information may alternatively be sent to proxy server 250 in every instance.

In step S1711, proxy server 250 receives communication 1609. Upon receiving communication 1609, control module 260 stores the client browser specific information, as seen in block 1610 in FIG. 16. Control module 260 then ensures that any further Javascript executed by virtual browser 270 which retrieves or otherwise uses browser specific information returns (i.e., uses) the stored browser specific information of client browser 120.

Control module 260 may accomplish this in one of numerous ways. In one approach, control module 260 may configure Javascript modifier module 262 to insert Javascript into future received HTML documents for virtual browser 270, whereby the inserted Javascript overwrites virtual browser's 270 browser specific information.

As another approach, control module 260 may configure Javascript modifier module 262 to modify the original Javascript so that all references to function calls to browser specific information are changed to the static value of the stored client browser specific information. For instance, if the stored client browser screen height value is 600, Javascript modifier module 262 replaces the Javascript code "x=window.screen.availHeight" with "x=600".

Accordingly, in step S1712, when virtual browser 270 later receives an HTML document for processing for virtual display, any URLs generated from Javascript execution, which are dependent on browser specifics information, will match URLs generated when client browser 120 also executes the Javascript.

Instead of encoding the client browser specific information in a URL associated with a HTTP GET request, the modified Javascript may alternatively encode the information using another format. For example, the modified Javascript may place the client browser specific information within a HTTP PUT request, a HTTP POST request, or a cookie. Like the URL method, client browser 120 transmits the request or cookie (e.g., via HTTP), which is then intercepted by client proxy program 141.

As another alternative, proxy server 250, instead of client proxy program 141, may perform the interception and decoding of communications containing embedded client browser specific information.

In the end, any particular technique for conveying client browser specific information may be employed as long as it is ultimately received by proxy server 250.

(5) Cookie Tracking Feature

Another feature of the present invention relates to the synchronization of cookies between client sub-system 100 and ISP sub-system 200. This feature allows a close representation of client browser's 120 cookies to be replicated in virtual browser 270. Using this feature, any URLs which depend on client browser's 120 stored cookies are accurately replicated in virtual browser 270.

Figure 18:
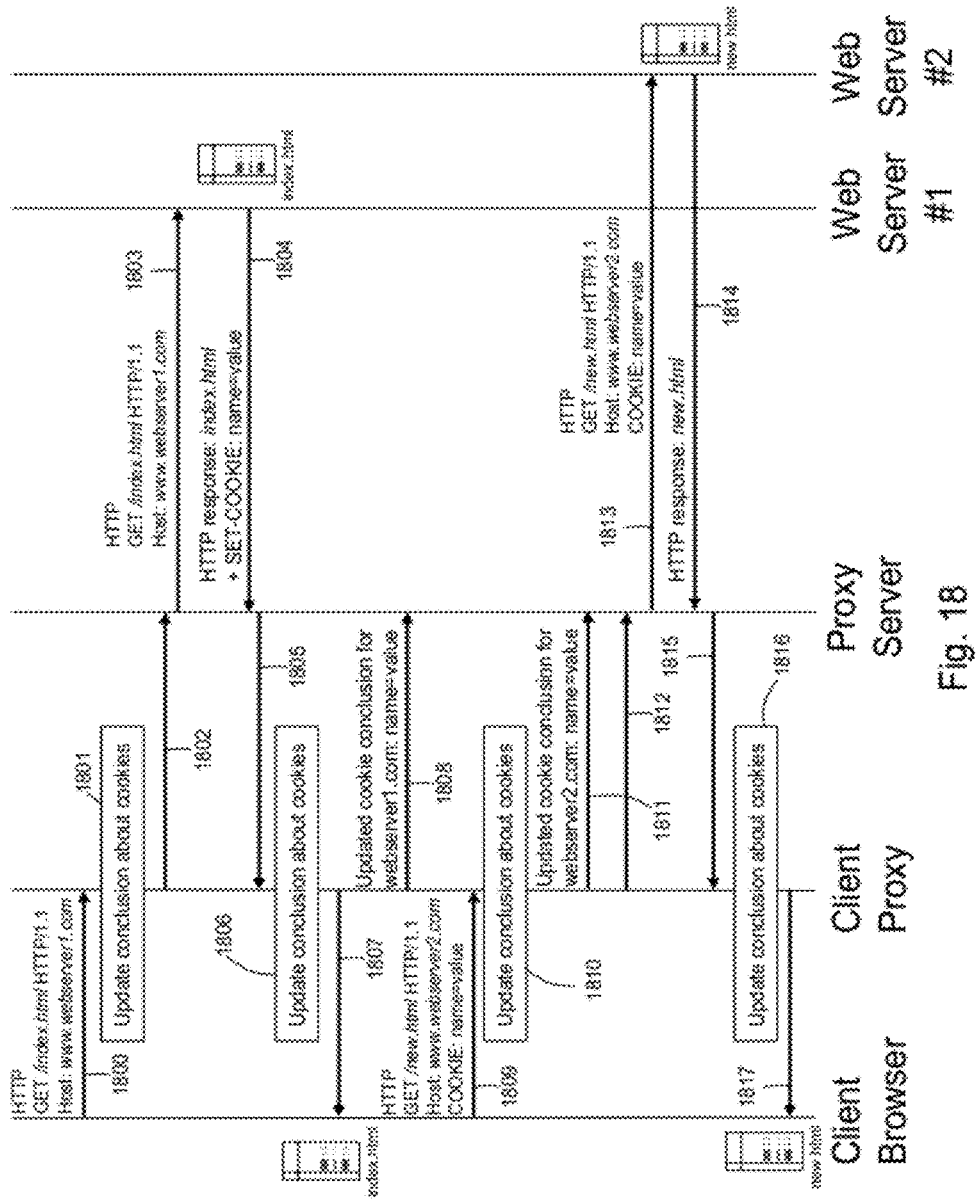
FIG. 18 is a sequence diagram showing the cookie tracking feature of the present invention.
Figure 19:
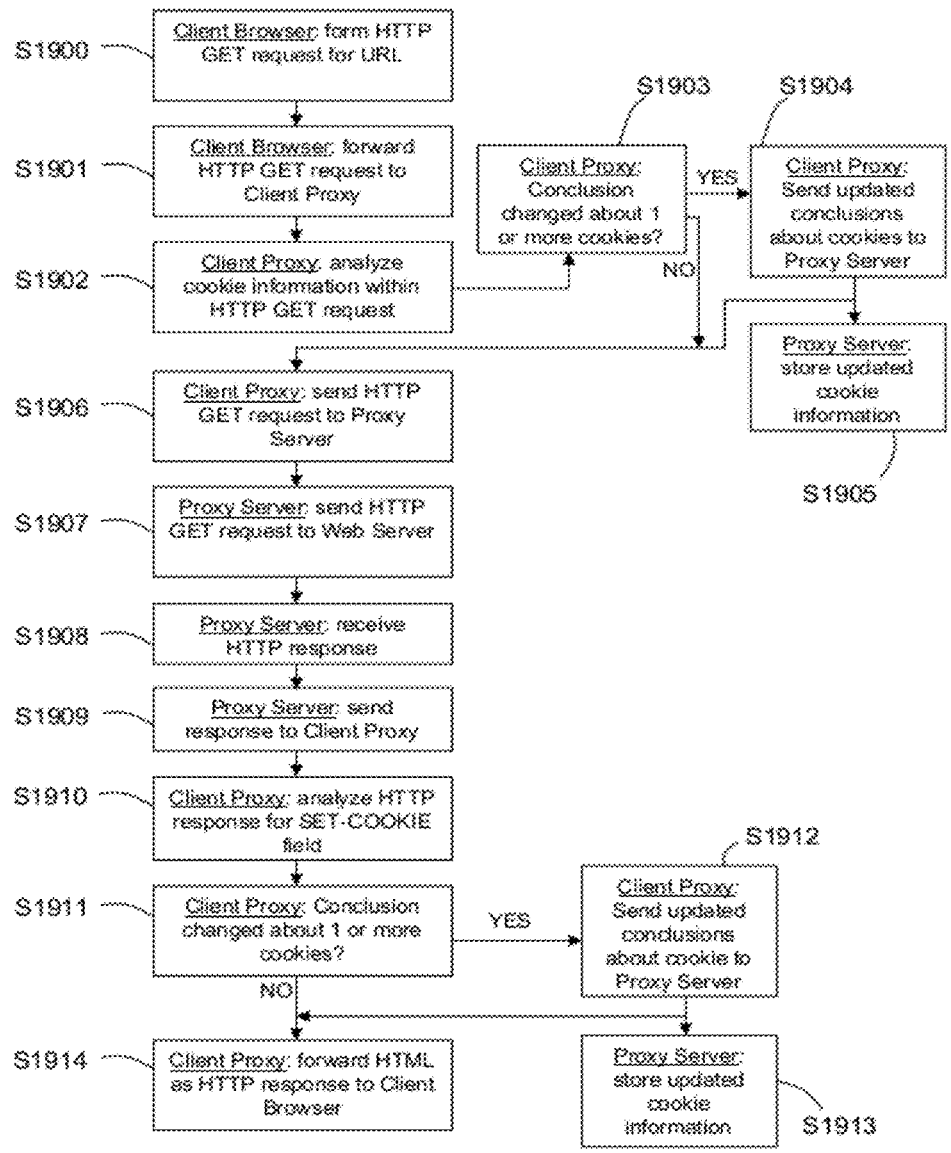
FIG. 19 is a flow diagram showing the cookie tracking feature of the present invention, when the client proxy does not contain promised or pre-fetched data.
Figure 20:
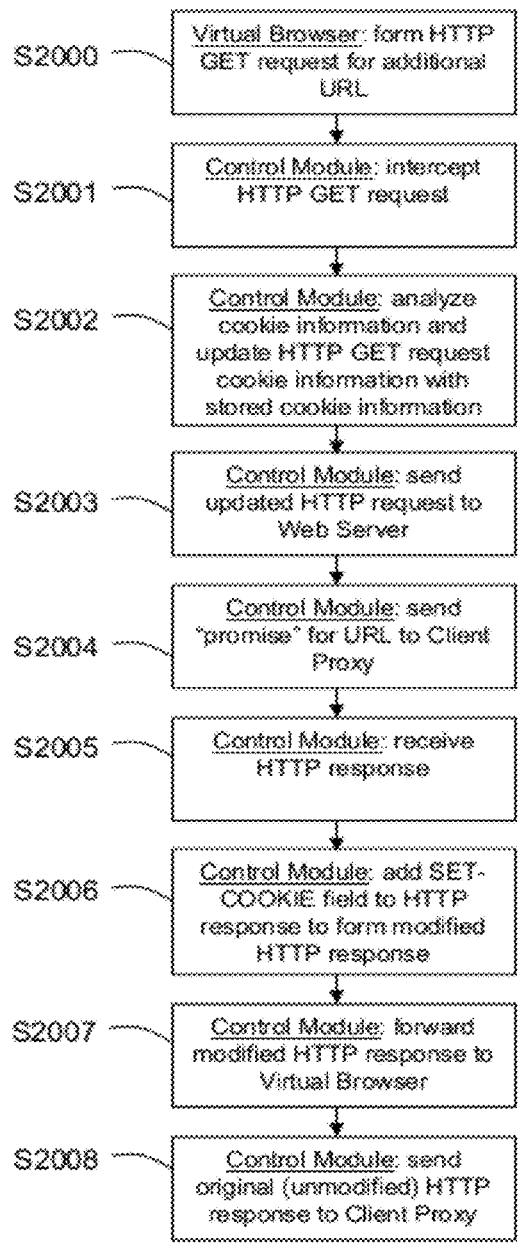
FIG. 20 is a flow diagram showing the cookie tracking feature of the present invention, when the proxy server receives a HTTP request from the virtual browser.
Figure 21:
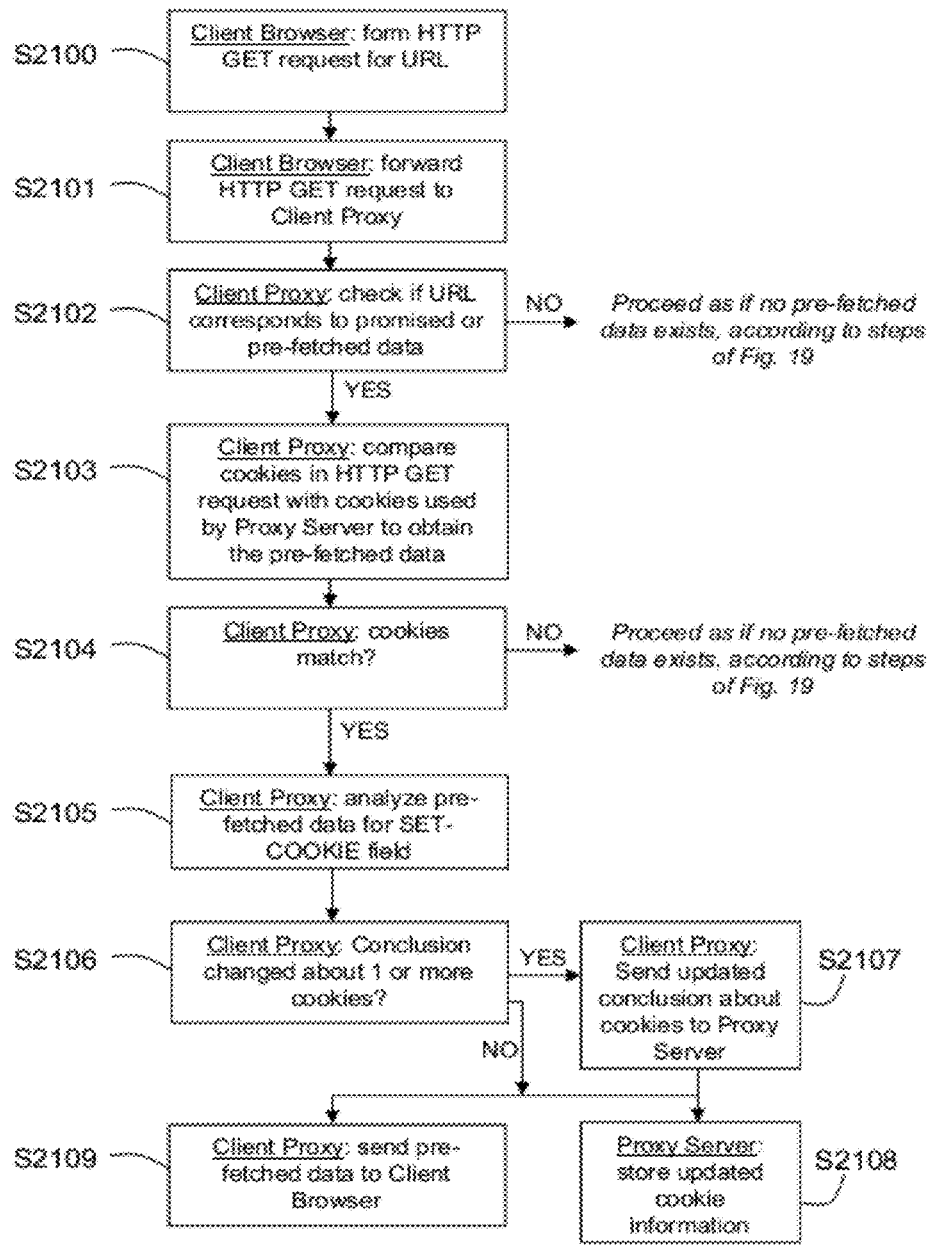
FIG. 21 is a flow diagram showing the cookie tracking feature of the present invention, when the client proxy contains promised or pre-fetched data.

FIGS. 18 through 21 describe this cookie tracking feature of the present invention. FIG. 18 illustrates the communications between the various components for this feature. FIG. 19 describes the operation of client proxy program 141 and proxy server 250 for this feature, when client proxy program 141 does not contain promised or pre-fetched data. FIG. 20 describes the operation of proxy server 250 when it receives a HTTP request from virtual browser 270. FIG. 21 describes the operation of client proxy program 141 and proxy server 250 for this feature, when client proxy program 141 contains promised or pre-fetched data.

This feature is accomplished by client proxy program 141 and/or proxy server 250 inspecting all HTTP GET requests from client browser 120 and all HTTP responses to client browser 120. In the inspection process, client proxy program 141 and/or proxy server 250 monitor the "COOKIE" fields of HTTP GET requests, and monitor the "SET-COOKIE" fields of HTTP responses. In the preferred embodiment, client proxy program 141 performs the inspection and monitoring steps, and sends any updated conclusions about cookies to proxy server 250 to update the contents within cookie tracker module 261.

The cookie tracking feature of the present invention will next be described with respect to the steps of FIG. 19 in relation to the communications and processes depicted in FIG. 18. In FIG. 18, communications 1800, 1802-1805, 1807-1809, 1811-1815 and 1817, and blocks 1801 and 1806 demonstrate an instance when client browser 120 does not have an existing cookie for the URL, but where a new cookie is attached to the HTTP response. Communications 1811-1815 and 1817, and blocks 1810 and 1816 demonstrate an instance where client browser 120 has an existing cookie and attaches it to a HTTP GET request.

The instance when client browser 120 does not have an existing cookie for the URL will first be discussed, with references to communications 1800, 1802-1805, 1807-1809, 1811-1815 and 1817, and blocks 1801 and 1806 in FIG. 18.

In step S1900, client browser 120 requests a URL, similar to step S700. Again, the request is usually by a user of client PC 110 requesting the URL.

In step S1901, client browser 120 forms a HTTP GET request 1800 for the URL and sends it (via a network connection) according to the network settings in TCP/IP stack 121, similar to step S701. Client browser 120 does not hold an existing cookie for webserver1.com, so request 1800 does not contain a COOKIE field.

In step S1902, client proxy program 141 intercepts request 1800. Client proxy program 141 checks request 1800 to determine if the request contains a COOKIE field, and compares it against existing conclusions it has previously made regarding the cookies stored within client browser 120. The cookie conclusions are data relating to cookies believed to be stored within client browser 120. The conclusions may include information on whether a cookie exists, whether a cookie has been deleted, an expiration date and time of a cookie, the domain of the cookie, the path of the cookie, or any other cookie attribute. Conclusions about a cookie may involve a level of speculation on attributes of the cookie. For instance, if a previously unknown cookie is discovered and the domain and path of the cookie cannot be directly ascertained, client proxy program 141 may presume that the domain is the broad domain of the hostname, and that the path is the universal path ("/").

In step S1903, client proxy program 141 determines whether its existing conclusion about one or more cookies believed to be stored within client browser 120 has been changed, based on request 1800. Referring to FIG. 18, client proxy program 141 does not modify its cookie conclusions for webserver1.com. Steps S1902 and S1903 are collectively depicted as block 1801 in FIG. 18 for the instance of webserver1.com.

In step S1904, client proxy program 141 sends a communication containing updated conclusions about stored cookies to proxy server 250, if an updated conclusion is decided. In the instance of webserver1.com, no conclusion was updated, so no communication is sent.

In step S1905, proxy server 250 receives the updated cookie conclusions, if sent by client proxy program 141 in step S1904, and stores the updated cookie information in cookie tracker module 261.

In step S1906, client proxy program 141 relays request 1800 to ISP sub-system 200 as communication 1802.

In step S1907, proxy server 250 forms (i.e., generates) its own HTTP GET request 1803 for the same URL as HTTP GET request 1800, similar to step S601.

In step S1908, proxy server 250 receives HTTP response 1804 from the web server, similar to step S602. In this case, response 1803 contains a SET-COOKIE field with cookie information.

In step S1909, proxy server 250 sends a communication 1805 including the contents of HTTP response 1804 to client proxy program 141.

In step S1910, client proxy program 141 checks the contents of HTTP response within communication 1805 to determine if the response contains a SET-COOKIE field, and compares it against existing conclusions it has previously made regarding the cookies stored within client browser 120, in a similar manner to step S1902.

In step S1911, client proxy program 141 determines whether its existing conclusion about one or more cookies believed to be stored within client browser 120 or to be imminently stored within client browser 120 will be changed, based on HTTP response 1804, in a similar manner to step S1903. This may commonly occur if the HTTP response contains a SET-COOKIE field, as seen HTTP response 1804 in FIG. 18. Referring to FIG. 18, client proxy program 141 modifies its cookie conclusions for webserver1.com, based on the HTTP responses. Steps S1910 and S1911 are collectively depicted as block 1806 in FIG. 18 for the instance of webserver1.com.

In step S1912, client proxy program 141 sends a communication containing updated conclusions about stored cookies to proxy server 250, as seen in communication 1808 for webserver1.com.

In step S1913, proxy server 250 receives the updated cookie conclusions, if sent by client proxy program 141 in step S1912, and stores the updated cookie information in cookie tracker module 261.

In step S1914, client proxy program 141 forms a HTTP response 1807 which contains the HTML document from the HTTP response 1804 and forwards the HTTP response 1807 to client browser 120, similar to step S704.

The instance when client browser 120 has an existing cookie for the URL will next be discussed, with references to communications 1811-1815 and 1817, and blocks 1810 and 1816 in FIG. 18.

In step S1900, client browser 120 requests a URL, similar to step S700. Again, the request is usually by a user of client PC 110 requesting the URL.

In step S1901, client browser 120 forms a HTTP GET request 1809 for the URL and sends it (via a network connection) according to the network settings in TCP/IP stack 121, similar to step S701. Client browser 120 holds an existing cookie for webserver2.com, so request 1809 contains a COOKIE field.

In step S1902, client proxy program 141 intercepts request 1809. Client proxy program 141 checks request 1809 to determine if the request contains a COOKIE field, and compares it against existing conclusions it has previously made regarding the cookies stored within client browser 120. The cookie conclusions are data relating to cookies believed to be stored within client browser 120. The conclusions may include information on whether a cookie exists, whether a cookie has been deleted, an expiration date and time of a cookie, the domain of the cookie, the path of the cookie, or any other cookie attribute. Conclusions about a cookie may involve a level of speculation on attributes of the cookie. For instance, if a previously unknown cookie is discovered and the domain and path of the cookie cannot be directly ascertained, client proxy program 141 may presume that the domain is the broad domain of the hostname, and that the path is the universal path ("/").

In step S1903, client proxy program 141 determines whether its existing conclusion about one or more cookies believed to be stored within client browser 120 has been changed, based on request 1809. This may commonly occur if request 1809 contains a COOKIE field that holds a new cookie previously unknown to client proxy program 141, as seen in request 1809. Referring to FIG. 18, client proxy program 141 modifies its cookie conclusions for webserver2.com, based on the HTTP GET requests. Steps S1902 and S1903 are collectively depicted as blocks 1810 in FIG. 18 for the instance of webserver2.com.

In step S1904, client proxy program 141 sends a communication containing updated conclusions about stored cookies to proxy server 250, as seen in communication 1811 for webserver2.com.

In step S1905, proxy server 250 receives the updated cookie conclusions, if sent by client proxy program 141 in step S1904, and stores the updated cookie information in cookie tracker module 261.

In step S1906, client proxy program 141 relays request 1809 to ISP sub-system 200 as communication 1812.

In step S1907, proxy server 250 forms (i.e., generates) its own HTTP GET request 1813 for the same URL as HTTP GET request 1809, similar to step S601.

In step S1908, proxy server 250 receives HTTP response 1814 from the web server, similar to step S602. In this case, response 1814 does not contain a SET-COOKIE field with cookie information.

In step S1909, proxy server 250 sends a communication 1815 including the contents of HTTP response 1814 to client proxy program 141.

In step S1910, client proxy program 141 checks the contents of HTTP response within communication 1815 to determine if the response contains a SET-COOKIE field, and compares it against existing conclusions it has previously made regarding the cookies stored within client browser 120, in a similar manner to step S1902.

In step S1911, client proxy program 141 determines whether its existing conclusion about one or more cookies believed to be stored within client browser 120 or to be imminently stored within client browser 120 will be changed, based on HTTP response 1814, in a similar manner to step S1903. This may commonly occur if the HTTP response contains a SET-COOKIE field. Referring to FIG. 18, client proxy program 141 does not modify its cookie conclusions for webserver2.com. Steps S1910 and S1911 are collectively depicted as block 1806 in FIG. 18 in the instance of webserver2.com.

In step S1912, client proxy program 141 sends a communication containing updated conclusions about stored cookies to proxy server 250, if an updated conclusion is decided. In the instance of webserver2.com, no conclusion was updated, so no communication is sent.

In step S1913, proxy server 250 receives the updated cookie conclusions, if sent by client proxy program 141 in step S1912, and stores the updated cookie information in cookie tracker module 261.

In step S1914, client proxy program 141 forms a HTTP response 1817 which contains the HTML document from the HTTP response 1814 and forwards the HTTP response 1817 to client browser 120, similar to step S704.

The operation of proxy server 250 will now be described with respect to FIG. 20. The steps in FIG. 20 depict the pre-fetching operation of the present invention, when utilizing the cookie tracking feature of the present invention. These steps are executed as the pre-fetching operation is initiated and virtual browser 270 generates a request for an additional URL for pre-fetching.

In Step S2000, virtual browser 270, while processing an HTML document for a URL, produces a request for an additional URL, and thus forms a HTTP GET request for the additional URL.

In step S2001, control module 260 intercepts the request for the additional URL.

In step S2002, control module 260 analyzes the cookie information within the HTTP GET request. Control module 260 accesses the stored cookies within cookie tracker module 261 to determine whether the HTTP GET request would contain a cookie field if it were sent by client browser 120. If control module 260 determines that a cookie would have been attached to the request if sent by client browser 120, it updates the cookie information within the HTTP GET request with the cookie information stored in the cookie tracker module 261. In the preferred embodiment, control module 260 modifies only the first HTTP GET request for a specific host within a web page to be loaded. Since cookies may be further modified with SET-COOKIE fields within the web page or with Javascript execution, the modification of only the first HTTP GET request for a specific host ensures that the further cookie modifications within the web page are properly executed.

In step S2003, control module 260 sends the updated HTTP GET request, which contains the updated cookies, to the appropriate web server, similar to step S605.

In step S2004, control module 260 sends a pre-fetch notification ("promise") to client proxy program 141, informing client proxy program 141 that proxy server 250 has started the process of pre-fetching content for the additional URL. This step is similar to step S606.

In step S2005, control module 260 receives the HTTP response to the updated HTTP GET request, similar to step S607.

In step S2006, control module 260 modifies the HTTP response to produce a modified HTTP response that is forwarded to virtual browser 270. The modified HTTP response contains a SET-COOKIE field, which will update and correct any inconsistencies of stored cookies within cookie storage module 271 of virtual browser 270. For instance, if a cookie should be added to cookie storage module 271 within virtual browser 270, a SET-COOKIE field will be added which contains such cookie information. On the other hand, if a cookie is to be deleted within virtual browser 270, a SET-COOKIE field with already-expired expiration attributes is added to the HTTP response. In the preferred embodiment, control module 260 modifies only the first HTTP response for a specific host within a web page to be loaded. Since cookies may be further modified with SET-COOKIE fields within the web page or with Javascript execution, the modification of only the first HTTP response for a specific host ensures that the further cookie modifications within the web page are properly executed.

In step S2007, control module 260 forwards the modified HTTP response to virtual browser 270 such that virtual browser 270 can process the information within as if for virtual display.

In step S2008, control module 260 forwards the original, unmodified HTTP response to client proxy program 141. Since the objective is for proxy server 250 to replicate the cookies within client browser 120, the cookies are already stored within client browser 120. Accordingly, no cookie modification is required for client browser 120.

By performing these steps of FIG. 20, control module 260 corrects inconsistencies within virtual browser 270 relating to its cookie storage module 271 so that the cookie storage module 271 in virtual browser 270 is maintained as close as possible to the cookies within client browser 120.

The operation of the cookie tracking feature of the present invention, in an instance when client proxy program 141 contains promised or pre-fetched data, will now be described with respect to FIG. 21.

In step S2100, client browser 120 forms a HTTP GET request for an additional URL, similar to step S706. The additional URL corresponds to additional content required for displaying the desired web page in client browser 120.

In step S2101, client browser 120 forwards the HTTP GET request to client proxy program 141, similar to step S707.

In step S2102, client proxy program 141 checks whether the URL corresponds to promised or pre-fetched data, similar to step S711. If the URL does not correspond to such data, client proxy program 141 proceeds as if no pre-fetched data exists or is forthcoming, using the steps of FIG. 19. That is, client proxy program 141 treats the HTTP GET request as if it were a new, separate URL. If the URL corresponds to promised or pre-fetched data, client proxy program 141 proceeds to step S2103, after promised data has been received as pre-fetched data.

In step S2103, client proxy program 141 compares any cookies in the HTTP GET request for the additional URL with cookies that were used by proxy server 250 to obtain the pre-fetched data. This cookie information is preferably attached with the pre-fetched data as the data is sent by proxy server 250 to client proxy program 141.

In step S2104, client proxy program 141 checks whether the cookies match between the HTTP GET request and the cookies used for pre-fetching. A cookie match indicates that the pre-fetched data is identical to data that would be returned if client browser 120 had made the request directly to the web server. In the preferred embodiment, a match is satisfied when the cookies in the HTTP GET request are a subset of the cookies used for pre-fetching, and that the values of the cookies in the HTTP GET request match the values of the cookies used for pre-fetching. However, a match is acceptable even if additional cookies or values within the pre-fetching set of cookies are present. That is, the cookies match even if the cookies used for pre-fetching contain additional information (e.g., additional cookies or fields) not present in the cookies in the HTTP GET request.

In other words, a match is acceptable even if additional cookies within the prefetching set of cookies are present. In this context additional cookies means additional names where a cookie is a name/value pair. That is, the cookies match even if the cookies used for prefetching contain additional cookies (name/value pairs) provided that the prefetch request had the same name/value pairs for each of the client browser's cookie name/value pairs. For example, assume that the client proxy receives a prefetched image along with three cookies. If an HTTP GET request generated by the client apparatus's web browser has two cookies whose name/value pairs match two of those three cookies, then the client proxy concludes that a match is present and that the prefetched image is usable to fulfill the HTTP GET request.

If the cookies do not match, the pre-fetched data may not correspond to the actual data that would be returned. Accordingly, client proxy program 141 cannot rely on the pre-fetched data, and thus proceeds as if no pre-fetched data exists, according to the steps of FIG. 19.

If the cookies match, client proxy program 141 proceeds to step S2105.

In step S2105, client proxy program 141 checks the contents of the pre-fetched data to determine if the response contains a SET-COOKIE field, and compares it against existing conclusions it has previously made regarding the cookies stored within client browser 120, similar to step S1910.

In step S2106, client proxy program 141 determines whether its existing conclusion about one or more cookies believed to be stored within client browser 120 or will be imminently stored within client browser 120 will be changed, based on the pre-fetched data, similar to step S1911.

If a conclusion has changed, then client proxy program 141 proceeds to step S2107, which sends the updated conclusion to proxy server 250, similar to step S1912.

In step S2108, proxy server 250 receives the updated cookie conclusions and stores the updated cookie information in cookie tracker module 261.

In step S2109, client proxy program 141 forwards the pre-fetched data to client browser 120 as a HTTP response, similar to step S712. As such, client browser 120 receives the accurate content corresponding to the additional URL.

As seen in FIGS. 18-21, this cookie tracking feature allows virtual browser 270 to access equivalent cookies as client browser 120, thereby allowing more pre-fetched content from the pre-fetch operation of proxy server 250 to be matched, and thus suitably provided to client browser 120.

While the above preferred embodiment uses client proxy program 141 to track cookies, it can also be appreciated that proxy server 250 alone or a combination of client proxy program 141 and proxy server 250 can be used to implement this feature of the present invention.

Preferably, both client proxy program 141 and control module 260 perform cookie tracking.

More detail about the above-discussed cookie tracking carried out by the preferred embodiment will now be discussed. A cookie, as far as cookie tracking purposes is concerned, has the following attributes: (1) Name—a string; (2) Value—a string; (3) Domain—e.g. ".google.com"; (4) Path—a file path, e.g. "/" or "/downloads/recent"; and (5) Expiration—a date and time (or on session end).

A cookie can be placed into a browser via: (1) HTTP response header SET-COOKIE field—this provides all of the above attributes; (2) Javascript—this provides all of the above attributes, but cannot be observed by watching network activity; or (3) via either of the above mechanisms at a time when the browser's networking activity cannot be observed (e.g. when a laptop is moved and accesses the Internet via some other network).

A cookie appears in an HTTP request header's COOKIE field, but only the Name and Value attributes appear. The Domain, Path and Expiration cannot be directly determined from the HTTP request header's COOKIE field.

A cookie may be removed from a browser via: (1) HTTP response header SET-COOKIE field with an already expired expiration attribute; (2) Javascript; (3) the browser user explicitly commanding the browser to delete one or more cookies; or (4) the browser being restarted (which removes all cookies with a session end expiration attribute).

Cookie tracking involves observing all HTTP transactions (HTTP request headers and HTTP response headers) coming from a browser. The output of cookie tracking is the estimate of each tracked cookie's attributes. An output is provided when a given cookie is first found to exist, when a given cookie has been determined to be deleted and when the estimated value of one or more attributes has changed. The name and the value are typically known exactly. The domain, path and expiration are just estimated by cookie tracking when a cookie has only been observed in HTTP request header COOKIE fields, not in an HTTP response SET-COOKIE field.

Cookie tracking makes the usually valid assumption that a cookie is uniquely identified by name and by the overall domain (e.g. .google.com) with which it is associated.

Cookie tracking of HTTP response headers involves merely scanning for SET-COOKIE fields. When such a field is found, the expiration attribute is examined. The cookie is deleted (if present in the tracker's database) when the SET-COOKIE expiration attribute is already expired. Otherwise, the cookie is created within the tracker's data base with confirmed attribute settings if it is not already present. The cookie is updated with the SET-COOKIE attributes and with each attribute having a confirmed status when the cookie is already present in the cookie tracking database.

Cookie tracking of HTTP request headers involves discovering new cookies and placing them in the cookie tracker's database, refining the estimated attributes of cookies already in the cookie tracker's database and when appropriate deleting cookies already in the cookie tracker's database.

Every HTTP request header's cookie field is examined by the Cookie Tracker. The domain is determined from the HTTP request's hostname field (e.g. the domain for news.google.com is .google.com). If a new cookie is discovered (a unique cookie name/domain value), it is placed into the database with unconfirmed domain, path and expiration fields.

A database entry maintains the set of all hostnames that have been observed to have the cookie. This is used to refine the domain attribute.

A database entry also maintains the set of all paths that have been observed to have the cookie. This is used to refine the path attribute.

The initial estimate of the domain is the broadest possible interpretation (e.g. .google.com which matches all Google web sites, not .mail.google.com). The initial estimate of the path is the broadest possible interpretation (i.e. "/" or every path within the server. The initial estimated value of a discovered cookie's expiration is "never expire". The expiration estimated value is only updated when a SET-COOKIE for the cookie is later observed.

If an existing cookie is seen in a HTTP request it is used to refine the cookies estimated domain and path. If the hostname for the HTTP request is different from the hostname from the original discovery (e.g. news.google.com rather than www.google.com) this confirms that the domain is the whole domain (e.g. .google.com). The cookie's domain attribute is updated to a "confirmed" status.

If a cookie's domain has a confirmed status or the HTTP request is a request for the same hostname as when the cookie was discovered, the cookie's path is scrutinized next. The set of all paths seen to have the cookie is compared and the longest common path is calculated. The longest common path is maintained in the cookie's database entry. E.g., if the cookies was seen in /downloads/recent and /downloads/ancient then the longest common path is /downloads.

If an existing cookie is found to not be present in an HTTP request to a hostname which is known to match the cookie (e.g. the original hostname for an unconfirmed domain or the whole domain for a confirmed domain), then path may be refined or the cookie may be determined to have been deleted. The cookie is determined to have been deleted when: (1) the cookie has an unconfirmed path attribute and the HTTP request's path falls within the longest common path (e.g. the path is /downloads/favorites and the longest common path is /downloads); or (2) the cookie has a confirmed path attribute (from an HTTP response SET-COOKIE field) and the HTTP request's path field falls within the confirmed path.

In either case, the cookie is determined to be deleted because it should have been present if not already deleted.

An opportunity for refining the path estimate exists when: (1) an existing cookie with an unconfirmed path attribute is found to not be present in an HTTP request whose hostname matches either the cookie's confirmed domain or the original hostname; and (2) the HTTP request's path falls outside of the longest common path (e.g. the path is /uploads); and (3) the cookie does not appear in any of the HTTP request header's cookie fields.

The estimate for the cookie's path is updated to the first place the HTTP request's path differs from the longest common path. Following our example, the best estimate of the cookies path is moved from "/" to "/download".

That is how cookie tracking works. In the preferred embodiment of the present invention (the preferred embodiment having a virtual prefetch browser): cookie tracking is performed in the client proxy to track the end-user browser's cookies and also by the proxy server's control module (program) to track the virtual browser's cookies.

Also, as explained above, in the preferred embodiment, there is communication between the client proxy and the proxy server's control module to communicate updated cookie conclusions. In particular, a cookie tracker (such as the client proxy) provides an output whenever the estimate of a tracked cookie's attribute changes. Such an output includes the affected cookie's estimated attributes: name, value, domain, path, expiration. This output is communicated to the proxy server's control module which can use the output to update its cookie tracking database.

The proxy server's control module carries out its cookie tracking as it monitors the virtual browser's HTTP transactions. This is how discrepancies are discovered and fixed up (in modified virtual browser HTTP requests and by inserting SET-COOKIE fields into HTTP responses). In other words, the proxy server's control module can modify a virtual browser HTTP request by adding or changing a cookie in the request, in accordance with the control module's cookie tracking database, and can insert a SET-COOKIE field into a HTTP response to be provided by the control module to the virtual browser, also in accordance with the control module's cookie tracking database. For example, if the virtual browser generates an HTTP request, and the control module determines based on the cookie tracking database that the request is lacking a cookie or that it contains an outdated cookie, then the control module can add or update the cookie, as the case may be, thereby forming a modified HTTP request. If the control module wishes to update the virtual browser's stored cookies, then the control module may, for example, use a SET-COOKIE field in a HTTP response to be provided by the control module to the virtual browser so as to provide a cookie generated by the control module in accordance with the cookie tracking database. As a result, the virtual browser stores the cookie in its cookie storage.

As can be seen from the foregoing, in the preferred embodiment, the client proxy sends cookie conclusions via a network data communication to the proxy server. These cookie conclusions, which are obtained by the client proxy using the cookie tracking method discussed above, may provide the proxy server (which is also using the cookie tracking method at its end) with an even better estimation of the status of cookies actually stored by the client apparatus's web browser. This type of cookie synchronization (or estimated cookie synchronization as it were) allows the proxy server, when pre-fetching content on behalf of that web browser, to use cookies as close as possible to those that the web browser would use.

Preferably, the cookie conclusions are sent from the client proxy to the proxy server separate and apart from cookie fields in an HTTP header from the client apparatus's web browser (e.g., an HTTP request generated by the client apparatus's web browser), and more preferably are sent separate and apart from cookie fields in any HTTP header or information in those cookie fields.

(6) Web Page Response Time Feature

A further feature of the present invention relates to the tracking of the time required for the client browser to fully load a web page. This feature allows statistics to be accumulated to evaluate the performance of the present invention and to adjust any system settings for optimal operation.

Figure 22:
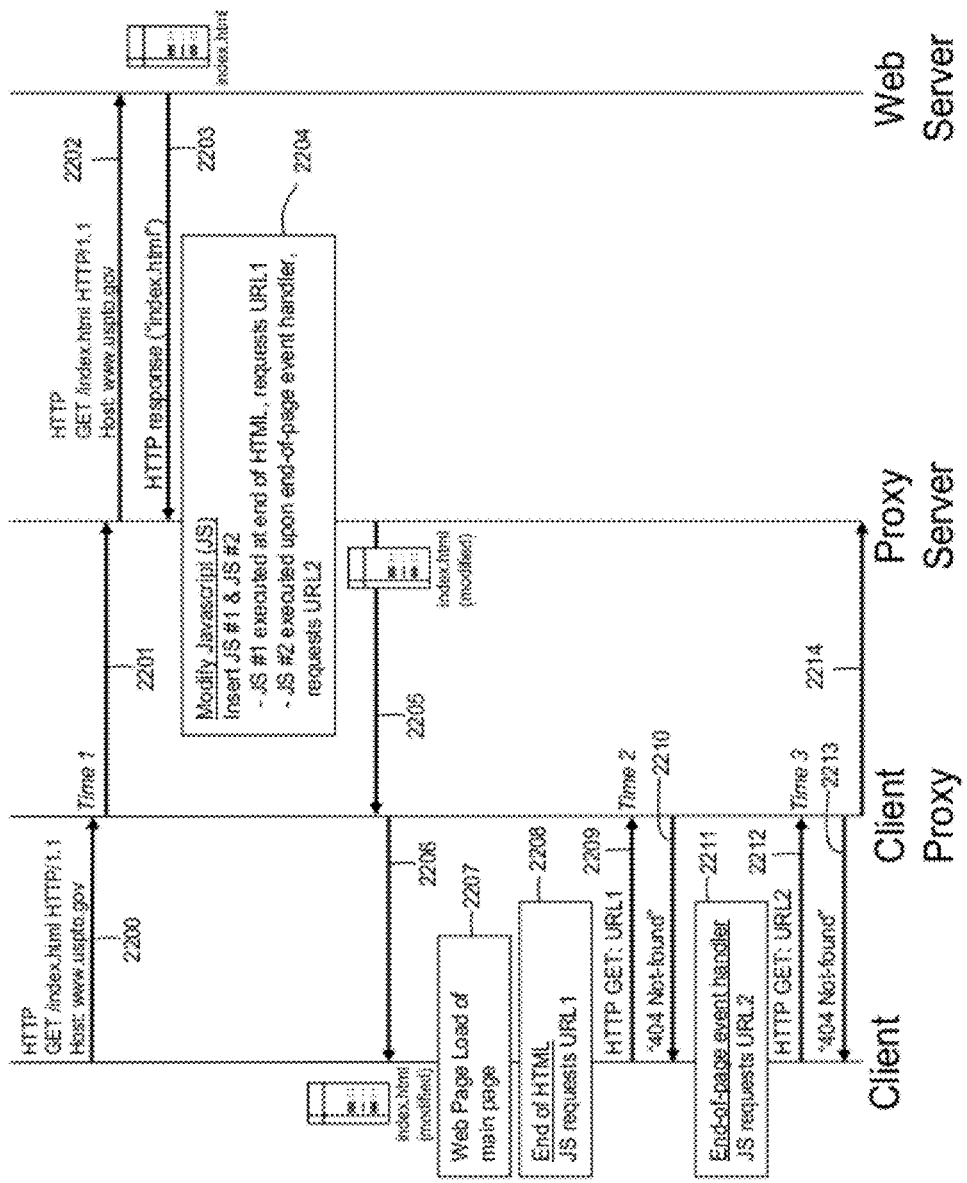
FIG. 22 is a sequence diagram showing the web page response time feature of the present invention.
Figure 23:
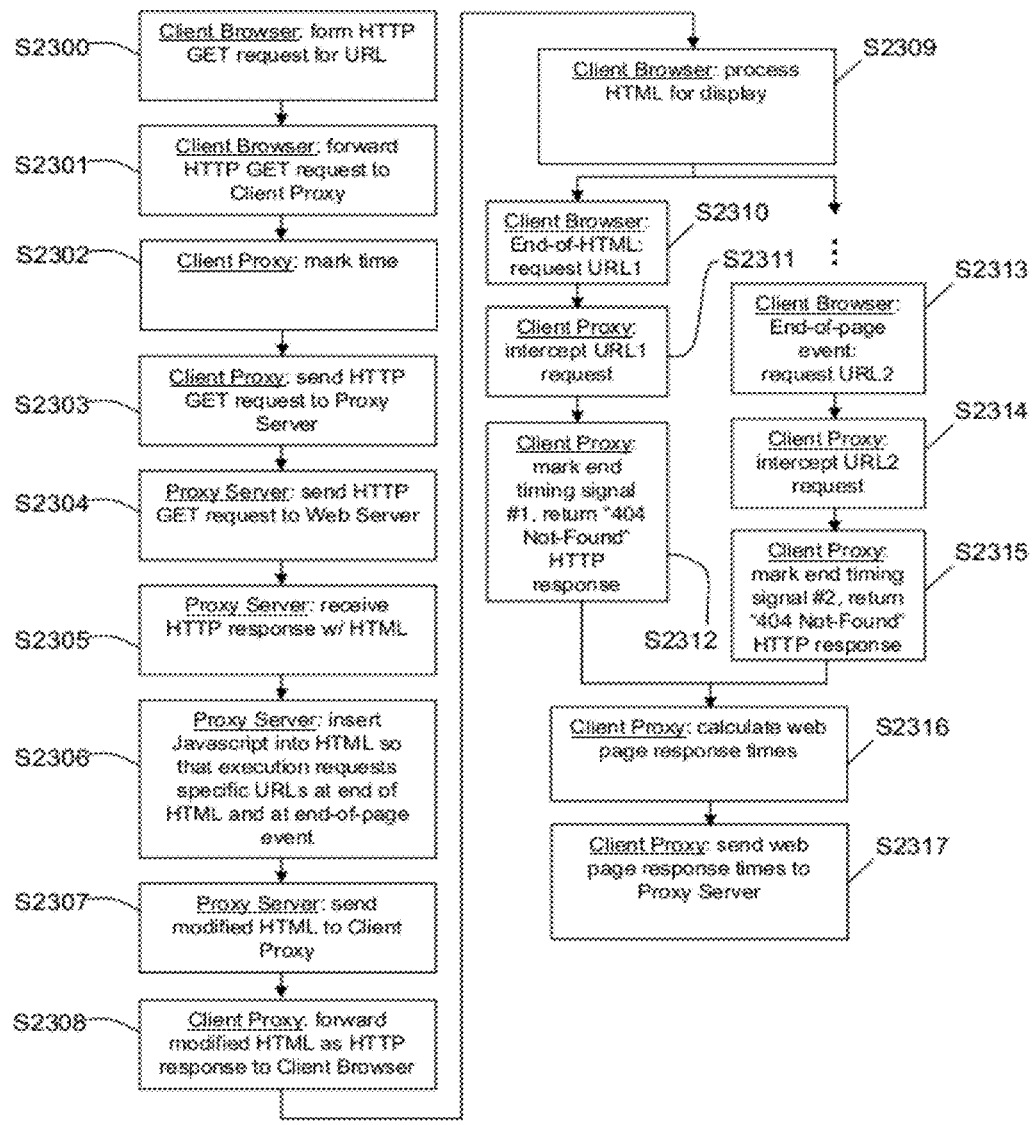
FIG. 23 is a flow diagram showing the web page response time feature of the present invention.

FIGS. 22, 23, and 26 describe this web page response time feature of the present invention. FIG. 22 illustrates the communications between the various components for this feature. FIG. 23 describes the operation of client browser 120, client proxy program 141, and proxy server 250 for this feature. FIG. 26(a) shows sample C# code that creates a Javascript fragment for generating an HTTP request upon a page load event. FIG. 26(b) shows sample C# code which creates a Javascript fragment for generating a HTTP request when the end of the HTML has been parsed.

In step S2300, client browser 120 requests a URL, similar to step S700. Again, the request is usually by a user of client PC 110 requesting the URL.

In step S2301, client browser 120 forms a HTTP GET request 2200 for the URL and sends it (via a network connection) according to the network settings in TCP/IP stack 121, similar to step S701.

In step S2302, client proxy program 141 intercepts request 2200. Client proxy program 141 marks the time that it receives request 2200 as the begin-time ("Time 1"). That is, the begin-time corresponds to the time that client proxy program 141 receives the first HTTP request for a web page.

In step S2303, client proxy program 141 relays request 2200 to ISP sub-system 200 as communication 2201, similar to step S702.

In step S2304, proxy server 250 forms its own HTTP GET request 2202 for the same URL, similar to step S601.

In step S2305, proxy server 250 receives HTTP response 2203 from the web server, similar to step S602.

In step S2306, proxy server 250 inserts Javascript in the HTML document within HTTP response 2203, as seen in block 2204 in FIG. 22. Specifically, control module 260 instructs Javascript modifier module 262 to insert Javascript code into the HTML document. The inserted Javascript code, when executed on a web browser, causes the web browser to perform an action such that ultimately, proxy server 250 receives data representing the web page response time. Sample code for inserting such Javascript is depicted in FIGS. 26(a) and 26(b). In the preferred embodiment, client proxy program 141 processes start and end times to calculate the final web page response time, and sends the calculated response time to proxy server 250. However, one of ordinary skill in the art will appreciate that proxy server 250, or a combination of client proxy program 141 and proxy server 250, may perform such processing and calculations.

In the preferred embodiment, two different time values are determined. However, one of ordinary skill in the art will appreciate that either of the two time values, or any other time value representing the end of the web page loading process may be alternatively used.

As previously mentioned, the begin-time value is the time when client proxy program 141 (and thus in the preferred embodiment, router 130) first receives HTTP request 2200. It can be appreciated that this time is a close approximation to time when the client browser 120 transmits HTTP request 2200. This is because network link 101 between client PC 110 and router 130 is customarily a low-latency network, particularly when compared to the higher-latency satellite links 20 and 30. Therefore, in the preferred embodiment, the recorded begin-time is the point when client proxy program 141 receives the initial HTTP request. Alternatively, a different response time may be calculated, whereby a page start URL may be inserted into the beginning of the HTML document, such that the begin time is the time when client proxy program 141 receives a HTTP GET request for the page start URL.

The first end-time value is the time when the web browser has finished processing the HTML. This is accomplished by inserting additional first Javascript code into the HTML document as close to the end of the document as possible. Preferably, the inserted Javascript is placed after all other Javascript code and just before the </body> tag, if there are no scripts after the tag.

The second end-time value is the time when the web browser has finished processing the entire page. This is accomplished by inserting additional second Javascript code into the HTML document which registers an event handler for an end-of-page event. This customarily corresponds with the "on Load" event. When the web browser has determined that the web page has completed loading, the web browser will execute the Javascript event handler.

In the inserted Javascript for both time value determinations, the execution of the Javascript requests a URL corresponding to the time value determination. The URL may contain a timestamp for the time value, or may simply be a specific URL recognizable by client proxy program 141 or proxy server 250.

In step S2307, control module 260 sends a communication 2205 containing HTML to client proxy program 141. However, instead of the HTML containing the original Javascript from HTTP response 2203, as in step S603, the HTML in communication 2205 contains the modified Javascript with the inserted Javascript code.

In step S2308, client proxy program 141 receives communication 2205 and generates a HTTP response 2206 which contains the HTML document and transmits it to client browser 120, similar to step S704. However, here the HTML document includes the modified Javascript.

In step S2309, client browser 120 begins processes the HTML document, including executing the modified Javascript in the HTML document, as seen in block 2207 in FIG. 22.

In step S2310, client browser 120 reaches the end of the HTML document, where it encounters the first inserted Javascript code, as seen in block 2208 in FIG. 22. Client browser 120 executes the first inserted Javascript code, which forms a specific URL. Client browser 120 requests this URL as a HTTP GET request 2209.

In step S2311, client proxy program 141 intercepts request 2209. Client proxy program 141 recognizes the specific URL within request 2209 as corresponding to the end of HTML in client browser 120 loading the web page.

In step S2312, client proxy program 141 marks the time of receiving request 2209 ("Time 2"). Client proxy program 141 also returns a HTTP response 2210 of "404 Not-Found", to provide client browser 120 a response to request 2209 and satisfy the request.

Meanwhile, in step S2313, client browser finally finishes processing the entire web page, and thus, triggers an end-of-page event, as seen in block 2211 in FIG. 22. The event causes an event handler, defined in the second inserted Javascript code, to be executed. The event handler forms a second specific URL. Client browser 120 requests this second URL as a HTTP GET request 2212.

In step S2314, client proxy program 141 intercepts request 2212. Client proxy program 141 recognizes the specific URL within request 2212 as corresponding to the event handler being executed in client browser 120 after the end-of-page event. If the URL does not contain timestamp information, client proxy program 141 marks the time of receiving request 2212. Alternatively, if the text of the URL has embedded timestamp information, client proxy program 141 decodes and extracts timestamp information from the embedded timestamp information. An example of the URL having embedded time stamp information (i.e., the URL is a function of time and/or date) is the following: http://www.forresptimeonlypurposes.com/timestampdate20101111-timestamptime161 200-timestampmicrosec=945679.

In step S2315, client proxy program 141 marks this end-of-page timing data ("Time 3"). Client proxy program 141 also returns a HTTP response 2213 of "404 Not-Found", to provide client browser 120 a response to request 2212 and satisfy the request.

In step S2316, client proxy program 141 uses the begin-time, the end-of-HTML time, and/or the end-of-page time to calculate the web page response time for client browser 120. In the time calculations, client proxy program 141 may discount any communications delay between client browser 120 and client proxy program 141 as being negligible. Alternatively, the time can be compensated for this delay according to any appropriate and well-known method.

In step S2317, client proxy program 141 sends the web page response times to proxy server 250 as communication 2214.

Instead of using a URL associated with a HTTP GET request, the modified Javascript may alternatively encode the timing information using another format. For example, the modified Javascript may place the timing information within a HTTP PUT request, a HTTP POST request, or a cookie. Like the URL method, client browser 120 transmits the HTTP request or cookie (e.g., via HTTP), which is then intercepted by client proxy program 141.

As another alternative to the embodiment, proxy server 250 may perform the processing of the specific end-of-HTML and end-of-page URLs sent by client browser 120 or the processing of the web page response times, instead of client proxy program 141 performing such processing.

Again, in this web page response scheme which uses Javascript injection, there is no need for proxy server 250 to execute the modified Javascript (since the modified Javascript is intended to be executed by client browser 120), so proxy server 250 may skip or otherwise ignore or not execute the modified Javascript when executing Javascript in a HTTP response.

Additional General Comments

The following numbered comments are applicable to all of the foregoing embodiments:

(1) In the foregoing description, where reference is made to a "program", such refers to programming code or instructions including without limitation object code, machine code, source code, scripting code, etc. which can be executed by a computer and more particularly by the computer's processor or processing unit or CPU, etc. Thus, when it is stated that a "program" takes some action, it means that the program includes programming code or instructions that when executed as discussed above effect that action.

(2) In the foregoing description, where reference is made to a link or network link, such may also be referred to as a network connection. Sending data on a network connection by one apparatus for receipt by another apparatus can cover the case where the apparatuses are connected directly by a single link, or the case where the apparatuses are connected indirectly with one or more links and/or one or more apparatuses, routers, or other devices intervening therebetween.

(3) In the foregoing description, when it is described that the client PC's web browser generates a HTTP GET request for a URL and sends the HTTP GET request on a network connection, it is understood that all of the various hardware and software components in between the web browser and the physical level are implicated. Thus, for example, when the client PC's web browser 120 generates a HTTP GET request, the HTTP GET request is received and processed by TCP/IP stack 121 after which it is sent using TCP/IP on network link 101. Likewise, when proxy server 250 sends data to client proxy program 141, the data passes through NIC 253, NIC 220, satellite interface 210, link 30, satellite 10, link 20, satellite interface 131, and routing 140, before reaching client proxy program 141. In other words, where it is described that some type of data is sent from one apparatus to another, the reader should understand that the data is passing, in fact, through the various hardware or physical components or network links or connections and through the various software or program components described.

(4) While the present invention has been discussed above in the context of HTTP protocol over a satellite link, the present invention is not limited to that protocol; instead, some other protocol, at the application level or other level, could be employed. For instance, Hypertext Transfer Protocol Secure (HTTPS) is understood to be an alternative and widely-used protocol to HTTP.

(5) While the present invention has been discussed above with respect to web pages, again it is not so limited and other content could be used.

(6) While the present invention has been discussed above with respect to a satellite connection, it is not so limited, and any type of connection between apparatuses could be employed.

(7) While the client PC and other apparatuses have been described above as being computers or the like, the present invention is not so limited, and instead such could be replaced by a variety of other devices including, for example, a television, cellular telephone, personal digital assistant (PDA), gaming system, or any other electronic device for connecting to a network such as the Internet or some other network.

(8) It should also be appreciated that instead of satellite and the Internet, any alternative network or network link can be incorporated with the present invention.

(9) While the present invention has been described as using network links such as LAN links, or WAN links such as a satellite link, or network interface cards, or various types of switching or routing, it will be appreciated that any forms or links, routing, switching, etc. may be used in place of the described networking components.

(10) In the description above, mention is made of the proxy server 250 receiving a HTTP response sent by a web server. However, the present invention is not limited to the cases where the entire HTTP response is received by proxy server 250. Instead, proxy server 250 could receive data from the HTTP response such as, for example, just a portion of the HTTP response. The proxy server 250 does not necessarily have to receive the entire HTTP response. Also, the proxy server 250 could begin taking action such as prefetching a dynamically-generated URL before receiving an entire HTTP response.

(11) In the description above, mention is made of the HTTP response including a HTML document, or an HTML document including Javascript. However, the present invention is not so limited. An HTTP response typically includes an initial line, one or more header lines, and then a message body. The message body may, for example, be HTML, or it may be some other data type (e.g., plain text, image (e.g., GIF), etc.). Thus, in the description above, where reference is made to the HTML document (i.e., a HTML message body) of the HTTP response, it should be understood that the invention is not limited to the same, but any other HTTP response is also envisioned. Also, the proxy server 250 may send to the client proxy program 141 either (1) the entire HTTP response or (2) data obtained in accordance with the HTTP response (e.g., just the HTTP response message body or some other subset of the HTTP response). What is preferred is that the proxy server 250 sends to the client proxy program 141 data from which the client proxy program 141 can generate a HTTP response to send to the client browser 120.

(12) In the description above, mention is made of the Javascript contained within the HTML document. However, the present invention is not so limited. The Javascript may be contained in a separate discrete document, accessed via a URL contained in the HTML document. In this circumstance, the client browser 120 and virtual browser 270 first request the separate document (e.g., via HTTP by the URL of the document) and then execute the Javascript upon receipt of the document. Thus, the present invention is operative to modify and execute Javascript regardless of whether it is located in the HTML document or in a separate referenced document.

(13) In the description above, where various flowcharts and procedures are described, if it is not otherwise specified, then it should be assumed that the flowcharts and procedures are effected by software programs stored in memories of the type discussed above, which programs, when executed by a processor such as a CPU, carry out the described steps.

(14) In the description above, it is explained that when the client browser 120 generates a first HTTP GET request for a first URL, the client proxy program 141 can send data to the proxy server 250, from which data the first URL can be obtained. When the proxy server 250 receives this data, the proxy server 250 generates a second HTTP GET request for the first URL. This second HTTP GET request is, as described above, sent using TCP/IP with a source IP address being an IP address of the proxy server 250, and a destination address being an IP address of the web server, so that a HTTP response from the web server will be sent via TCP/IP with the IP address of the proxy server 250 being the IP destination address. However, the present invention is not limited to the foregoing. Instead, the proxy server 250 could be a transparent proxy server. In such a case, instead of generating a second HTTP GET request, the proxy server could simply forward the first HTTP GET request (which was sent using a source IP address corresponding to the client PC 110 and a destination IP address of the web server). In such a case, when the web server generates a HTTP response, the HTTP response is sent using TCP/IP with the IP address of the client PC 110 being the destination address. The proxy server 250 could detect the HTTP response on the network, and even though the proxy server 250 did not generate its own HTTP GET request, the proxy server 250 could obtain the HTTP response or data therefrom, and then manipulate the Javascript as discussed above and/or pre-fetch content from dynamically-generated and/or static URLs as discussed above.

(15) In the discussion above, it is explained that the first HTTP GET request for the first URL, generated by the client browser 120 of the client PC 110, may be sent using IP where the source IP address is that of the client PC. Of course, if the client PC's IP address is a private IP address on a LAN, then router 130 may perform network address translation before forwarding the IP packet to sub-system 200. In that case, the first HTTP GET request may be sent using TCP/IP where an IP source address is changed from that of the client PC 110 to a public IP address of the router 130. Of course, in such a configuration, TCP/IP communications from the Internet intended for client PC 110 may have the router 130's public IP address as the destination IP address, and the router 130 then performs translation, usually based on port number, to change the destination IP address to the client PC's IP address (i.e., the private address). It will be appreciated that the present invention is intended to also cover this case.

(16) While an embodiment using a satellite network has been described above, the invention is not limited to satellite networks. Other relatively long-latency networks could alternatively be used. Indeed, any network, whether long-latency or not, could be used.

(17) While an embodiment using the public Internet has been described above, the invention is not limited to using the Internet. Any other network could be used including, for example, an enterprise private network or some other private network.

Figure 2:
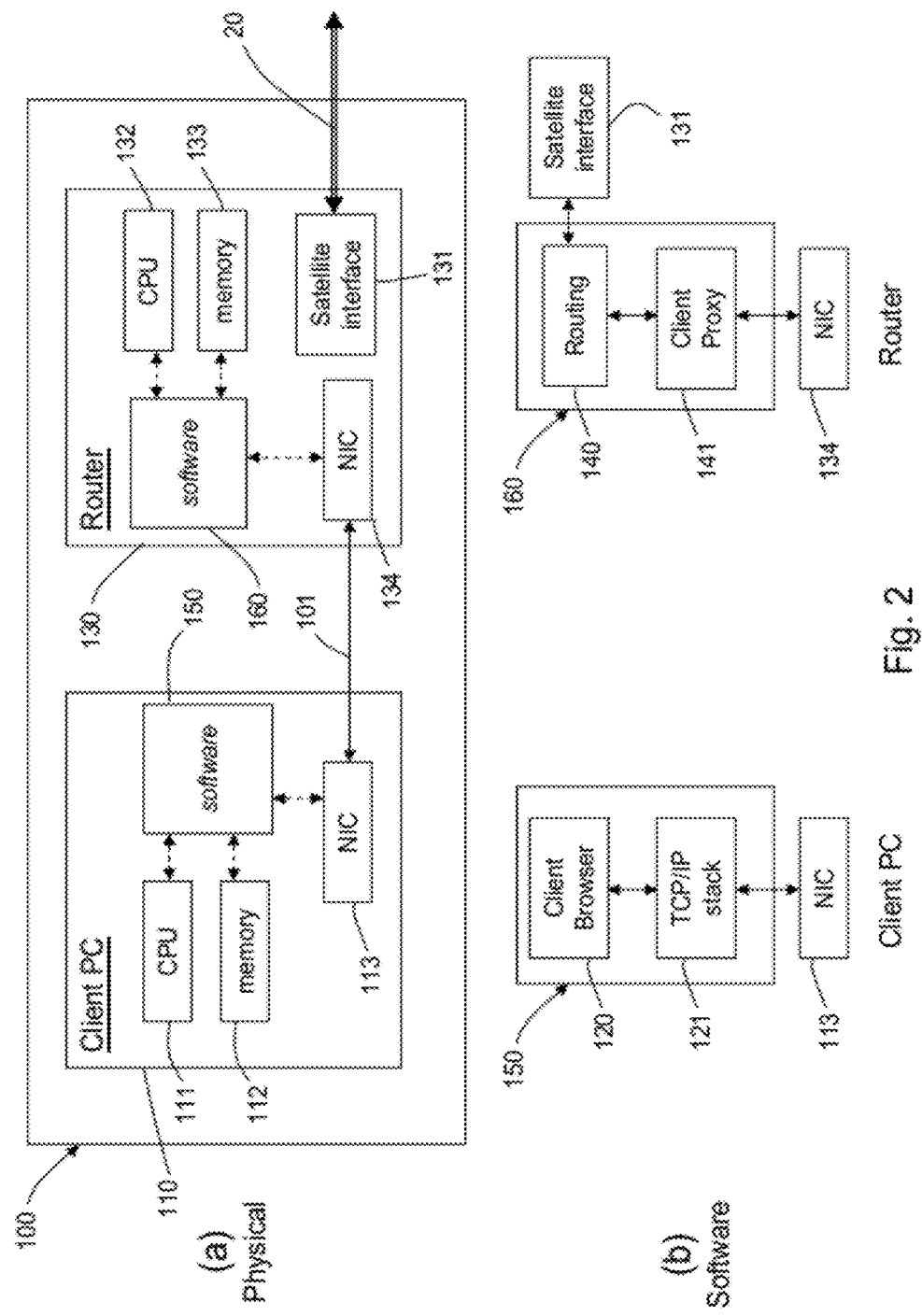
FIG. 2 comprises FIGS. 2(a) and 2(b) which are schematic diagrams showing a client sub-system in accordance with the present invention, where

(18) While FIG. 2 depicts a single client PC 110, the invention is not limited to one client PC. Of course, there could be multiple client PCs.

(19) While FIG. 2 depicts a personal computer (PC), the invention is not limited to PCs. The invention also applies, for example, to other devices with browsers or that generate requests for web content, such requests including but not being limited to HTTP protocol requests.

(20) While it has been described above that the user may type a URL into the address bar of the client browser 120, the invention is not so limited. Instead of typing a URL, the user could select a link by, for example, clicking on it, or the client browser 120 itself could trigger the movement to a new web page. Any of the myriad ways for requesting web content are covered.

(21) While embodiments have been described in which the proxy server injects Javascript into an HTML document or HTTP response or the like, the invention is not so limited. Alternatively, another apparatus could carry out the injection. For example, the client proxy could be the one to inject the Javascript.

(22) Another advantage offered by the present invention over conventional pre-fetch systems is that where the HTTP response from the webserver contains Javascript that sets a cookie, the proxy server can execute the Javascript and set the cookie (whereas a proxy server in a conventional pre-fetch system would not execute the Javascript and thus could not set the cookie). As a result, when making an HTTP GET request (e.g., when retrieving a URL contained in the HTTP response), the proxy server can use the cookie.

(23) While the present invention is applied to a satellite communications system, it not limited to such. For example, the present invention can be applied to a cellular communications system or a wireless communications system or a wired network. It will be understood that the present invention can be applied to any networking or communications system which may benefit from the present invention.

(24) While the present invention describes a preferred embodiment containing hardware and/or software, it will be understood that any of those various components can be alternatively implemented in hardware, software, or a combination thereof.

(25) Unless specified otherwise, the term "memory" as discussed above with respect to the various apparatuses, refers to a physical computer memory, examples of which include RAM, ROM, and other examples of computer hardware memory. In other words, the memory is a tangible physical object and is a non-ephemeral and non-transitory form of matter. Also all of the "apparatuses", "devices", and the like described herein are also tangible physical objects that are non-ephemeral and that include at least some hardware.

(26) While the preferred embodiments have been described above as using HTTP, HTML, and the like, the present invention is not limited to the foregoing, and other protocols including, without limitation, other markup languages or methods of sending web content, could be used.

(27) While terms in the foregoing description such as editing or modifying Javascript have been used to describe, by way of example and not of limitation, how the present invention can cause the client apparatus's web browser to receive an HTTP response that contains Javascript not present in an HTTP response generated by the web server, it should be understood that there might not be any Javascript in the original, unmodified HTTP response generated by the web server; in such a case, the present invention may be said to "inject" or insert Javascript so that the client apparatus's web browser receives an HTTP response that includes the injected Javascript, which was not present in the original, unmodified HTTP response generated by the web server. Thus, it will be appreciated that where the application refers to or depicts "modifying" Javascript in an embodiment, the invention is not limited to "modifying" Javascript and also covers inserting or injecting Javascript or the like.

(28) Unless stated otherwise, "contains" shall have the meaning of "comprises". Thus, for example, a packet that contains certain data is not limited to that data but may also include other data.

(29) While embodiments have been described in which there are a client proxy and a proxy server, the invention is not so limited. Instead of having both a client proxy and a proxy server, that sub-system could be replaced, for example, by a single proxy.

(30) While embodiments have been described in which the proxy server inserts, injects, modifies, or edits Javascript, the invention is not so limited. Instead, the client proxy could carry out such steps. Such could be especially preferable if there is only one proxy. An example of the client proxy carrying out such steps could be that the client proxy may, instead of the proxy server, insert or inject Javascript into a HTTP response such that the client apparatus's web browser, when executing the Javascript, sends browser-specific information to another apparatus (e.g., to the proxy server).

(31) While embodiments have been described in which the client proxy and/or proxy server monitor the cookie fields of HTTP GET requests generated by the client apparatus's web browser, the invention is not so limited. Preferably, not only HTTP GET requests but also various HTTP requests (e.g., GETs, PUTs, POSTs, etc.) are monitored.

INDUSTRIAL APPLICABILITY

The present invention provides a communications system that improves the transfer of data over a communications link.

CONCLUSION

Except as otherwise disclosed herein, the various components shown in outline or in block form in the figures are individually well known and their internal construction and operation are not critical either to the making or using of this invention or to a description of the best mode of the invention.

Although specific embodiments of the present invention have been described above in detail, it will be understood that this description is merely for purposes of illustration. When it is said that something "is", "shall", "will", or "should be" the case, for example, these expressions are not meant to limit the invention, but are merely providing a specific example or specific examples. Various modifications of and equivalent structures corresponding to the disclosed aspects of the preferred embodiments in addition to those described above may be made by those skilled in the art without departing from the spirit of the present invention which is defined in the following claims, the scope of which is to be accorded the broadest interpretation so as to encompass such modifications and equivalent structures.

What is claimed is:

1. A proxy server apparatus comprising:
a proxy server module adapted to, in a case where a client device has generated a first HTTP GET request for a first URL, receive, from a web server associated with the first URL, a first HTTP response corresponding to the first URL;
means for obtaining Javascript in accordance with Javascript in the first HTTP response; and
means for executing the obtained Javascript,
wherein said proxy server module transmits data to the client device such that the client device receives the obtained Javascript and also executes the obtained Javascript, wherein in a case where the obtained Javascript when executed produces a request for a URL, (a) the executing means, by executing the obtained Javascript, effects an HTTP request for the URL, and (b) the client device, by also executing the obtained Javascript, also generates an HTTP request for the URL,
wherein a memory and processor are included in the proxy server apparatus.

2. An apparatus according to claim 1, wherein said proxy server module transmits to a client proxy device, via a network connection, the obtained Javascript, and
wherein the client proxy device comprises means for receiving the obtained Javascript and means for sending the obtained Javascript to the client device.

3. An apparatus according to claim 1, further comprising means for pre-fetching web content from a URL determined in accordance with execution of the obtained Javascript.

4. An apparatus according to claim 1, wherein said proxy server module transmits to a client proxy device, via a network connection, the obtained Javascript,
wherein the client proxy device comprises (a) means for generating a second HTTP response to the first HTTP GET request in accordance with the obtained Javascript, and (b) means for sending the second HTTP response to the client device, and
wherein the client device comprises means for receiving the second HTTP response, means for obtaining the obtained Javascript from the HTTP response, and means for executing the obtained Javascript.

5. An apparatus according to claim 1, wherein said proxy server module transmits to the client device, via a network connection, the obtained Javascript, and
wherein the client device comprises means for receiving the obtained Javascript and means for executing the obtained Javascript.

6. An apparatus according to claim 1, wherein said proxy server module transmits to the client device, via a network connection, the obtained Javascript, and
wherein the client device comprises (a) a HTTP web browser that generated the first HTTP GET request and (b) a proxy software program that receives the obtained Javascript from the proxy server apparatus, generates a HTTP response to the first HTTP GET request in accordance with the obtained Javascript, and sends the HTTP response to the web browser, which executes the obtained Javascript.

7. An apparatus according to claim 1, wherein the executing means comprises a web browser that executes the obtained Javascript.

8. An apparatus according to claim 1, wherein said proxy server module is adapted to, in the case where a client device has generated the first HTTP GET request for the first URL, generate a second HTTP GET request for the first URL, wherein the first HTTP response is a response to the second HTTP GET request.

9. An apparatus according to claim 1, wherein the first HTTP response is a response to the first HTTP GET request.

10. An apparatus according to claim 1, further comprising:
means for, in response to execution by the executing means of the obtained Javascript producing a request for a second URL, generating a second HTTP GET request for the second URL; and
means for receiving a second HTTP response to the second HTTP GET request.

11. An apparatus according to claim 10, further comprising means for sending data in accordance with the second HTTP response to a client proxy device,
wherein the client proxy device comprises means for receiving the data in accordance with the second HTTP response, means for generating a HTTP response in accordance with the data in accordance with the second HTTP response, and means for sending the generated HTTP response to the client device.

12. An apparatus according to claim 10, further comprising means for sending data in accordance with the second HTTP response to the client device,
wherein the client device comprises (a) a HTTP web browser and (b) means for receiving the data in accordance with the second HTTP response, for generating a HTTP response in accordance with the data in accordance with the second HTTP response, and for sending the generated HTTP response to the web browser.

13. An apparatus according to claim 10, further comprising:
means for sending data in accordance with the second HTTP response to the client device; and
means for sending a notification to the client device that the proxy server apparatus is generating the second HTTP GET request, wherein the notification is sent prior to sending the data in accordance with the second HTTP response to the client device.

14. An apparatus according to claim 13, further comprising means for sending to the client device, via a network connection, the obtained Javascript,
wherein the client device comprises (a) means for receiving the notification from the proxy server apparatus and (b) means for awaiting receipt from the proxy server apparatus of the data in accordance with the second HTTP response without the client device generating a request for the second URL.

15. An apparatus according to claim 1, wherein the obtaining means comprises means for modifying Javascript in the first HTTP response to obtain Javascript which is different from Javascript in the first HTTP response.

16. An apparatus according to claim 1, further comprising:
means for, in response to HTML in the first HTTP response including a reference to a URL, generating a second HTTP GET request for that URL; and
means for, in response to Javascript in the first HTTP response that when executed produces a request for a URL, generating a third HTTP GET request for that URL.

17. An apparatus according to claim 16, further comprising:
means for receiving a response to the second HTTP GET request and for transmitting data in accordance with the response such that the client device receives the transmitted data; and
means for receiving a response to the third HTTP GET request and for transmitting data in accordance with the response such that the client device receives the transmitted data.

18. An apparatus according to claim 17, wherein the data in accordance with the response to the second HTTP GET request and the data in accordance with the response to the third HTTP GET request are transmitted to a client proxy device, and
wherein the client proxy device comprises (a) means for generating a HTTP response that includes the data in accordance with the response to the second HTTP GET request and for sending the generated HTTP response to the client device, and (b) means for generating a HTTP response that includes the data in accordance with the response to the third HTTP GET request and for sending that HTTP response to the client device.

19. An apparatus according to claim 1, wherein the client device comprises means for executing the obtained Javascript, and
wherein, in the event that execution of the obtained Javascript produces a request for a second URL, the proxy server apparatus generates a HTTP GET request for the second URL and the client device also generates a HTTP GET request for the second URL, and the proxy server apparatus sends data via a network connection to cause the client device to receive a HTTP response to the client device's HTTP GET request for the second URL.

20. An apparatus according to claim 1, wherein the client device comprises (a) a web browser, which generates the first HTTP GET request and which has proxy settings, and (b) a program selected by the web browser's proxy settings,
wherein the program receives the first HTTP GET request, obtains the first URL from the first HTTP GET request, and in accordance with the first URL sends to the proxy server apparatus data that includes the first URL,
wherein the proxy server apparatus further comprises means for sending, to the program, data comprising the obtained Javascript,
wherein the program receives the data comprising the obtained Javascript and, in accordance with the data comprising the obtained Javascript, provides to the web browser a HTTP response to the first HTTP GET request, the HTTP response including the obtained Javascript,
wherein the web browser executes the obtained Javascript,
wherein the proxy server apparatus further comprises (a) means for, in the event that the execution by the executing means of the obtained Javascript produces a request for a second URL, generating a second HTTP GET request for the second URL, (b) means for receiving a second HTTP response to the second HTTP GET request, and (c) means for sending, to the program, data in accordance with the second HTTP response, and wherein after the program receives the transmitted data in accordance with the second HTTP response and when the web browser, upon executing the obtained Javascript, generates a HTTP GET request for the second URL, the program generates in accordance with the data in accordance with the second HTTP response and provides to the web browser a HTTP response to the web browser's HTTP GET request for the second URL, so that it is unnecessary for the program to send the HTTP GET request for the second URL to a web server corresponding to the second URL.

21. An apparatus according to claim 1, wherein the client device and a proxy device are connected via a network, and the proxy device is connected to the proxy server apparatus via a high-latency network, wherein the client device comprises a web browser, which generates the first HTTP GET request, wherein the proxy device receives the first HTTP GET request from the client device, obtains the first URL from the first HTTP GET request, and in accordance with the first URL sends to the proxy server apparatus data that includes the first URL, wherein the proxy server apparatus further comprises means for sending, to the proxy device, data comprising the obtained Javascript, wherein the proxy device receives the data comprising the obtained Javascript and in accordance with the data, generates and sends to the web browser of the client device a HTTP response to the first HTTP GET request, the HTTP response including the obtained Javascript, wherein the web browser executes the obtained Javascript, wherein the proxy server apparatus further comprises (a) means for, in the event that the execution by the executing means produces a request for a second URL, generating a second HTTP GET request for the second URL, (b) means for receiving a second HTTP response to the second HTTP GET request, and (c) means for sending, to the proxy device, data in accordance with the second HTTP response, and wherein when execution by the web browser of the obtained Javascript results in generation of a HTTP GET request for the second URL, the proxy device generates a HTTP response thereto in accordance with the data in accordance with the second HTTP response, so that it is unnecessary for the proxy device to send the client device's HTTP GET request for the second URL to a web server corresponding to the second URL.

22. A device comprising:

a processor;

a memory storing a control program to be executed by the processor; and a hardware network interface, wherein the control program comprises code that, when executed by the processor, causes the device to at least perform the following:

(a) receiving, via the hardware network interface, data corresponding to a first HTTP GET request for a first URL generated by a web browser of a client device;

(b) receiving data corresponding to a first HTTP response, the first HTTP response having been generated by a web server associated with the first URL;

(c) if the data corresponding to the first HTTP response includes Javascript, obtaining Javascript for execution by the control program, based on Javascript included in the data corresponding to the first HTTP response;

(d) executing the obtained Javascript; and (e) transmitting data to the client device such that the client device receives the obtained Javascript and also executes the obtained Javascript, wherein in a case where the obtained Javascript when executed produces a request for a URL, (i) the executing step, by executing the obtained Javascript, effects an HTTP request for the URL, and (ii) the client device, by also executing the obtained Javascript, also generates an HTTP request for the URL, wherein in response to the obtained Javascript dynamically generating a URL when executed, the control program generates a second HTTP GET request for the dynamically-generated URL.

23. A device according to claim 22, wherein the client device further comprises a proxy program selected by proxy settings in the client device's web browser, wherein the proxy program sends to the control program the data corresponding to the first HTTP GET request, wherein the control program is further configured to transmit data in accordance with the obtained Javascript to the proxy program, and wherein with the data in accordance with the obtained Javascript, the proxy program generates and provides to the client device's web browser a HTTP response to the first HTTP GET request.

24. An apparatus-implemented method comprising:

receiving from a network, by a proxy server apparatus including a memory, a processor, and a hardware network interface, in a case where a web browser of a client device generates a first HTTP GET request for a first URL, data corresponding to the first HTTP GET request;

receiving by the proxy server apparatus, data corresponding to a HTTP response, the HTTP response having been generated by a web server associated with the first URL;

obtaining Javascript in accordance with Javascript in the data corresponding to the HTTP response;

executing, by the proxy server apparatus, of the obtained Javascript; and transmitting data to the client device such that the client device receives the obtained Javascript and also executes the obtained Javascript, wherein in a case where the obtained Javascript when executed produces a request for a URL, (a) the executing step, by executing the obtained Javascript, effects an HTTP request for the URL, and (b) the client device, by also executing the obtained Javascript, also generates an HTTP request for the URL.

25. A method comprising:

determining, by a proxy server apparatus including a memory, that a client device has made a request for a first URL, wherein the first URL corresponds to a web server; and when a web page corresponding to the first URL comprises code that when executed generates a dynamic, non-static second URL: (1) prefetching, by the proxy server apparatus, of content in accordance with the second URL by generating a request for the second URL, and (2) transmitting data to the client device such that the client device receives the code and also generates a request for the second URL.

26. A method according to claim 25, further comprising generating, by the proxy server apparatus, of a pre-fetch notification that is sent to a proxy for the client device, the pre-fetch notification informing the proxy that content for the second URL is to be prefetched by the proxy server apparatus.

27. A method according to claim 26, wherein the proxy is selected from the group consisting of a proxy program executed by the client device and a proxy device separate from the client device, and
   wherein in response to the proxy having received the prefetch notification, the proxy prevents a HTTP request for the second URL generated by a web browser of the client device from being sent to a web server corresponding to the second URL.

28. An apparatus according to claim 10, further comprising:
   means for sending data in accordance with the second HTTP response to a client proxy device; and
   means for sending a notification to the client proxy device that the proxy server apparatus is generating the second HTTP GET request, wherein the notification is sent prior to sending the data in accordance with the second HTTP response to the client proxy device.

29. An apparatus according to claim 28, further comprising means for sending to the client proxy device, via a network connection, the obtained Javascript,
   wherein the client proxy device comprises (a) means for receiving the notification from the proxy server apparatus and (b) means for awaiting receipt from the proxy server apparatus of the data in accordance with the second HTTP response without the client proxy device generating a request for the second URL.

* * * * *